(12) United States Patent
Kindwall et al.

(10) Patent No.: US 12,099,032 B2
(45) Date of Patent: Sep. 24, 2024

(54) SYSTEMS AND METHODS FOR SAMPLE PREPARATION, PROCESSING AND ANALYSIS

(71) Applicant: IntegenX Inc., Pleasanton, CA (US)

(72) Inventors: Alexander Kindwall, Pleasanton, CA (US); Chungsoo Charles Park, Redwood City, CA (US); Fedor IIkov, San Jose, CA (US); Stevan Jovanovich, Livermore, CA (US); David King, Menlo Park, CA (US); Tristan Robert Littlehale, Saratoga, CA (US); David Grant Nilson, Walnut Creet, CA (US); Rick Pittaro, San Carlos, CA (US); Robert A. Schueren, Los Altos, CA (US); Mattias Vangbo, Fremont, CA (US); Philip Justus Wunderle, Oakland, CA (US)

(73) Assignee: INTEGENX, INC., Pleasanton, CA (US)

( * ) Notice: Subject to any disclaimer, the term of this patent is extended or adjusted under 35 U.S.C. 154(b) by 571 days.

(21) Appl. No.: 16/871,797

(22) Filed: May 11, 2020

(65) Prior Publication Data
US 2021/0003530 A1 Jan. 7, 2021

Related U.S. Application Data

(62) Division of application No. 14/919,620, filed on Oct. 21, 2015, now Pat. No. 10,690,627.
(Continued)

(51) Int. Cl.
*G01N 27/447* (2006.01)
*B01L 3/00* (2006.01)
(Continued)

(52) U.S. Cl.
CPC .. *G01N 27/44791* (2013.01); *B01L 3/502715* (2013.01); *G01N 27/44704* (2013.01);
(Continued)

(58) Field of Classification Search
CPC ....... G01N 27/44791; G01N 27/44704; G01N 27/44786; G01N 27/453; G01N 27/44743;
(Continued)

(56) References Cited

U.S. PATENT DOCUMENTS 3,075,740 A 1/1963 McIntosh
3,352,643 A 11/1967 Ando et al.
(Continued)

FOREIGN PATENT DOCUMENTS

CN 1109597 A 10/1995
CN 1146017 A 3/1997
(Continued)

OTHER PUBLICATIONS

Au et al., Microvalves and Micropumps for BioMEMS, Micromachines 2011, 2(2), 179-220, May 24, 2011.
(Continued)

*Primary Examiner* — Luan V Van
*Assistant Examiner* — Shizhi Qian
(74) *Attorney, Agent, or Firm* — JONES ROBB, PLLC

(57) ABSTRACT

An electrophoresis cartridge can include an integrated electrophoresis assembly including an anode sub-assembly comprising an anode, a cathode sub-assembly comprising a cathode; and at least one electrophoresis capillary having a first end in fluid communication with the cathode sub-assembly and a second end in fluid communication with the anode sub-assembly. The cartridge can further include a reagent container comprising electrophoresis buffer; a fluid conduit in fluidic communication with the reagent container;

(Continued)

a pump in fluidic communication with the fluid conduit, the pump configured to transfer the electrophoresis buffer through the fluid conduit from the reagent container to the passage of the cathode sub-assembly; and a sample inlet port and at least one sample line, wherein the sample line places the sample inlet port in fluidic communication with the first end of the electrophoresis capillary through a passage in the cathode sub-assembly.

16 Claims, 20 Drawing Sheets

Related U.S. Application Data

(60) Provisional application No. 62/161,156, filed on May 13, 2015, provisional application No. 62/069,752, filed on Oct. 28, 2014, provisional application No. 62/067,429, filed on Oct. 22, 2014, provisional application No. 62/067,404, filed on Oct. 22, 2014.

(51) Int. Cl.
*B01L 7/00* (2006.01)
*G01N 27/453* (2006.01)

(52) U.S. Cl.
CPC ..... *G01N 27/44786* (2013.01); *G01N 27/453* (2013.01); *B01L 7/52* (2013.01); *B01L 2200/04* (2013.01); *B01L 2200/10* (2013.01); *B01L 2200/16* (2013.01); *B01L 2300/0681* (2013.01); *B01L 2300/0867* (2013.01); *B01L 2300/1822* (2013.01); *B01L 2300/1827* (2013.01); *B01L 2400/0421* (2013.01); *G01N 27/44743* (2013.01)

(58) Field of Classification Search
CPC ........... B01L 3/502715; B01L 2200/04; B01L 2200/10; B01L 2200/16; B01L 2300/0867; B01L 2400/0421
See application file for complete search history.

(56) References Cited

U.S. PATENT DOCUMENTS

| | | |
|---|---|---|
| 3,433,257 A | 3/1969 | Jensen |
| 3,568,692 A | 3/1971 | Metzger et al. |
| 3,662,517 A | 5/1972 | Edward et al. |
| 4,011,351 A | 3/1977 | Haase |
| 4,011,357 A | 3/1977 | Haase |
| 4,113,665 A | 9/1978 | Law et al. |
| 4,390,307 A | 6/1983 | Rice |
| 4,847,120 A | 7/1989 | Gent |
| 4,963,498 A | 10/1990 | Hillman et al. |
| 5,019,236 A | 5/1991 | Young |
| 5,053,115 A | 10/1991 | Weinberger et al. |
| 5,085,757 A | 2/1992 | Krager et al. |
| 5,275,645 A | 1/1994 | Ternoir |
| 5,302,272 A | 4/1994 | Slein |
| 5,324,401 A | 6/1994 | Yeung et al. |
| 5,338,427 A | 8/1994 | Shartle et al. |
| 5,364,759 A | 11/1994 | Caskey et al. |
| 5,376,252 A | 12/1994 | Ekstroem et al. |
| 5,387,505 A | 2/1995 | Wu |
| 5,453,163 A | 9/1995 | Yan |
| 5,482,836 A | 1/1996 | Cantor et al. |
| 5,523,231 A | 6/1996 | Reeve |
| 5,571,410 A | 11/1996 | Swedberg et al. |
| 5,587,128 A | 12/1996 | Wilding et al. |
| 5,589,136 A | 12/1996 | Northrup et al. |
| 5,635,358 A | 6/1997 | Wilding et al. |
| 5,639,428 A | 6/1997 | Cottingim |
| 5,675,155 A | 10/1997 | Pentoney, Jr. et al. |
| 5,681,946 A | 10/1997 | Reeve |
| 5,705,628 A | 1/1998 | Hawkins |
| 5,705,813 A | 1/1998 | Apffel et al. |
| 5,726,026 A | 3/1998 | Wilding et al. |
| 5,741,462 A | 4/1998 | Nova et al. |
| 5,750,015 A | 5/1998 | Soane et al. |
| 5,770,029 A | 6/1998 | Nelson et al. |
| 5,775,371 A | 7/1998 | Pan et al. |
| 5,776,748 A | 7/1998 | Singhvi et al. |
| 5,830,662 A | 11/1998 | Soares et al. |
| 5,842,787 A | 12/1998 | Kopf-Sill et al. |
| 5,856,174 A | 1/1999 | Lipshutz et al. |
| 5,863,502 A | 1/1999 | Southgate et al. |
| 5,872,010 A | 2/1999 | Karger et al. |
| 5,885,470 A | 3/1999 | Parce et al. |
| 5,898,071 A | 4/1999 | Hawkins |
| 5,903,348 A | 5/1999 | Melman et al. |
| 5,908,552 A | 6/1999 | Dittmann et al. |
| 5,922,185 A | 7/1999 | Updyke et al. |
| 5,922,591 A | 7/1999 | Anderson et al. |
| 5,942,443 A | 8/1999 | Parce et al. |
| 5,948,684 A | 9/1999 | Weigl et al. |
| 5,951,262 A | 9/1999 | Hartman |
| 5,971,158 A | 10/1999 | Yager et al. |
| 5,994,064 A | 11/1999 | Staug et al. |
| 6,001,229 A | 12/1999 | Ramsey |
| 6,007,690 A | 12/1999 | Nelson et al. |
| 6,007,775 A | 12/1999 | Yager |
| 6,010,607 A | 1/2000 | Ramsey |
| 6,048,100 A | 4/2000 | Thrall et al. |
| 6,056,860 A | 5/2000 | Amigo et al. |
| 6,073,482 A | 6/2000 | Moles |
| 6,074,827 A | 6/2000 | Nelson et al. |
| 6,103,083 A | 8/2000 | Merenkova et al. |
| 6,103,199 A | 8/2000 | Bjornson et al. |
| 6,110,343 A | 8/2000 | Ramsey et al. |
| 6,120,184 A | 9/2000 | Laurence et al. |
| 6,136,212 A | 10/2000 | Mastrangelo et al. |
| 6,153,389 A | 11/2000 | Haarer et al. |
| 6,168,948 B1 | 1/2001 | Anderson et al. |
| 6,176,962 B1 | 1/2001 | Soane et al. |
| 6,190,616 B1 | 2/2001 | Jovanovich et al. |
| 6,197,595 B1 | 3/2001 | Anderson et al. |
| 6,207,031 B1 | 3/2001 | Adourian et al. |
| 6,235,471 B1 | 5/2001 | Knapp et al. |
| 6,238,538 B1 | 5/2001 | Parce et al. |
| 6,251,343 B1 | 6/2001 | Dubrow et al. |
| 6,280,589 B1 | 8/2001 | Manz et al. |
| 6,319,476 B1 | 11/2001 | Victor, Jr. et al. |
| 6,321,791 B1 | 11/2001 | Chow |
| 6,322,683 B1 | 11/2001 | Wolk et al. |
| 6,326,068 B1 | 12/2001 | Kong et al. |
| 6,342,142 B1 | 1/2002 | Ramsey |
| 6,348,318 B1 | 2/2002 | Valkirs |
| 6,379,929 B1 | 4/2002 | Burns et al. |
| 6,387,234 B1 | 5/2002 | Ueung et al. |
| 6,387,707 B1 | 5/2002 | Seul et al. |
| 6,391,622 B1 | 5/2002 | Knap et al. |
| 6,403,338 B1 | 6/2002 | Knapp et al. |
| 6,408,878 B2 | 6/2002 | Unger et al. |
| 6,423,536 B1 | 7/2002 | Jovanovich et al. |
| 6,429,025 B1 | 8/2002 | Parce et al. |
| 6,432,191 B2 | 8/2002 | Schutt |
| 6,432,290 B1 | 8/2002 | Harrison |
| 6,454,924 B2 | 9/2002 | Jedrzejewski et al. |
| 6,461,492 B1 | 10/2002 | Hayashizaki et al. |
| 6,489,112 B1 | 12/2002 | Hadd et al. |
| 6,521,188 B1 | 2/2003 | Webster |
| 6,524,456 B1 | 2/2003 | Ramsey et al. |
| 6,527,003 B1 | 3/2003 | Webster |
| 6,531,041 B1 | 3/2003 | Cong et al. |
| 6,531,282 B1 | 3/2003 | Dau et al. |
| 6,532,997 B1 | 3/2003 | Bedingham et al. |
| 6,533,914 B1 | 3/2003 | Liu |
| 6,534,262 B1 | 3/2003 | McKernan et al. |
| 6,537,757 B1 | 3/2003 | Langmore et al. |
| 6,544,734 B1 | 4/2003 | Briscoe et al. |
| 6,551,839 B2 | 4/2003 | Jovanovich et al. |
| 6,581,441 B1 | 6/2003 | Paul |

(56) References Cited

U.S. PATENT DOCUMENTS

| | | |
|---|---|---|
| 6,581,899 B2 | 6/2003 | Williams |
| 6,605,454 B2 | 8/2003 | Barenburg et al. |
| 6,613,525 B2 | 9/2003 | Nelson et al. |
| 6,614,228 B2 | 9/2003 | Hofmann et al. |
| 6,618,679 B2 | 9/2003 | Loehrlein et al. |
| 6,620,584 B1 | 9/2003 | Chee et al. |
| 6,623,613 B1 | 9/2003 | Mathies et al. |
| 6,627,446 B1 | 9/2003 | Roach et al. |
| 6,629,820 B2 | 10/2003 | Kornelsen |
| 6,632,619 B1 | 10/2003 | Harrison |
| 6,632,655 B1 | 10/2003 | Metha et al. |
| 6,660,148 B2 | 12/2003 | Shoji et al. |
| 6,663,833 B1 | 12/2003 | Stave et al. |
| 6,685,442 B2 | 2/2004 | Chinn et al. |
| 6,685,678 B2 | 2/2004 | Evans et al. |
| 6,685,809 B1 | 2/2004 | Jacobson et al. |
| 6,740,219 B2 | 5/2004 | Kazumichi et al. |
| 6,752,922 B2 | 6/2004 | Huang et al. |
| 6,764,648 B1 | 7/2004 | Roach et al. |
| 6,782,746 B1 | 8/2004 | Hasselbrink, Jr. et al. |
| 6,783,649 B2 | 8/2004 | Hedberg et al. |
| 6,786,708 B2 | 9/2004 | Brown et al. |
| 6,787,111 B2 | 9/2004 | Roach et al. |
| 6,793,753 B2 | 9/2004 | Unger et al. |
| 6,802,342 B2 | 10/2004 | Fernandes et al. |
| 6,803,019 B1 | 10/2004 | Bjornson et al. |
| 6,807,490 B1 | 10/2004 | Perlin |
| 6,824,663 B1 | 11/2004 | Bone |
| 6,829,753 B2 | 12/2004 | Lee et al. |
| 6,833,246 B2 | 12/2004 | Balasubramanian |
| 6,852,287 B2 | 2/2005 | Ganesan |
| 6,870,185 B2 | 3/2005 | Roach et al. |
| 6,883,774 B2 | 4/2005 | Nielsen et al. |
| 6,885,982 B2 | 4/2005 | Harris et al. |
| 6,899,137 B2 | 5/2005 | Unger et al. |
| 6,907,147 B2 | 6/2005 | Craft et al. |
| 6,923,907 B2 | 8/2005 | Hobbs et al. |
| 6,929,030 B2 | 8/2005 | Under et al. |
| 6,951,632 B2 | 10/2005 | Unger et al. |
| 6,953,058 B2 | 10/2005 | Fernandes et al. |
| 6,960,437 B2 | 11/2005 | Enzelberger et al. |
| 6,994,986 B2 | 2/2006 | Swartz et al. |
| 7,005,052 B2 | 2/2006 | Shimizu et al. |
| 7,005,292 B2 | 2/2006 | Wilding et al. |
| 7,005,493 B2 | 2/2006 | Huang et al. |
| 7,015,030 B1 | 3/2006 | Fouillet et al. |
| 7,046,357 B2 | 5/2006 | Weinberger et al. |
| 7,049,558 B2 | 5/2006 | Baer et al. |
| 7,054,004 B2 | 5/2006 | Inaba et al. |
| 7,081,191 B2 | 7/2006 | Shoji et al. |
| 7,087,380 B2 | 8/2006 | Griffiths et al. |
| 7,097,809 B2 | 8/2006 | Van et al. |
| 7,105,300 B2 | 9/2006 | Parce et al. |
| 7,118,910 B2 | 10/2006 | Unger et al. |
| 7,142,987 B2 | 11/2006 | Eggers |
| 7,157,228 B2 | 1/2007 | Hashmi et al. |
| 7,169,557 B2 | 1/2007 | Rosenblum et al. |
| 7,170,050 B2 | 1/2007 | Turner et al. |
| 7,198,759 B2 | 4/2007 | Bryning et al. |
| 7,211,388 B2 | 5/2007 | Cash et al. |
| 7,217,367 B2 | 5/2007 | Huang et al. |
| 7,232,656 B2 | 6/2007 | Balasubramanian et al. |
| 7,244,559 B2 | 7/2007 | Rothberg et al. |
| 7,244,567 B2 | 7/2007 | Chen et al. |
| 7,244,599 B2 | 7/2007 | Tanner et al. |
| 7,244,961 B2 | 7/2007 | Jovanovich et al. |
| 7,258,744 B2 | 8/2007 | Sakurada et al. |
| 7,258,774 B2 | 8/2007 | Chou et al. |
| 7,279,146 B2 | 10/2007 | Nassef et al. |
| 7,282,361 B2 | 10/2007 | Hodge |
| 7,312,085 B2 | 12/2007 | Chou et al. |
| 7,312,611 B1 | 12/2007 | Harrison et al. |
| 7,318,912 B2 | 1/2008 | Pezzuto et al. |
| 7,323,305 B2 | 1/2008 | Leamon et al. |
| 7,329,388 B2 | 2/2008 | Guzman |
| 7,361,471 B2 | 4/2008 | Gerdes et al. |
| 7,419,578 B2 | 9/2008 | Sakai et al. |
| 7,438,856 B2 | 10/2008 | Jedrzejewski et al. |
| 7,445,926 B2 | 11/2008 | Mathies et al. |
| 7,473,342 B2 | 1/2009 | Ugai et al. |
| 7,473,397 B2 | 1/2009 | Griffin et al. |
| 7,486,865 B2 | 2/2009 | Foquet et al. |
| 7,488,603 B2 | 2/2009 | Gjerde et al. |
| 7,501,237 B2 | 3/2009 | Solus et al. |
| 7,526,741 B2 | 4/2009 | Lee et al. |
| 7,531,076 B2 | 5/2009 | Hayashizaki et al. |
| 7,537,886 B1 | 5/2009 | Nazarenko et al. |
| 7,575,865 B2 | 8/2009 | Leamon et al. |
| 7,584,240 B2 | 9/2009 | Eggers |
| 7,589,184 B2 | 9/2009 | Hogan et al. |
| 7,595,200 B2 | 9/2009 | Bedingham et al. |
| 7,645,580 B2 | 1/2010 | Barber et al. |
| 7,691,614 B2 | 4/2010 | Senapathy |
| 7,704,735 B2 | 4/2010 | Facer et al. |
| 7,718,422 B2 | 5/2010 | Davis et al. |
| 7,718,442 B2 | 5/2010 | Davis et al. |
| 7,744,737 B1 | 6/2010 | James et al. |
| 7,745,207 B2 | 6/2010 | Jovanovich et al. |
| 7,774,737 B2 | 6/2010 | James et al. |
| 7,749,365 B2 | 7/2010 | Nguyen et al. |
| 7,749,737 B2 | 7/2010 | McBride et al. |
| 7,763,453 B2 | 7/2010 | Clemmens et al. |
| 7,766,033 B2 | 8/2010 | Mathies et al. |
| 7,785,458 B2 | 8/2010 | Shimizu et al. |
| 7,785,770 B2 | 8/2010 | Spector et al. |
| 7,790,368 B1 | 9/2010 | Fukuzono |
| 7,799,553 B2 | 9/2010 | Mathies et al. |
| 7,803,281 B2 | 9/2010 | Davies et al. |
| 7,817,273 B2 | 10/2010 | Bahatt et al. |
| 7,832,429 B2 | 11/2010 | Young et al. |
| 7,863,357 B2 | 1/2011 | Madabhushi et al. |
| 7,867,713 B2 | 1/2011 | Nasarabadi |
| 7,885,770 B2 | 2/2011 | Gill et al. |
| 7,892,856 B2 | 2/2011 | Grate et al. |
| 7,942,160 B2 | 5/2011 | Jeon et al. |
| 7,943,305 B2 | 5/2011 | Korlach et al. |
| 7,959,875 B2 | 6/2011 | Zhou et al. |
| 7,976,789 B2 | 7/2011 | Kenis et al. |
| 7,976,795 B2 | 7/2011 | Zhou et al. |
| 7,998,708 B2 | 8/2011 | Handique et al. |
| 8,007,746 B2 | 8/2011 | Unger et al. |
| 8,018,593 B2 | 9/2011 | Tan et al. |
| 8,053,192 B2 | 11/2011 | Bignell et al. |
| RE43,122 E | 1/2012 | Harrison et al. |
| 8,142,635 B2 | 3/2012 | Shimizu et al. |
| 8,221,990 B2 | 7/2012 | Mori et al. |
| 8,222,023 B2 | 7/2012 | Battrell et al. |
| 8,268,263 B2 | 9/2012 | Campbell et al. |
| 8,280,208 B2 | 10/2012 | Wellbrock et al. |
| 8,283,165 B2 | 10/2012 | Hogan et al. |
| 8,313,941 B2 | 11/2012 | Takayama et al. |
| 8,337,777 B2 | 12/2012 | Nurse |
| 8,388,908 B2 | 3/2013 | Blaga et al. |
| 8,394,642 B2 | 3/2013 | Jovanovich et al. |
| 8,398,642 B2 | 3/2013 | Weekes |
| 8,420,318 B2 | 4/2013 | Mathies et al. |
| 8,431,340 B2 | 4/2013 | Jovanovich et al. |
| 8,431,384 B2 | 4/2013 | Hogan et al. |
| 8,501,305 B2 | 8/2013 | Barlow |
| 8,512,538 B2 | 8/2013 | Majlof et al. |
| 8,551,714 B2 | 10/2013 | Jovanovich et al. |
| 8,557,517 B2 | 10/2013 | Jovanovich et al. |
| 8,557,518 B2 | 10/2013 | Jovanovich et al. |
| 8,562,918 B2 | 10/2013 | Jovanovich et al. |
| 8,584,703 B2 | 11/2013 | Kobrin et al. |
| 8,672,532 B2 | 3/2014 | Jovanovich et al. |
| 8,748,165 B2 | 6/2014 | Vangbo et al. |
| 8,763,642 B2 | 7/2014 | Vangbo |
| 8,841,116 B2 | 9/2014 | Mathies et al. |
| 8,894,946 B2 | 11/2014 | Nielsen et al. |
| 8,911,433 B2 | 12/2014 | Hixon et al. |
| 9,012,236 B2 | 4/2015 | Jovanovich et al. |
| 9,121,058 B2 | 9/2015 | Jovanovich et al. |
| 9,158,064 B2 | 10/2015 | Saito et al. |

(56) References Cited

U.S. PATENT DOCUMENTS

| | | |
|---|---|---|
| 9,291,284 B2 | 3/2016 | Penterman et al. |
| 9,341,284 B2 | 5/2016 | Vangbo |
| D772,086 S | 11/2016 | Schueren et al. |
| 9,592,501 B2 | 3/2017 | Jarvius et al. |
| 9,663,819 B2 | 5/2017 | Jovanovich et al. |
| 2001/0012612 A1 | 8/2001 | Petersen et al. |
| 2001/0041357 A1 | 11/2001 | Fouillet et al. |
| 2002/0003895 A1 | 1/2002 | Some |
| 2002/0022261 A1 | 2/2002 | Anderson et al. |
| 2002/0022587 A1 | 2/2002 | Ferguson et al. |
| 2002/0025529 A1 | 2/2002 | Quake et al. |
| 2002/0025576 A1 | 2/2002 | Northrup et al. |
| 2002/0042125 A1 | 4/2002 | Petersen et al. |
| 2002/0045189 A1 | 4/2002 | Imajo et al. |
| 2002/0047003 A1 | 4/2002 | Bedingham et al. |
| 2002/0048536 A1 | 4/2002 | Bergh et al. |
| 2002/0051992 A1 | 5/2002 | Bridgham et al. |
| 2002/0055167 A1 | 5/2002 | Pourahmadi et al. |
| 2002/0058332 A1 | 5/2002 | Quake et al. |
| 2002/0068357 A1 | 6/2002 | Mathies et al. |
| 2002/0098097 A1 | 7/2002 | Singh |
| 2002/0110900 A1 | 8/2002 | Jovanovich et al. |
| 2002/0113707 A1 | 8/2002 | Grunes et al. |
| 2002/0115201 A1 | 8/2002 | Barenburg et al. |
| 2002/0119480 A1 | 8/2002 | Weir et al. |
| 2002/0119482 A1 | 8/2002 | Nelson et al. |
| 2002/0137039 A1 | 9/2002 | Gessner |
| 2002/0139084 A1 | 10/2002 | Tobolka |
| 2002/0151089 A1 | 10/2002 | Chapman et al. |
| 2002/0157951 A1 | 10/2002 | Foret et al. |
| 2002/0160361 A1 | 10/2002 | Loehrlein et al. |
| 2002/0187560 A1 | 12/2002 | Pezzuto et al. |
| 2003/0008308 A1 | 1/2003 | Enzelberger et al. |
| 2003/0019753 A1 | 1/2003 | Ogle et al. |
| 2003/0021734 A1 | 1/2003 | Vann et al. |
| 2003/0029724 A1 | 2/2003 | Derand et al. |
| 2003/0007067 A1 | 4/2003 | Handique et al. |
| 2003/0070677 A1 | 4/2003 | Handique et al. |
| 2003/0087425 A1 | 5/2003 | Eggers |
| 2003/0087446 A1 | 5/2003 | Eggers |
| 2003/0087455 A1 | 5/2003 | Eggers et al. |
| 2003/0088657 A1 | 5/2003 | Eggers |
| 2003/0095897 A1 | 5/2003 | Grate et al. |
| 2003/0104466 A1 | 6/2003 | Knapp et al. |
| 2003/0129755 A1 | 7/2003 | Salder et al. |
| 2003/0162304 A1 | 8/2003 | Dority et al. |
| 2003/0175706 A1 | 9/2003 | Zhang |
| 2003/0197139 A1 | 10/2003 | Williams |
| 2003/0198573 A1 | 10/2003 | Forood et al. |
| 2003/0215369 A1 | 11/2003 | Eggers et al. |
| 2003/0217923 A1 | 11/2003 | Harrison et al. |
| 2004/0003997 A1 | 1/2004 | Anazawa et al. |
| 2004/0013536 A1 | 1/2004 | Hower et al. |
| 2004/0014091 A1 | 1/2004 | Duck et al. |
| 2004/0018611 A1 | 1/2004 | Ward et al. |
| 2004/0021068 A1 | 2/2004 | Staats |
| 2004/0022676 A1 | 2/2004 | Hamilton et al. |
| 2004/0037739 A1 | 2/2004 | McNeely et al. |
| 2004/0038385 A1 | 2/2004 | Langlois et al. |
| 2004/0053290 A1 | 3/2004 | Terbrueggen et al. |
| 2004/0063217 A1 | 4/2004 | Webster et al. |
| 2004/0072278 A1 | 4/2004 | Chou et al. |
| 2004/0086427 A1 | 5/2004 | Childers et al. |
| 2004/0086870 A1 | 5/2004 | Tyvol et al. |
| 2004/0101966 A1 | 5/2004 | Davis et al. |
| 2004/0115838 A1 | 6/2004 | Quake et al. |
| 2004/0132170 A1 | 7/2004 | Storet et al. |
| 2004/0146452 A1 | 7/2004 | Tadashi et al. |
| 2004/0151349 A1 | 8/2004 | Milne et al. |
| 2004/0151629 A1 | 8/2004 | Pease et al. |
| 2004/0185484 A1 | 9/2004 | Costa et al. |
| 2004/0197845 A1 | 10/2004 | Hassibi et al. |
| 2004/0200724 A1 | 10/2004 | Fujii et al. |
| 2004/0209354 A1 | 10/2004 | Mathies et al. |
| 2004/0217004 A1 | 11/2004 | Hayashizaki et al. |
| 2004/0219533 A1 | 11/2004 | Davis et al. |
| 2004/0224380 A1 | 11/2004 | Chou et al. |
| 2005/0026181 A1 | 2/2005 | Davis et al. |
| 2005/0026300 A1 | 2/2005 | Samper et al. |
| 2005/0042656 A1 | 2/2005 | Davis et al. |
| 2005/0047967 A1 | 3/2005 | Chuang et al. |
| 2005/0053952 A1 | 3/2005 | Hone et al. |
| 2005/0142663 A1 | 6/2005 | Parthasarathy et al. |
| 2005/0161326 A1 | 7/2005 | Morita et al. |
| 2005/0161669 A1 | 7/2005 | Jovanovich et al. |
| 2005/0181394 A1 | 8/2005 | Steemers et al. |
| 2005/0201901 A1 | 9/2005 | Grossman et al. |
| 2005/0221373 A1 | 10/2005 | Engelberger et al. |
| 2005/0224134 A1 | 10/2005 | Yin et al. |
| 2005/0224352 A1 | 10/2005 | Harrison et al. |
| 2005/0241941 A1 | 11/2005 | Parce et al. |
| 2005/0247357 A1 | 11/2005 | Welle |
| 2005/0250199 A1 | 11/2005 | Anderson et al. |
| 2005/0255000 A1 | 11/2005 | Yamamoto et al. |
| 2005/0255003 A1 | 11/2005 | Summersgill et al. |
| 2005/0255007 A1 | 11/2005 | Yamada et al. |
| 2005/0266582 A1 | 12/2005 | Modlin et al. |
| 2005/0287572 A1 | 12/2005 | Mathies et al. |
| 2006/0014177 A1 | 1/2006 | Hogan et al. |
| 2006/0027456 A1 | 2/2006 | Harrison et al. |
| 2006/0040300 A1 | 2/2006 | Dapprich et al. |
| 2006/0057209 A1 | 3/2006 | Chapman et al. |
| 2006/0073484 A1 | 4/2006 | Mathies et al. |
| 2006/0076068 A1 | 4/2006 | Young et al. |
| 2006/0140051 A1 | 6/2006 | Kim et al. |
| 2006/0163143 A1 | 7/2006 | Chirica et al. |
| 2006/0177832 A1 | 8/2006 | Brenner |
| 2006/0186043 A1 | 8/2006 | Covey et al. |
| 2006/0210994 A1 | 9/2006 | Joyce |
| 2006/0210998 A1 | 9/2006 | Kettlitz et al. |
| 2006/0260941 A1 | 11/2006 | Tan et al. |
| 2006/0263789 A1 | 11/2006 | Kincaid |
| 2006/0266645 A1 | 11/2006 | Chen et al. |
| 2006/0292032 A1 | 12/2006 | Hataoka et al. |
| 2007/0015179 A1 | 1/2007 | Klapperich et al. |
| 2007/0017812 A1 | 1/2007 | Bousse |
| 2007/0020654 A1 | 1/2007 | Blume et al. |
| 2007/0031865 A1 | 2/2007 | Willoughby |
| 2007/0034025 A1 | 2/2007 | Pant et al. |
| 2007/0105163 A1 | 5/2007 | Grate et al. |
| 2007/0122819 A1 | 5/2007 | Wu et al. |
| 2007/0175756 A1 | 8/2007 | Nguyen et al. |
| 2007/0183935 A1 | 8/2007 | Clemmens et al. |
| 2007/0184463 A1 | 8/2007 | Molho et al. |
| 2007/0184547 A1 | 8/2007 | Handique et al. |
| 2007/0202531 A1 | 8/2007 | Grover et al. |
| 2007/0204497 A1 | 9/2007 | De La Huerga |
| 2007/0218485 A1 | 9/2007 | Davis et al. |
| 2007/0237686 A1 | 10/2007 | Mathies et al. |
| 2007/0238109 A1 | 10/2007 | Min et al. |
| 2007/0248958 A1 | 10/2007 | Jovanovich et al. |
| 2007/0263049 A1 | 11/2007 | Preckel et al. |
| 2007/0292941 A1 | 12/2007 | Handique et al. |
| 2007/0297947 A1 | 12/2007 | Sommers et al. |
| 2008/0014576 A1 | 1/2008 | Jovanovich et al. |
| 2008/0014589 A1 | 1/2008 | Link et al. |
| 2008/0027756 A1 | 1/2008 | Gabriel et al. |
| 2008/0047836 A1 | 2/2008 | Strand et al. |
| 2008/0064610 A1 | 3/2008 | Lipovsek et al. |
| 2008/0124723 A1 | 5/2008 | Dale et al. |
| 2008/0131904 A1 | 6/2008 | Parce et al. |
| 2008/0138809 A1 | 6/2008 | Kapur et al. |
| 2008/0160630 A1 | 7/2008 | Liu et al. |
| 2008/0179255 A1 | 7/2008 | Jung et al. |
| 2008/0179555 A1 | 7/2008 | Langers et al. |
| 2008/0217178 A1 | 9/2008 | Yitzhak et al. |
| 2008/0237146 A1 | 10/2008 | Harrison et al. |
| 2008/0241844 A1 | 10/2008 | Kellogg |
| 2008/0242560 A1 | 10/2008 | Gunderson et al. |
| 2008/0257437 A1 | 10/2008 | Fernandes et al. |
| 2008/0262474 A1 | 10/2008 | Northrop |
| 2008/0262747 A1 | 10/2008 | Kain et al. |
| 2008/0281090 A1 | 11/2008 | Lee et al. |
| 2008/0302732 A1 | 12/2008 | Soh et al. |

(56) References Cited

U.S. PATENT DOCUMENTS

| | | |
|---|---|---|
| 2008/0307117 A1 | 12/2008 | Muller-Cohn et al. |
| 2008/0311585 A1 | 12/2008 | Gao et al. |
| 2009/0004494 A1 | 1/2009 | Blenke et al. |
| 2009/0011959 A1 | 1/2009 | Costa et al. |
| 2009/0020427 A1 | 1/2009 | Tan et al. |
| 2009/0023603 A1 | 1/2009 | Selden et al. |
| 2009/0026082 A1 | 1/2009 | Rothberg et al. |
| 2009/0035770 A1 | 2/2009 | Mathies et al. |
| 2009/0053799 A1 | 2/2009 | Chang-Yen et al. |
| 2009/0056822 A1 | 3/2009 | Young et al. |
| 2009/0060797 A1 | 3/2009 | Mathies et al. |
| 2009/0084679 A1 | 4/2009 | Harrison et al. |
| 2009/0087850 A1 | 4/2009 | Eid et al. |
| 2009/0092970 A1 | 4/2009 | Williams et al. |
| 2009/0134069 A1 | 5/2009 | Handique |
| 2009/0137413 A1 | 5/2009 | Mehta et al. |
| 2009/0148933 A1 | 6/2009 | Battrell et al. |
| 2009/0155123 A1 | 6/2009 | Williams et al. |
| 2009/0178934 A1 | 7/2009 | Jarvius et al. |
| 2009/0181411 A1 | 7/2009 | Battrell et al. |
| 2009/0183990 A1 | 7/2009 | Shoji et al. |
| 2009/0233325 A1 | 9/2009 | Mori et al. |
| 2009/0253181 A1 | 10/2009 | Vangbo et al. |
| 2009/0269504 A1 | 10/2009 | Liao |
| 2009/0275038 A1 | 11/2009 | Hodge |
| 2009/0286327 A1 | 11/2009 | Cho et al. |
| 2009/0311804 A1 | 12/2009 | McBrady et al. |
| 2009/0314970 A1 | 12/2009 | Mcavoy et al. |
| 2009/0314972 A1 | 12/2009 | Lao et al. |
| 2009/0325183 A1 | 12/2009 | Battrell et al. |
| 2009/0325276 A1 | 12/2009 | Rothberg et al. |
| 2010/0010472 A1 | 1/2010 | Moore |
| 2010/0029915 A1 | 2/2010 | Duthie |
| 2010/0034986 A1 | 2/2010 | Kodas et al. |
| 2010/0035252 A1 | 2/2010 | Jovanovich et al. |
| 2010/0035349 A1* | 2/2010 | Bau .................. G01N 35/0092 422/68.1 |
| 2010/0068723 A1 | 3/2010 | Davis et al. |
| 2010/0075858 A1 | 3/2010 | Davis et al. |
| 2010/0092948 A1 | 4/2010 | Davis et al. |
| 2010/0093068 A1 | 4/2010 | Williams et al. |
| 2010/0111770 A1 | 5/2010 | Hwang et al. |
| 2010/0129810 A1 | 5/2010 | Greiner et al. |
| 2010/0137143 A1 | 6/2010 | Rothberg et al. |
| 2010/0165784 A1 | 7/2010 | Jovanovich et al. |
| 2010/0172898 A1 | 7/2010 | Doyle et al. |
| 2010/0173392 A1 | 7/2010 | Davis et al. |
| 2010/0173398 A1 | 7/2010 | Peterman |
| 2010/0178210 A1 | 7/2010 | Hogan et al. |
| 2010/0197507 A1 | 8/2010 | Rothberg et al. |
| 2010/0209957 A1 | 8/2010 | Hoban et al. |
| 2010/0210008 A1 | 8/2010 | Strand et al. |
| 2010/0218623 A1 | 9/2010 | Eggers et al. |
| 2010/0221726 A1 | 9/2010 | Zenhausern et al. |
| 2010/0228513 A1 | 9/2010 | Roth et al. |
| 2010/0233696 A1 | 9/2010 | Joseph et al. |
| 2010/0243916 A1 | 9/2010 | Maurer et al. |
| 2010/0248363 A1 | 9/2010 | Hogan et al. |
| 2010/0265068 A1 | 10/2010 | Brackmann et al. |
| 2010/0266432 A1 | 10/2010 | Pirk et al. |
| 2010/0285578 A1 | 11/2010 | Selden |
| 2010/0285606 A1 | 11/2010 | Phillips et al. |
| 2010/0285975 A1 | 11/2010 | Mathies et al. |
| 2010/0291666 A1 | 11/2010 | Collier et al. |
| 2010/0303687 A1 | 12/2010 | Blaga et al. |
| 2010/0304355 A1 | 12/2010 | Shuler et al. |
| 2010/0304986 A1 | 12/2010 | Chen et al. |
| 2011/0003301 A1 | 1/2011 | Raymond et al. |
| 2011/0005932 A1 | 1/2011 | Jovanovich et al. |
| 2011/0008785 A1 | 1/2011 | Tan et al. |
| 2011/0008813 A1 | 1/2011 | Dillen et al. |
| 2011/0014606 A1 | 1/2011 | Steinmetzer et al. |
| 2011/0027913 A1 | 2/2011 | Bau et al. |
| 2011/0038758 A1 | 2/2011 | Akaba et al. |
| 2011/0039303 A1 | 2/2011 | Jovanovich et al. |
| 2011/0041935 A1 | 2/2011 | Zhou et al. |
| 2011/0045505 A1 | 2/2011 | Warthoe et al. |
| 2011/0053784 A1 | 3/2011 | Unger et al. |
| 2011/0067098 A1 | 3/2011 | Nelson et al. |
| 2011/0070578 A1 | 3/2011 | Bell et al. |
| 2011/0124049 A1 | 5/2011 | Li et al. |
| 2011/0126910 A1 | 6/2011 | May |
| 2011/0126911 A1 | 6/2011 | Kobrin et al. |
| 2011/0127222 A1 | 6/2011 | Chang-Yen et al. |
| 2011/0136179 A1 | 6/2011 | Bin/Lee et al. |
| 2011/0137018 A1 | 6/2011 | Chang-Yen et al. |
| 2011/0171086 A1 | 7/2011 | Prins et al. |
| 2011/0172403 A1 | 7/2011 | Harrold |
| 2011/0186466 A1 | 8/2011 | Kurowski et al. |
| 2011/0189678 A1 | 8/2011 | McBride et al. |
| 2011/0195495 A1 | 8/2011 | Selden et al. |
| 2011/0206576 A1 | 8/2011 | Woudenberg et al. |
| 2011/0207140 A1 | 8/2011 | Handique et al. |
| 2011/0212440 A1 | 9/2011 | Viovy et al. |
| 2011/0212446 A1 | 9/2011 | Wang et al. |
| 2011/0212466 A1 | 9/2011 | Wang et al. |
| 2011/0223605 A1 | 9/2011 | Bienvenue et al. |
| 2011/0229897 A1 | 9/2011 | Bell et al. |
| 2011/0229898 A1 | 9/2011 | Bell et al. |
| 2011/0256530 A1 | 10/2011 | Hogan |
| 2011/0256551 A1* | 10/2011 | Linder .............. B01L 3/502738 435/7.1 |
| 2011/0312614 A1 | 12/2011 | Selden et al. |
| 2012/0055798 A1 | 3/2012 | Salden et al. |
| 2012/0100522 A1 | 4/2012 | Saghbini et al. |
| 2012/0181460 A1 | 7/2012 | Eberhart et al. |
| 2012/0240127 A1 | 9/2012 | Brittenham et al. |
| 2012/0267247 A1 | 10/2012 | Tan et al. |
| 2012/0279638 A1 | 11/2012 | Zhou et al. |
| 2012/0290648 A1 | 11/2012 | Sharkey |
| 2012/0308987 A1 | 12/2012 | Hogan et al. |
| 2012/0309637 A1 | 12/2012 | Schumm et al. |
| 2012/0315635 A1 | 12/2012 | Vangbo et al. |
| 2012/0322666 A1 | 12/2012 | Pham et al. |
| 2013/0032483 A1* | 2/2013 | Tan .................. G01N 27/44791 204/603 |
| 2013/0053255 A1 | 2/2013 | Bangbo et al. |
| 2013/0074944 A1 | 3/2013 | Van |
| 2013/0084565 A1 | 4/2013 | Landers et al. |
| 2013/0105017 A1 | 5/2013 | Zhou et al. |
| 2013/0115607 A1 | 5/2013 | Nielsen et al. |
| 2013/0131994 A1 | 5/2013 | Birdwell et al. |
| 2013/0210126 A1 | 5/2013 | Selden et al. |
| 2013/0139895 A1 | 6/2013 | Vangbo |
| 2013/0202182 A1 | 8/2013 | Rowe |
| 2013/0203634 A1 | 8/2013 | Jovanovich et al. |
| 2013/0209326 A1 | 8/2013 | Williams et al. |
| 2013/0210129 A1 | 8/2013 | Selden et al. |
| 2013/0213810 A1 | 8/2013 | Tan et al. |
| 2013/0215116 A1 | 8/2013 | Siddique et al. |
| 2013/0217026 A1 | 8/2013 | Egan et al. |
| 2013/0224846 A1* | 8/2013 | Jovanovich ...... G01N 27/44721 435/287.2 |
| 2013/0230906 A1 | 9/2013 | Martinelli et al. |
| 2013/0240140 A1 | 9/2013 | Kurowski et al. |
| 2013/0260380 A1 | 10/2013 | Hall et al. |
| 2013/0287645 A1 | 10/2013 | Shaikh et al. |
| 2013/0336545 A1 | 12/2013 | Pritikin et al. |
| 2013/0344475 A1 | 12/2013 | Jovanovich et al. |
| 2014/0045704 A1 | 2/2014 | Jovanovich et al. |
| 2014/0065628 A1 | 3/2014 | Van et al. |
| 2014/0065689 A1 | 3/2014 | Hogan et al. |
| 2014/0073043 A1 | 3/2014 | Holmes |
| 2014/0081657 A1 | 3/2014 | Neuvonen et al. |
| 2014/0161686 A1 | 6/2014 | Bort et al. |
| 2014/0170645 A1 | 6/2014 | Jovanovich et al. |
| 2014/0186841 A1 | 7/2014 | Zenhausern et al. |
| 2014/0246618 A1 | 9/2014 | Zhou et al. |
| 2014/0370519 A1 | 12/2014 | Vangbo et al. |
| 2015/0021502 A1 | 1/2015 | Vangbo |
| 2015/0024436 A1 | 1/2015 | Eberhart et al. |
| 2015/0025915 A1 | 1/2015 | Lekas |
| 2015/0078552 A1 | 3/2015 | Perlin |
| 2015/0088772 A1 | 3/2015 | Shwartz et al. |

(56) References Cited

U.S. PATENT DOCUMENTS

| | | |
|---|---|---|
| 2015/0121522 A1 | 4/2015 | Guido |
| 2015/0136602 A1 | 5/2015 | Jovanovich et al. |
| 2015/0136604 A1 | 5/2015 | Nielsen et al. |
| 2015/0210999 A1* | 7/2015 | Sahoyama ............ C12N 15/101 204/601 |
| 2016/0016140 A1 | 1/2016 | Jovanovich et al. |
| 2016/0053314 A1 | 2/2016 | Jovanovich et al. |
| 2016/0096176 A1 | 4/2016 | Jarvius et al. |
| 2016/0116439 A1 | 4/2016 | Kindwall et al. |
| 2016/0175840 A1 | 6/2016 | Ingber et al. |
| 2016/0305972 A1 | 10/2016 | Ogg |
| 2016/0367981 A1 | 12/2016 | Wunderle et al. |
| 2017/0002399 A1 | 1/2017 | Eberhart et al. |
| 2017/0016853 A1* | 1/2017 | Maher .............. G01N 27/44791 |
| 2017/0109593 A1 | 4/2017 | Schueren et al. |
| 2017/0160229 A1* | 6/2017 | Yu .................... G01N 27/44747 |
| 2017/0176385 A1 | 6/2017 | Walton |
| 2017/0197213 A1 | 7/2017 | Neilsen et al. |
| 2018/0262557 A1 | 9/2018 | Schueren et al. |
| 2018/0293680 A1 | 10/2018 | Schueren et al. |

FOREIGN PATENT DOCUMENTS

| | | |
|---|---|---|
| CN | 1354692 A | 6/2002 |
| CN | 1593338 A | 3/2005 |
| CN | 101004423 A | 7/2007 |
| CN | 101312759 A | 11/2008 |
| CN | 101553306 A | 10/2009 |
| CN | 102459565 A | 5/2012 |
| EP | 0 455 971 A1 | 3/1991 |
| EP | 0 459 241 B1 | 10/1994 |
| EP | 0 637 999 A1 | 2/1995 |
| EP | 0 527 905 B1 | 11/1995 |
| EP | 1 065 378 B1 | 4/2002 |
| EP | 1 411 340 A2 | 4/2004 |
| EP | 1 411 340 A3 | 5/2004 |
| EP | 1 706 735 A2 | 10/2006 |
| EP | 1 367 388 | 12/2006 |
| EP | 1 658 890 B1 | 5/2008 |
| EP | 2 345 739 A2 | 7/2011 |
| EP | 2 418 840 | 2/2012 |
| EP | 2418480 A2 | 2/2012 |
| EP | 1 537 412 B1 | 1/2013 |
| JP | H10206384 A | 8/1998 |
| JP | H11248679 | 9/1999 |
| JP | 2003536058 A | 12/2003 |
| JP | 2004025159 A | 1/2004 |
| JP | 2004108285 A | 4/2004 |
| JP | 2004180594 A | 7/2004 |
| JP | 2005323519 A | 11/2005 |
| JP | 2005337415 A | 12/2005 |
| JP | 2005345463 A | 12/2005 |
| JP | 2007155491 A | 6/2007 |
| JP | 2007198765 A | 8/2007 |
| JP | 2008513022 A | 5/2008 |
| WO | 1996/04547 A1 | 5/1996 |
| WO | 1998/52691 A1 | 11/1998 |
| WO | 1998/53300 A2 | 11/1998 |
| WO | 1998/53300 A3 | 2/1999 |
| WO | 1999/36766 A1 | 7/1999 |
| WO | 1999/40174 A1 | 8/1999 |
| WO | 2000/40712 A1 | 7/2000 |
| WO | 2000/60362 A1 | 10/2000 |
| WO | 2000/61198 A1 | 10/2000 |
| WO | 2001/01025 A2 | 1/2001 |
| WO | 2001/02846 | 1/2001 |
| WO | 2001/38865 A1 | 5/2001 |
| WO | 2001/01025 A3 | 7/2001 |
| WO | 2001/85341 A1 | 11/2001 |
| WO | 2002/24949 A1 | 3/2002 |
| WO | 2002/41995 A1 | 5/2002 |
| WO | 2002/43615 A2 | 6/2002 |
| WO | 2002/059592 | 8/2002 |
| WO | 2002/43615 A3 | 3/2003 |
| WO | 2003/062462 A2 | 7/2003 |
| WO | 2003/085379 A2 | 10/2003 |
| WO | 2003/085379 A3 | 12/2003 |
| WO | 2004/038363 A2 | 5/2004 |
| WO | 2004/061085 A2 | 7/2004 |
| WO | 2004/062804 A1 | 7/2004 |
| WO | 2004/080597 A1 | 9/2004 |
| WO | 2004/092721 | 10/2004 |
| WO | 2004/098757 A2 | 11/2004 |
| WO | 2004/038363 A3 | 12/2004 |
| WO | 2005/072858 A1 | 8/2005 |
| WO | 2005/075081 A1 | 8/2005 |
| WO | 2005/121308 A1 | 12/2005 |
| WO | 2005/123950 A2 | 12/2005 |
| WO | 2006/032044 A2 | 3/2006 |
| WO | 2004/098757 A3 | 5/2006 |
| WO | 2007/002579 A2 | 1/2007 |
| WO | 2007/064635 A1 | 6/2007 |
| WO | 2007/082480 A1 | 7/2007 |
| WO | 2008/012104 A2 | 1/2008 |
| WO | 2008/024319 A3 | 2/2008 |
| WO | 2008/030631 A2 | 3/2008 |
| WO | 2008/039875 A1 | 4/2008 |
| WO | 2008/012014 A3 | 5/2008 |
| WO | 2008/115626 A2 | 9/2008 |
| WO | 2008/115626 A3 | 11/2008 |
| WO | 2009/008236 A1 | 1/2009 |
| WO | 2009/015296 A1 | 1/2009 |
| WO | 2007/002579 A3 | 9/2009 |
| WO | 2009/108260 A2 | 9/2009 |
| WO | 2009/129415 A1 | 10/2009 |
| WO | 2009/108260 A3 | 12/2009 |
| WO | 2010/041174 A1 | 4/2010 |
| WO | 2010/0041231 A2 | 4/2010 |
| WO | 2010/042784 A3 | 7/2010 |
| WO | 2010/077322 A1 | 7/2010 |
| WO | 2010/041231 A3 | 9/2010 |
| WO | 2010/109392 A1 | 9/2010 |
| WO | 2010/121326 A1 | 10/2010 |
| WO | 2010/130762 A2 | 11/2010 |
| WO | 2010/141921 A1 | 12/2010 |
| WO | 2011/003941 A1 | 1/2011 |
| WO | 2011/011172 A1 | 1/2011 |
| WO | 2010/13076 A3 | 2/2011 |
| WO | 2011/012621 A1 | 2/2011 |
| WO | 2011/034621 A2 | 3/2011 |
| WO | 2011/056215 A1 | 5/2011 |
| WO | 2011/068762 A1 | 6/2011 |
| WO | 2011/084703 A2 | 7/2011 |
| WO | 2011/094577 A2 | 8/2011 |
| WO | 2011/123801 A1 | 10/2011 |
| WO | 2011/034621 A3 | 11/2011 |
| WO | 2011/084703 A3 | 12/2011 |
| WO | 2011/150232 A1 | 12/2011 |
| WO | 2012/024657 A1 | 2/2012 |
| WO | 2012/024658 A2 | 2/2012 |
| WO | 2012/027175 A2 | 3/2012 |
| WO | 2012027567 A1 | 3/2012 |
| WO | 2012/136333 A2 | 10/2012 |
| WO | 2013/028643 A1 | 2/2013 |
| WO | 2013/049071 A2 | 4/2013 |
| WO | 2013/059750 A1 | 4/2013 |
| WO | 2013/130910 A1 | 9/2013 |
| WO | 2014/014587 A2 | 1/2014 |
| WO | 2014/055936 A1 | 4/2014 |
| WO | 2015/073399 A1 | 5/2015 |
| WO | 2015/073999 A1 | 5/2015 |
| WO | 2015/078998 A1 | 6/2015 |
| WO | 2015/134925 A1 | 9/2015 |
| WO | 2015/179098 A1 | 11/2015 |
| WO | 2016/176671 A2 | 11/2016 |
| WO | 2017/053462 A1 | 3/2017 |

(56) References Cited

FOREIGN PATENT DOCUMENTS

| WO | 2017/059356 A1 | 4/2017 |
|---|---|---|
| WO | 2017/069856 A1 | 4/2017 |

OTHER PUBLICATIONS

European search report with written opinion dated Jul. 12, 2017 for EP14861199.
Extended European Search Report dated Aug. 16, 2018 issued in Application No. EP 16787296.9 [ITGXP002EP].
Figarelli, Vince, "The Arizona DPS Rapid DNA Program," [Slides] Aug. 31, 2014, XP055497564, pp. 1-46. [retrieved on Aug. 6, 2018] <URL:https://integenx.comjwp-contentjuploadsj2014/08/Figarelli-ASCLD-Rapid-DNA_2014.pdf>.
First Examination Report dated Oct. 9, 2018, issued in Application No. 14861199.9.
Integenx, [Internet Article] "Announces First State-Wide deployment of the RapidHIT System with SmallPond(Trademark) at Arizona Department of Public Safety" Cases, Press Release, May 14, 2014. [retrieved on. Aug. 6, 2018] <URL:https://integenx.comjintegenx-announce s-first-state-wide-deployment-of-the-rapid hit-system-with-smallpond-at-arizona-department of-public-safety/> figures 1- 3.
International Preliminary Report of Patentability issued in Application No. PCT/US15/28510 dated Dec. 1, 2016.
International Preliminary Report of Patentability issued in Application No. PCT/US2016/037711 dated Dec. 19, 2017.
International Preliminary Report on Patentability dated Apr. 12, 2018 issued in Application No. PCT/US2016/054994 [ITGXP004WO].
International Preliminary Report on Patentability dated Apr. 5, 2018 issued in Application No. PCT/US2016/052930 [ITGXP003WO].
International Preliminary Report on Patentability dated May 3, 2018 issued in Application No. PCT/US2016/050003 [ITGXP001WOC1].
International Preliminary Report on Patentability dated Nov. 9, 2017 issued in Application No. PCT/US2016/030331 [ITGXP002WO].
International Preliminary Report on Patentability, issued in PCT Application No. PCT/US14/66008, dated May 24, 2016.
International Search Report and Written Opinion dated Jan. 12, 2017 issued in Application No. PCT/US16/50003 [ITGXP001WOC1].
International Search Report and Written Opinion dated Jan. 19, 2017 issued in Application No. PCT/US16/54994 [ITGXP004WO].
International Search Report and Written Opinion dated Oct. 28, 2016 issued in Application No. PCT/US16/30331 [ITGXP002WO].
International Search Report and Written Opinion issued in Application No. PCT/US2016/037711 dated Sep. 16, 2016.
International Search Report dated Dec. 9, 2016 issued in Application No. PCT/US16/52930 [ITGXP003WO].
Lai et al., Design and dynamic characterization of "single-stroke" peristaltic PDMS micropumps, Lab Chip. Jan. 21, 2011; 11(2): 336-342, Published online Oct. 19, 2010.
Tanaka et al., An active valve incorporated into a microship using a high strain electroactive polymer, Sensors and Actuators B 184 (2013) 163-169, Apr. 20, 2013.
Wikipedia: "Extract, transform, load" [Internet Article] Apr. 25, 2015. XP055497574., pp. 1-10. [retrieved on Aug. 6, 2018] <URL:https:jjen.wikipedia.orgjwjindex.php?title=Extract.transform.load&oldid=659213002>.
Wikipedia: "Mobile Web," [Internet Article] Mar. 27, 2015, XP055497568, pp. 1-5. [retrieved on Aug. 6, 2018] <URL:https:jjen.wikipedia.orgjwjindex.php?title=Mobile Web&oldid=653815098>.
Wikipedia: "Unified communications," [Internet Article] Apr. 16, 2015, XP055497572., pp. 1-5. [retrieved on Aug. 6, 2018] <URL:https:jjen.wikipedia.orgjwjindex.php?title=Unified communications&oldid=656726520>.
Extended European Search Report dated Apr. 6, 2018, issued in EP Application No. 15851818.3.
Co-pending U.S. Appl. No. 15/342,914, filed Nov. 3, 2016.
European Search Report and Written Opinion dated Jul. 12, 2017, issued in EP Application No. 14861199.
Notice of Allowance dated Jun. 9, 2017, issued in U.S. Appl. No. 14/824,333.
Notice of Allowance dated Jun. 12, 2017, issued in U.S. Appl. No. 14/804,675.
Notice of Allowance dated Jun. 22, 2017, issued in U.S. Appl. No. 14/824,333.
International Search Report and Written Opinion dated Jan. 29, 2016, issued in PCT Application No. PCT/US2018/56764.
Co/pending U.S. Appl. No. 14/919,620, filed Oct. 21, 2015.
Co/pending U.S. Appl. No. 15/037,039, filed May 16, 2016.
Co/pending U.S. Appl. No. 15/117,053, filed Aug. 5, 2016.
Co/pending U.S. Appl. No. 15/154,086, filed May 13, 2016.
Amendment and Request for Correction of Inventorship mailed Jan. 10, 2008 in U.S. Appl. No. 10/750,533.
Anderson, et al. A miniature integrated device for automated multistep genetic assays. Nucleic Acids Research. 2000;28:e60.
Armani, et al. Re-configurable fluid circuits by PDMS elastomer micromachining. Proceedings of IEEE Micro Electro Mechanical Systems: MEMS. 1999; 222-227.
Bennett, et al. Toward the 1,000 dollars human genome. Pharmacogenomics, 6 (4) 373-382. (Jun. 2005).
Bings, et al. Microfluidic Devices Connected to Fused-Silica Capillaries with Minimal Dead vol. Analytical Chemistry. 1999;71(15):3292-3296.
Blaze J, et al. Microfabricated bioprocessor for integrated nanoliter-scale Sanger DNA sequencing. Proc. Natl. Acad. Sci. USA 2006; 103:7240-7245.
Blaze J, et al. Polymorphism Ratio Sequencing: A New Approach for Single Nucleotide Polymorphism Discovery and Genotyping. Genome Research. 2003;13:287-293.
Branton, et al. The potential and challenges of nanopore sequencing. Nat Biotechnol. Oct. 2008; 26(10):1146-53. doi: 10.1038/nbt.1495.
Brenner, et al. Gene expression analysis by massively parallel signature sequencing (MPSS) on microbead arrays. Nature Biotechnology, 18: 630-634 (2000).
Buchholz, et al. The use of light scattering for precise characterization of polymers for DNA sequencing by capillary electrophoresis. Electrophoresis. 2001;22:4118-4128.
Caplus abstract of Krohkin et al. Modified silica as a stationary phase for ion chromatography. Journal of Chromatography A. 1995;706:93-8.
Chan, et al. Microfabricated Polymer Devices for Automated Sample Delivery of Peptides for Analysis by Electrospray Ionization Tandem Mass Spectrometry. Analytical Chemistry. 1999;71(20):4437-4444.
Chiem, et al. Microchip systems for immunoassay: an integrated immunoreactor with electrophoretic separation for serum theophylline determination. Clinical Chemistry. 1998;44(3):591-598.
Chiem, et al. Room temperature bonding of micromachined glass devices for capillary electrophoresis. Sensors and Actuators. 2000;B63(3):147-152.
Chinese office action dated Jan. 31, 2011 for CN 200580035911.7. (In Chinese with English translation).
Chinese office action dated Jul. 8, 2011 for CN 200580035911.7. (In Chinese with English translation).
Coleman, et al. A sequential injection microfluidic mixing strategy. Microfluidics and Nanofluidics. 2005;319-327.
Curcio, et al. Continuous Segmented-Flow Polymerase Chain Reaction for High-Throughput Miniaturized DNA Amplification. Analytical Chemistry. 2003;75(1):1-7.
Datasheet Cycle Sequencing, Retrieved from the internet, URL:http/answers.com/topic/cycle sequencing. Printed Sep. 3, 2010, pp. 1-2.
Diehl et al. BEAMing: single-molecule PCR on microparticles in water-in-oil emulsions. Nature Methods 3(7):551-559 (2006).
Doherty, et al. Sparsely Cross-linked "Nanogel" Matrices as Fluid, Mechanically Stabilized Polymer Networks for High-Throughput Microchannel DNA Sequencing. Analytical Chemistry. 2004;76:5249-5256.
Doherty, et al. Sparsely cross-linked "nanogels" for microchannel DNA sequencing. Electrophoresis. 2003;24(24):4170-4180.
Dorfman, et al. Contamination-Free Continuous Flow Microfluidic Polymerase Chain Reaction for Quantitative and Clinical Applications. Analytical Chemistry. 2005;77(11):3700-3704.

(56) References Cited

OTHER PUBLICATIONS

Doyle, et al. Self-Assembled Magnetic Matrices for DNA Separation Chips. Science. 2000;295:2237.
Dressman, et al. Transforming single DNA molecules into fluorescent magnetic particles for detection and enumeration of genetic variations. Proc Natl Acad Sci USA. 2003;100(15):8817-8822.
Eid, et al. Real-time DNA sequencing from single polymerase molecules. Science. Jan. 2, 2009; 323(5910):133-8. doi: 10.1126/science. 1162986. Epub Nov. 20, 2008.
Emrich, et al. Microfabricated 384-Lane Capillary Array Electrophoresis Bioanalyzer for Ultrahigh-Throughput Genetic Analysis. Analytical Chemistry. 2002;74(19):5076-5083.
Ericson, et al. Electroosmosis- and Pressure-Driven Chromatography in Chips Using Continuous Beds. Analytical Chemistry. 2000;72(1):81-87.
Erratum for Margulies, et al. Genome sequencing in microfabricated high-density picolitre reactors. Nature. 2005;437(7057):376-80.
European search report and search opinion dated Jun. 6, 2011 for Application No. 10011511.2.
European search report and search opinion dated Jun. 22, 2016 for EP Application No. 11818879.6.
European search report and search opinion dated Aug. 17, 2011 for Application No. 08799648.4.
European search report and search opinion dated Sep. 11, 2013 for EP Application No. 10784213.
European search report dated Jul. 13, 2016 for EP Application No. 09714332.5.
European search report dated Oct. 29, 2012 for EP Application No. 07853470.8.
European search report dated Dec. 18, 09 for Application No. 03808583.3.
European search report dated Sep. 1, 2010 for Application No. 5804847.1.
Ewing, et al. Base-Calling of Automated Sequencer Traces Using Phred. I. Accuracy Assessment. Genome Research. 1998;8:175-185.
Ewing, et al. Base-Calling of Automated Sequencer Traces Using Phred. II. Error probabilities. Genome Research. 1998;8:186-194.
Figeys, et al. A Microfabricated Device for Rapid Protein Identification by Microelectrospray Ion Trap Mass Spectrometry. Analytical Chemistry. 1997;69(16):3153-3160.
Figeys, et al. An Integrated Microfluidics-Tandem Mass Spectrometry System for Automated Protein Analysis. Analytical Chemistry. 1998;70(18):3728-3734.
Figeys, et al. Microfabricated Device Coupled with an Electrospray Ionization Quadrupole Time-of-Flight Mass Spectrometer: Protein Identifications Based on Enhanced-Resolution Mass Spectrometry and Tandem Mass Spectrometry Data. Rapid Communications In Mass Spectrometry. 1998;12:1435-1444.
Figeys, et al. Nanoflow Solvent Gradient Delivery from a Microfabricated Device for Protein Identifications by Electrospray Ionization Mass Spectrometry. Analytical Chemistry. 1998;70(18):3721-3727.
Francis, et al. Flow analysis based on a pulsed flow of solution: theory, instrumentation and applications. Talanta. 2002;58(6):1029-1042.
Fuentes, et al. Detecting minimal traces of DNA using DNA covalently attached to superparamagnetic nanoparticles and direct PCR-ELISA. Biosens Bioelectron. Feb. 1, 20065;21(8):1574-80. Epub Aug. 29, 2005.
Fuller, et al. The challenges of sequencing by synthesis. Nat Biotechnol. Nov. 2009; 27(11):1013-23. doi: 10.1038/nbt.1585. Epub Nov. 6, 2009.
Ghadessy, et al. Directed evolution of polymerase function by compartmentalized selfreplication. Proc Natl Acad Sci USA. 2001;98:4552-4557.
Giddings, et al. A software system for data analysis in automated DNA sequencing. Genome Research. 1998;8:644-665.
Goll, et al. Microvalves with bistable buckled polymer diaphragms. Journal of Micromechanics and Microengineering. 1996;6:77-79.
Grodzinski, et al. Microfluidic System Integration in Sample Preparation Chip-Sets—a Summary. Conf. Proc. IEEE Eng. Med. Biol. Soc. 2004;4:2615-2618.
Grover, et al. An integrated microfluidic processor for single nucleotide polymorphism-based DNA computing. Lab on a Chip. 2005;5(10):1033-1040.
Grover, et al. Development and multiplexed control of latching pneumatic valves using microfluidic logical structures. Lab on a chip. 2006;6:623-631.
Grover, et al. Monolithic membrane valves and diaphragm pumps for practical large-scale integration into glass microfluidic devices. Sensors and Actuators. 2003;689:315-323.
Grover, et al. Practical Valves and Pumps for Large-Scale Integration into Microfludic Analysis Devices. Micro Total Analysis Systems. 2002;1:136-138.
Hansen, et al. A robust and scalable microfluidic metering method that allows protein crystal growth by free interface diffusion. Proc Natl Acad Sci USA. 2002;99(26):16531-16536.
Harrison, et al. Micromachining a Miniaturized Capillary Electrophoresis-Based Chemical Analysis System on a Chip. Science. 1993;261(5123):895-897.
Hayes, et al. Edge: A Centralized Resource for the Comparison, Analysis, and Distribution of Toxicogenomic Information. Molecular Pharmacology. 2005;67(4):1360-1368.
Heath, et al. PCR primed with VNTR core sequences yields species specific patterns and hypervariable probes. Nucleic Acids Res. Dec. 11, 1993;21(24):5782-5.
Holland, et al. Point-of-care molecular diagnostic systems—past, present and future. Curr Opin Microbiol. Oct. 2005; 8(5):504-9.
Hultman, et al. Bidirectional Solid-Phase Sequencing of In Vitro-Amplified Plasmid DNA. BioTechniques. 1991;10(1):84-93.
International Preliminary Report for corresponding PCT Application No. PCT/CA2000/001421 dated Feb. 14, 2002.
International Preliminary Report for corresponding PCT Application No. PCT/US2005/018678 dated Nov. 13, 2007.
International Preliminary Report for corresponding PCT Application No. PCT/US2005/033347 dated Mar. 20, 2007.
International Preliminary Report for corresponding PCT Application No. PCT/US2007/007381 dated Sep. 23, 2008.
International Preliminary Report for corresponding PCT Application No. PCT/US2007/002721 dated Aug. 5, 2008.
International Preliminary Report for corresponding PCT Application No. PCT/US2007/061573 dated Aug. 26, 2008.
International search report and written opinion dated Jan. 5, 2012 for PCT Application No. PCT/US2011/048527.
International search report and written opinion dated Mar. 3, 2015 for PCT Application No. PCT/US2014/066008.
International search report and written opinion dated Mar. 8, 2013 for PCT/US2012/061223.
International search report and written opinion dated Mar. 24, 2011 for PCT Application No. PCT/US2010/58227.
International search report and written opinion dated Apr. 30, 2012 for PCT/US2012/021217.
International search report and written opinion dated Jun. 9, 2011 for PCT Application No. PCT/US2011/30973.
International search report and written opinion dated Jul. 22, 2013 for PCT Application No. PCT/US2013/028462.
International search report and written opinion dated Sep. 1, 2010 for PCT Application No. PCT/US2010/040490.
International search report and written opinion dated Oct. 26, 2011 for PCT Application No. PCT/US11/38180.
International search report and written opinion dated Oct. 26, 2015 for PCT/US2015/028510.
International search report dated Oct. 6, 2010 for PCT Application No. PCT/US10/37545.
International search report dated Apr. 5, 2001 for PCT Application No. PCT/CA2000/001421.
International search report dated May 14, 2010 for PCT Application No. PCT/US2009/006640.
International search report dated Jul. 11, 2008 for PCT Application No. PCT/US07/61573.
International search report dated Jul. 30, 2010 for PCT Application No. PCT/US2010/036464.

(56) References Cited

OTHER PUBLICATIONS

International search report dated Aug. 18, 2009 for PCT Application No. PCT/US09/00419.
International search report dated Aug. 23, 2006 for PCT Application No. PCT/US2005/033347.
International search report dated Aug. 26, 2004 PCT Application No. PCT/US2003/041466.
International search report dated Sep. 25, 2007 for PCT Application No. PCT/US2007/002721.
International written opinion dated Oct. 6, 2010 for PCT Application No. PCT/US10/37545.
International written opinion report dated Jul. 30, 2010 for PCT Application No. PCT/US2010/036464.
Jacobson, et al. Electrokinetic Focusing in Microfabricated Channel Structures. Anal. Chem., 1997, 69 (16), pp. 3212-3217.
Japanese office action dated May 11, 2012 for Application No. 2008-553535 (English translation).
Japanese office action dated May 27, 2011 for Application No. 2007-532553 (in Japanese with English translation).
Japanese office action dated Jul. 28, 2011 for Application No. 2008-553535 (in Japanese with English translation).
Japanese Office Action dated Dec. 21, 2010 for Application No. JP2001-540363 (in Japanese with English translation).
Japanese Office Action dated Apr. 27, 2010 for Application No. JP2001-540363 (in Japanese with English translation).
Ju, et al. Fluorescence energy transfer dye-labeled primers for DNA sequencing and analysis. Proc. Natl. Acad. Sci. USA. 1995; 92:4347-4351.
Kan, et al. A novel thermogelling matrix for microchannel DNA sequencing based on poly-Nalkoxyalkylaclylamide copolymers. Electrophoresis. 2003;24(24):4161-4169.
Koh, et al. Integrating Polymerase Chain Reaction, Valving, and Electrophoresis in a Plastic Device for Bacterial Detection. Analytical Chemistry. 2003;75(17):4591-4598.
Kopp, et al. Chemical Amplification Continuous-Flow PCR on a Chip. Science. 1998;280:1046-1048.
Krsek, et al. Comparison of different methods for the isolation and purification of total community DNA from soil. Journal of Microbiological Methods 39.1 (1999): 1-16.
Lagally, et al. Fully integrated PCR-capillary electrophoresis microsystem for DNA analysis. Lab on a Chip. 2001;1(2):102-107.
Lagally, et al. Integrated Portable Genetic Analysis Microsystem for Pathogen/Infectious Disease Detection. Analytical Chemistry. 2004;76:3162-3170.
Lagally, et al. Monolithic integrated microfluidic DNA amplification and capillary electrophoresis analysis system. Sensors and Actuators. 2000;663(3)138-146.
Lagally, et al. Single-Molecule DNA Amplification and Analysis in an Integrated Microfluidic Device. Analytical Chemistry. 2001;73(3):565-570.
Lazar, et al. Subattomole-Sensitivity Microchip Nanoelectrospray Source with Time-of-Flight Mass Spectrometry Detection. Analytical Chemistry. 1999;71(17):3627-3631.
Li, et al. Integration of Microfabricated Devices to Capillary Electrophoresis-Electrospray Mass Spectrometry Using a Low Dead Volume Connection: Application to Rapid Analyses of Proteolytic Digests. Analytical Chemistry. 1999;71(15):3036-3045.
Li, et al. Rapid and sensitive separation of trace level protein digests using microfabricated devices coupled to a quadrupole—time-of-flight mass spectrometer. Electrophoresis. 2000; 21:198-210.
Li, et al. Separation and Identification of Peptides from Gel-Isolated Membrane Proteins Using a Microfabricated Device for Combined Capillary Electrophoresis/Nanoelectrospray Mass Spectrometry. Analytical Chemistry. 2000;72(3):599-609.
Licklider, et al. A Micromachined Chip-Based Electrospray Source for Mass Spectrometry. Analytical Chemistry. 2000;72(2):367-375.
Lisec, et al. A bistable pneumatic microswitch for driving fluidic components. Sensors and Actuators. 1996;A54:746-749.
Liu, et al. Automated parallel DNA sequencing on multiple channel microchips. Proc. Natl. Acad. Sci. USA. 2000;97(10):5369-5374.

Liu, et al. Optimization of High-Speed DNA Sequencing on Microfabricated Capillary Electrophoresis Channels. Analytical Chemistry. 1999;71:566-573.
Lund-Olesen, et al. Capture of DNA in microfluidic channel using magnetic beads: Increasing capture efficiency with integrated microfluidic mixer. Journal of Magnetism and Magnetic Materials 311 (2007): 396-400.
Mamanova, et al. FRT-seq: amplification-free, strand-specific transcriptome sequencing. Nat Methods. Feb. 2010;7(2):130-2. doi: 10.1038/nmeth.1417. Epub Jan. 17, 2010.
Melin, et al. A Passive 2-Dimensional Liquid Sample Micromixer. 7th International Conference on Miniaturized Chemical and Biochemical Analysis Systems. 2003;167-170.
Metzker, M. Sequencing technologies—the next generation. Nat Rev Genet. Jan. 2010; 11(1):31-46. doi: 10.1038/nrg2626. Epub Dec. 8, 2009.
MillGat pump user manual, version 2.12, published 2005, pp. 1-28.
Mitra, et al. Digital genotyping and haplotyping with polymerase colonies. Proc Natl Acad Sci USA. 2003.100(10):15926-5931.
Norris, et al. Fully-integrated, multiplexed STR-based human identification using a single microfluidic chip and automated instrument. Available at http://www.promega.com/geneticidproc/ussymp2Oproc/oralpresentations/landersbienvenue.pdf. Accessed Jun. 2, 2010.
Notice of allowance dated Jan. 31, 2017 for U.S. Appl. No. 14/552,389.
Notice of allowance dated Feb. 19, 2013 for U.S. Appl. No. 12/845,650.
Notice of allowance dated Apr. 25, 2013 for U.S. Appl. No. 12/815,685.
Notice of allowance dated May 3, 2010 for U.S. Appl. No. 11/670,866.
Notice of allowance dated May 5, 2015 for U.S. Appl. No. 13/202,884.
Notice of allowance dated Jun. 9, 2011 for U.S. Appl. No. 12/831,949.
Notice of allowance dated Jun. 25, 2014 for U.S. Appl. No. 13/656,503.
Notice of allowance dated Jul. 8, 2013 for U.S. Appl. No. 13/717,585.
Notice of allowance dated Nov. 12, 2014 for U.S. Appl. No. 13/967,957.
Notice of allowance dated Nov. 22, 2013 for U.S. Appl. No. 13/590,965.
Notice of allowance dated Dec. 7, 2012 for U.S. Appl. No. 12/795,515.
Obeid, et al. Microfabricated Device for DNA and RNA Amplification by Continuous-Flow Polymerase Chain Reaction and Reverse Transcription-Polymerase Chain Reaction with Cycle No. Selection. Analytical Chemistry. 2003;75(2): 288-295.
Ocvirk, et al. High Performance Liquid Chromatography Partially Integrated onto a Silicon Chip. Analytical Methods and Instrumentation. 1995;2:74-82.
Ocvirk, et al. Optimization of confocal epifluorescence microscopy for microchip-based miniaturized total analysis systems. The Analyst. 1998;123:1429-1434.
Office action dated Jan. 13, 2017 for U.S. Appl. No. 14/253,622.
Office action dated Jan. 17, 2014 for U.S. Appl. No. 13/656,503.
Office action dated Jan. 22, 2013 for U.S. Appl. No. 12/845,650.
Office action dated Feb. 14, 2017 for U.S. Appl. No. 14/804,675.
Office action dated Feb. 28, 2013 for U.S. Appl. No. 13/113,968.
Office action dated Mar. 19, 2009 for U.S. Appl. No. 11/670,866.
Office action dated Mar. 24, 2010 for U.S. Appl. No. 11/670,866.
Office action dated Mar. 24, 2015 for U.S. Appl. No. 13/202,884.
Office action dated Mar. 30, 2012 for U.S. Appl. No. 12/795,515.
Office action dated Apr. 1, 2014 for U.S. Appl. No. 13/202,884.
Office action dated Apr. 15, 2015 for U.S. Appl. No. 13/896,581.
Office action dated May 22, 2012 for U.S. Appl. No. 12/526,015.
Office action dated May 30, 2014 for U.S. Appl. No. 13/656,503.
Office action dated Jul. 1, 2016 for U.S. Appl. No. 14/253,622.
Office action dated Jul. 26, 2012 for U.S. Appl. No. 12/845,650.
Office action dated Aug. 9, 2016 for U.S. Appl. No. 14/500,846.
Office action dated Aug. 23, 2012 for U.S. Appl. No. 13/287,398.
Office action dated Aug. 24, 2012 for U.S. Appl. No. 12/026,510.
Office action dated Aug. 29, 2012 for U.S. Appl. No. 12/605,217.
Office action dated Sep. 11, 2014 for U.S. Appl. No. 13/967,957.
Office action dated Sep. 15, 2014 for U.S. Appl. No. 13/886,068.
Office action dated Oct. 29, 2013 for U.S. Appl. No. 13/202,884.
Office action dated Nov. 14, 2012 for U.S. Appl. No. 12/526,015.

(56) References Cited

OTHER PUBLICATIONS

Office action dated Dec. 29, 2016 for U.S. Appl. No. 14/824,333.
Office action dates Jan. 15, 2014 for U.S. Appl. No. 12/321,594.
Office action dates Feb. 27, 2013 for U.S. Appl. No. 13/590,965.
Office action dates Sep. 19, 2012 for U.S. Appl. No. 12/321,594.
Office action dates Dec. 7, 2012 for U.S. Appl. No. 13/590,051.
Office Action Final dated Feb. 6, 2008 issued in U.S. Appl. No. 11/139,018.
Office Action mailed Apr. 27, 2007 in U.S. Appl. No. 11/139,018.
Office Action mailed Jul. 2, 2007 in U.S. Appl. No. 10/540,658.
Office Action mailed Jul. 12, 2007 in U.S. Appl. No. 10/750,533.
Oh, et al. A review of microvalves. J. Micromech. Microeng. 2006; 16:R13-R39.
Ohori, et al. Partly disposable three-way mirovalve for a medical micro total analysis system (muTAS). Sensors and Actuators. 1998;A64(1): 57-62.
Oleschuk, et al. Trapping of Bead-Based Reagents within Microfluidic Systems: On-Chip Solid-Phase Extraction and Electrochromatography. Analytical Chemistry. 2000;72:585-590.
Olsen, et al. Immobilization of DNA Hydrogel Plugs In Microfluidic Channels. Analytical Chemistry. 2002;74:1436-1441.
Paegel, et al. High-throughput DNA sequencing with a 96-lane capillary array electrophoresis bioprocessor. Proc Natl Acad Sci USA. 2002;99:574-579.
Paegel, et al. Microchip Bioprocessor for Integrated Nanovolume Sample Purification and DNA Sequencing. Analytical Chemistry. 2002;74(19):5092-5098.
Paegel, et al. Microfluidic devices for DNA sequencing: sample preparation and electrophoretic analysis. Current Opinion in Biotechnology. 2003;14(1):42-50.
Paegel, et al. Turn Geometry for Minimizing Band Broadening in Microfabricated Capillary Electrophoresis Channels. Analytical Chemistry. 2000;72:3030-3037.
PCT Notification of Transmittal of the International Search Report and The Written Opinion of the International Searching Authority, or the Declaration, mailed Jun. 17, 2008, Application No. PCT/US2007/082568 (UCALP067W0).
Peoples, et al. Microfluidic Immunoaffinity Separations for Bioanalysis. J. Chromat. B. 2008;866:14-25 (available online Aug. 30, 2007).
Peterson, et al. Enzymatic Microreactor-on-a-Chip: Protein Mapping Using Trypsin Immobilized on Porous Polymer Monoliths Molded in Channels of Microfluidic Devices. Analytical Chemistry. 2002;74:4081-4088.
Ramsey, et al. Generating Electrospray from Microchip Devices Using Electroosmotic Pumping. Analytical Chemistry. 1997;69(6):1174-1178.
Rohr, et al. Porous polymer monoliths: Simple and efficient mixers prepared by direct polymerization in the channels of microfluidic chips. Electrophoresis. 2001;22:3959-3967.
Rye, et al. High-sensitivity two-color detection of double-stranded DNA with a confocal fluorescence gel scanner using ethidium homodimer and thiazole orange. Nucleic Acids Research. 1991;19(2):327-333.
Scherer, et al. High-Pressure Gel Loader for Capillary Array Electrophoresis Microchannel Plates. Biotechniques. 2001;31(5):1150-1154.
Schomburg, et al. Design Optimization of Bistable Microdiaphragm Valves. Sensors and Actuators. 1998;A64:259-264.
Seifar, et al. Capillary electrochromatography with 1.8-mum ODS-modified porous silica particles. Journal of Chromatography. 1998; A808:71-77.
Shaikh, et al. A modular microfluidic architecture for integrated biochemical analysis. Proc Natl Acad Sci U S A. Jul. 12, 2005;102(28):9745-50. Epub Jun. 28, 2005.
Shendure, et al. Next-generation DNA sequencing. Nat Biotechnol. Oct. 2008;26(10):1135-45. doi: 10.1038/nbt1486.
Simpson, et al. High-throughput genetic analysis using microfabricated 96-sample capillary array electrophoresis microplates. Proc Natl Acad Sci USA. 1998;95:2256-2261.
Simpson, et al. Microfabrication Technology for the Production of Capillary Array Electrophoresis Chips. Biomedical Microdevices. 1998;1:7-26.
Soper, et al. Sanger DNA Sequencing Reactions Performed in a Solid-Phase Nanoreactor Directly Coupled to Capillary Gel Electrophoresis. Analytical Chemistry. 1998;70:4036-4043.
Spiering, et al. Novel microstructures and technologies applied in chemical analysis techniques. 1997 International Conference on Solid-State Sensors and Actuators. 1997;1:511-514.
Stevens, et al. Bacterial Separation and Concentration from Complex Sample Matrices: a Review. Crit. Rev. Microbiol. 2004;30(1):7-24.
Takao, et al. A Pneumatically Actuated Full In-Channel Microvalve With MOSFET-Like Function in Fluid Channel Networks. Journal of Microelectromechanical Systems. 2002; 11(5):421-426.
Takao, et al. Microfluidic Integrated Circuits for Signal Processing Using Analogous Relationship Betweeen Pneumatic Microvalve and MOSFET. Journal of Microelectromechanical Systems. 2003;12(4):497-505.
Thomas, et al. Application of Genomics to Toxicology Research. Environmental Health Perspectives. 2002;110(6):919-923.
Tice, et al. Formation of Droplets and Mixing in Multiphase Microfluidics at Low Values of the Reynolds and the Capillary Numbers. Langmuir. 2003;19:9127-9133.
Todd Thorsen, et al., "Microfluidic Large-Scale Integration", www.sciencemag.org, Science, vol. 298, Oct. 18, 2002, pp. 580-584.
Unger, et al. Monolithic microfabricated valves and pumps by multilayer soft lithography. Science. Apr. 7, 2000;288(5463):113-6.
U.S. Appl. No. 10/540,658 Office Action Final dated Feb. 19, 2008.
U.S. Appl. No. 61/709,417, filed Oct. 4, 2012.
Reissue U.S. Appl. No. 90/011,453, filed Jan. 21, 2011.
Unpublished U.S. Appl. No. 14/032,173, filed Sep. 10, 2013.
Unpublished U.S. Appl. No. 14/474,047, filed Aug. 29, 2014.
Van Der Moolen, et al. A Micromachined Injection Device for CZE: Application to Correlation CZE. Analytical Chemistry. 1997;69(20):4220-4225.
Van Der Moolen, et al. Correlation Capillary Zone Electrophoresis, a Novel Technique to Decrease Detection Limits. Chromatographia. 1995;40(7/8):368-374.
Van Ness, et al. Isothermal Reactions for the Amplification of Oligonucleotides. Proc. Nat. Acad. Sci. USA. 2003;100 (8):4504-4509.
Vazquez, et al. Electrophoretic Injection within Microdevices. Analytical Chemistry. 2002; 74:1952-1961.
Veenstra, et al. The design of an in-plane compliance structure for microfluidical systems. Sensors and Actuators. 2002;681:377-383.
Waller, et al. Quantitative Immunocapture PCR Assay for Detection of Campylobacter jejuni in Foods. Applied Environmental Microbiology. 2000; 66(9):4115-4118.
Weimer, et al. Solid-Phase Capture of Proteins, Spores, and Bacteria. Applied Environmental Microbiology. 2001;67(3):1300-1307.
Wen, et al. Microfabricated isoelectric focusing device for direct electrospray ionization-mass spectrometry. Electrophoresis. 2000;21:191-197.
Wikipedia brochure for defining stocahstic process. Sep. 2, 2009.
Williams, et al. Amplification of complex gene libraries by emulsion PCR. Nature Methods. 2006;3(7):545-50.
Woolley, et al. Functional Integration of PCR Amplification and Capillary Electrophoresis in a Microfabricated DNA Analysis Device. Analytical Chemistry. 1996;68(23):4081-4086.
Wright, et al. Behavior and Use of Nonaqueous Media without Supporting Electrolyte in Capillary Electrophoresis and Capillary Electrochromatography. Analytical Chemistry. 1997;69(16):3251-3259.
Xiang, et al. An Integrated Microfabricated Device for Dual Microdialysis and On-Line ESI-Ion Trap Mass Spectrometry for Analysis of Complex Biological Samples. Analytical Chemistry. 1999;71(8):1485-1490.
Xue, et al. Integrated Multichannel Microchip Electrospray Ionization Mass Spectrometry: Analysis of Peptides from On-Chip Tryptic Digestion of Melittin. Rapid Communications in Mass Spectrometry. 1997;11:1253-1256.

(56) References Cited

OTHER PUBLICATIONS

Xue, et al. Multichannel Microchip Electrospray Mass Spectrometry. Analytical Chemistry. 1997;69(3):426-430.

Yang, et al. A MEMS thermopneumatic silicone rubber membrane valve. Sensors and Actuators. 1998;A64(1):101-108.

Yu, et al. Preparation of Monolithic Polymers with Controlled Porous Properties for Microfluidic Chip Applications Using Photoinitiated Free Radial Polymerization. Journal of Polymer Science. 2002;40:755-769.

Yu, et al. Towards stationary phases for chromatography on a microchip: Molded porous polymer monoliths prepared in capillaries by photoinitiated in situ polymerization as separation media for electrochromatography. Electrophoresis. 2000;21:120-127.

Zhang, et al. A Microdevice with Integrated Liquid Junction for Facile Peptide and Protein Analysis by Capillary Electrophoresis/Electrospray Mass Spectrometry. Analytical Chemistry. 2000;72(5):1015-1022.

Zhang, et al. Microfabricated Devices for Capillary Electrophoresis-Electrospray Mass Spectrometry. Analytical Chemistry. 1999;71(15):3258-3264.

Co-pending U.S. Appl. No. 14/659,108, filed Mar. 16, 2015.

Co-pending U.S. Appl. No. 14/824,333, filed Aug. 12, 2015.

Co-pending U.S. Appl. No. 14/963,864, filed Dec. 9, 2015.

EP Communication issued in corresponding European Application No. 15 851 818.3, dated May 4, 2022.

EP Communication issued in corresponding European Application No. 18 248 249.7, dated May 27, 2022.

\* cited by examiner

FIG. 15

| Step # | Chemistry Steps | Cycler Out (A0) | Lysis (A1) | Lysis (A2) | Waste Shut Off (A3) | Waste In Cycler (A4) | In Transfer (B0) | Lysis Transfer (B1) | Product Bottom (B2) | Product Top (B3) | Vent (B4) |
|---|---|---|---|---|---|---|---|---|---|---|---|
| 1 | Load SC | O | O | O | O | O | O | O | O | O | O |
| 2 | Prime Lysis to waste* | O | C | O | O | C | O | C | O | C | O |
| 3 | Dispense Lysis to Lysis Chamber | O | O | O | C | O | O | C | O | C | O |
| 4 | Mix Lysis with Air | O | C | O | C | O | O | C | O | C | O |
| 5 | Mix and Heat Lysis | O | C | O | O | O | O | C | O | C | O |
| 6 | Pull Lysate to Waste via RC | O | C | C | O | O | O | C | C | C | C |
| 7 | Push PMix and MMx to RC | C | C | C | C | C | C | C | C | C | O |
| 8 | Thermal Cycling Push ILS and Product thru RC to 9 Mix Chamber | C | C | C | O | C | O | C | O | O | O |
| 9 | Push Residual ILS and Product to 10 Mix Chamber with Air Pump | O | C | C | O | C | O | C | O | O | O |
| 10 | Push Product to Cathode Water Rinse of MC and Product | O | C | O | C | C | C | C | C | O | O |
| 11 | Output to Cathode | O | C | O | C | C | O | C | C | C | O |
| 12 | Water Rinse of MC and RC Flush Water out of SC to Waste | O | C | C | C | O | O | C | O | O | O |
| 13 | | O | C | C | C | C | O | C | C | O | O |
| 14 | Chamber Flush water from SC and Line to 15 Cathode | O | O | O | C | O | O | C | O | O | O |
| 15 | Cathode | O | C | O | C | C | O | C | C | O | O |
| 16 | Release | O | O | O | O | O | O | O | O | O | O |

SYSTEMS AND METHODS FOR SAMPLE PREPARATION, PROCESSING AND ANALYSIS

CROSS-REFERENCE

This application is a divisional of U.S. application Ser. No. 14/919,620, filed Oct. 21, 2015, which claims the benefit of and priority to U.S. Provisional Patent Application Ser. No. 62/067,404, filed Oct. 22, 2014, U.S. Provisional Patent Application Ser. No. 62/067,429, filed Oct. 22, 2014, U.S. Provisional Patent Application Ser. No. 62/069,752, filed Oct. 28, 2014, and U.S. Provisional Patent Application Ser. No. 62/161,156, filed May 13, 2015, each of which is incorporated herein by reference in their entirety.

BACKGROUND

Electrophoresis is the motion of dispersed particles relative to a fluid under the influence of a spatially uniform electric field. It may be caused by the presence of a charged interface between the particle surface and the surrounding fluid. Electrophoresis is the basis for a number of analytical techniques used in biochemistry for separating molecules by size, charge, or binding affinity.

Versions of systems including sample cartridges and fluidic systems for sample extraction and analysis are described in, for example, U.S. Pat. Nos. 6,190,616; 6,551,839; 6,870,185; 7,244,961; 8,394,642 and 8,431,340; U.S. patent applications 2006/0073484; 2009/0253181; 2011/0039303; 2011/0126911; 2012/0181460; 2013/0139895 and 2013/0115607; and International Patent Applications PCT/US2013/130910 and PCT/EP2012/001413.

U.S. patent publication 2003/0197139 refers to a valve for use in microfluidic structures.

U.S. patent publication 2009/0314970 refers to a mechanically-actuated microfluidic pinch valve.

U.S. patent publication 2013/0240140 refers to a process for producing a microfluidic apparatus and related laminating devices.

International publication WO 2012/136333 refers to a heat weldable film for labeling plastic polymeric reaction tubes.

U.S. Pat. No. 6,883,774 refers to a microvalve and method of forming a microvalve.

U.S. Pat. No. 7,318,912 refers to microfluidic systems and methods for combining discreet fluid volumes.

U.S. Pat. No. 8,313,941 refers to integrated microfluidic control employing programmable tactile actuators.

U.S. Pat. No. 8,501,305 refers to a laminate.

U.S. Pat. No. 5,085,757 refers to an integrated temperature control/alignment system for use with a high performance capillary electrophoretic apparatus comprising a complementary pair of capillary column mounting plates formed from an electrically insulative, high thermal conductivity material for mounting a capillary column.

U.S. Pat. No. 6,660,148 refers to an electrophoretic method and an electrophoretic instrument therefor.

U.S. Pat. No. 7,081,191 refers to a capillary electrophoresis device.

U.S. Pat. No. 7,419,578 refers to a capillary electrophoresis apparatus.

U.S. Pat. No. 7,531,076 refers to a capillary cassette and method for manufacturing same.

U.S. Pat. No. 7,749,365 refers to optimized sample injection structures in microfluidic separations.

U.S. Pat. No. 8,398,642 refers to a system comprising an electrophoresis assembly.

U.S. Pat. No. 8,512,538 refers to a capillary electrophoresis device in which capillaries are thermally regulated on a thermally responsive electrical path attached to an electrically insulating circuit board.

U.S. Pat. No. 8,748,165 refers to a system comprising an electrophoresis assembly.

U.S. patent publication 2004/0146452 refers to an electrophoresis method and apparatus capable of maintaining high reliability upon a repeated use of the same gel.

U.S. patent publication 2004/0217004 refers to an electrode plate of a sample plate set on the body of an electrophoretic apparatus, while a plug is inserted into a migration high voltage line connection hole and connected to a high-tension distribution cable.

U.S. patent publication 2009/0183990 refers to a capillary electrophoresis apparatus a capillary array unit having a capillary array including capillaries having a capillary head and a detection unit, a frame for supporting the capillary array, and a load header for holding cathode ends of the capillaries.

U.S. patent publication 2013/0115607 refers to an integrated and automated sample-to-answer system that, starting from a sample comprising biological material, generates a genetic profile in less than two hours.

U.S. patent publication 2014/0065628 refers to methods and devices for separating and detecting nucleic acid fragments labeled with a plurality of spectrally resolvable dyes using a single light source or multiple light sources.

SUMMARY

The present disclosure provides systems that may be used in various applications, such as sample preparation, processing and/or analysis. Also provided herein are integrated electrophoresis cartridges that can releasably engage with such systems.

In one aspect of the present disclosure, an electrophoresis cartridge adapted to releasably engage with a cartridge interface of a system is provided. The electrophoresis cartridge comprises: an electrophoresis assembly including: (1) an anode sub-assembly comprising an anode, (2) a cathode sub-assembly comprising a cathode; and (3) at least one electrophoresis capillary having a first end and a second end, wherein the cathode and the anode are configured to provide a voltage gradient across the first end and the second end of the at least one electrophoresis capillary, wherein the electrophoresis cartridge is engageable with the cartridge interface to permit automatically establishing at least one of: (i) an optical communication between the system and a portion of the at least one electrophoresis capillary; (ii) an electrical communication between the system and the anode and the cathode; (iii) a fluidic communication between the system and the at least one electrophoresis capillary; (iv) a thermal communication between the system and the electrophoresis cartridge or the at least one electrophoresis capillary; (v) an electromagnetic communication between the system and the electrophoresis cartridge; and (vi) a magnetic communication between the system and the electrophoresis cartridge. In some embodiments, the electromagnetic communication is wireless communication (e.g., radio frequency identification, WiFi communication or Bluetooth communication) between the system and the electrophoresis cartridge, which may be used, for example, to identify the cartridge or transmit information and/or instructions from the system to the cartridge, or vice versa.

In some embodiments, the electrophoresis cartridge further comprises an electrophoresis separation medium container for holding an electrophoresis separation medium, wherein the electrophoresis separation medium container is in fluidic communication with the anode.

In some embodiments, the electrophoresis separation medium container is contained in a cartridge that is removably insertable into the electrophoresis cartridge.

In some embodiments, the electrophoresis cartridge is engageable with the cartridge interface to place at least one sample inlet port of the electrophoresis cartridge in fluid communication with a sample outlet port of the system.

In some embodiments, the electrophoresis cartridge further comprises a fluid handling device configured to move the electrophoresis separation medium into the at least one electrophoresis capillary. In some embodiments, the fluid handling device comprises a pump.

In some embodiment, the electrophoresis cartridge further comprises a source of capillary regeneration fluid in communication with the anode sub-assembly. In some embodiments, the regeneration fluid is an inorganic fluid. In some embodiments, the regeneration fluid is an organic fluid. In some embodiments, the regeneration fluid is an alkaline fluid. In some embodiments, the regeneration fluid comprises alkali hydroxide.

In some embodiments, the electrophoresis cartridge further comprises a source of electrophoresis medium in communication with the cathode sub-assembly. In some embodiments, the electrophoresis cartridge further comprises a detection window that exposes at least a portion of the at least one electrophoresis capillary, wherein the electrophoresis cartridge is engageable with the cartridge interface to place an optical source of the system in optical communication with the detection window.

In some embodiments, the electrophoresis cartridge further comprises an electrical interface communicating with the anode and the cathode, wherein the engagement of the electrophoresis cartridge places the electrical interface in electrical communication with a power source for applying a voltage gradient between the anode and the cathode.

In some embodiments, the electrophoresis cartridge further comprises a first waste container in fluidic communication with the cathode sub-assembly. In some embodiments, the electrophoresis cartridge further comprises a second waste container in fluidic communication with the anode sub-assembly. In some embodiments, the electrophoresis cartridge further comprises a lysis buffer container in fluidic communication with a first reagent port in the cathode sub-assembly that engages ports in the system. In some embodiments, the electrophoresis cartridge further comprises a water container in fluidic communication with a second reagent port in the cathode sub-assembly that engages ports in the system.

In some embodiments, the engagement of the electrophoresis cartridge with the cartridge interface automatically establishes a plurality of the communications. In some embodiments, the engagement of the electrophoresis cartridge with the cartridge interface automatically establishes (i). In some embodiments, the engagement of the electrophoresis cartridge with the cartridge interface automatically establishes (ii). In some embodiments, the engagement of the electrophoresis cartridge with the cartridge interface automatically establishes (iii). In some embodiments, the engagement of the electrophoresis cartridge with the cartridge interface automatically establishes (iv). In some embodiments, the engagement of the electrophoresis cartridge with the cartridge interface automatically establishes (v). In some embodiments, the engagement of the electrophoresis cartridge with the cartridge interface automatically establishes (vi). In some embodiments, the engagement of the electrophoresis cartridge with the cartridge interface automatically establishes any two, three, four, five or all of (i)-(vi).

In another aspect of the present disclosure, an electrophoresis cartridge comprises: an integrated electrophoresis assembly including: (1) an anode sub-assembly comprising an anode, (2) a cathode sub-assembly comprising a cathode; and (3) at least one electrophoresis capillary having a first end and a second end, wherein the cathode and the anode provide a voltage gradient between the first end and the second end of the at least one capillary.

In some embodiments, the electrophoresis cartridge further comprises: (a) an electrophoresis separation medium container for holding an electrophoresis separation medium and communicating through a fluid line with the anode; and (b) a fluid handling device that moves the electrophoresis separation medium to the at least one electrophoresis capillary.

In some embodiments, the fluid handling device comprises a pump. In some embodiments, the electrophoresis separation medium container is contained in a cartridge that is removably insertable into the electrophoresis cartridge.

In some embodiments, the electrophoresis cartridge further comprises a source of capillary regeneration fluid in fluidic communication with the anode assembly. In some embodiments, the capillary regeneration fluid is an inorganic fluid. In some embodiments, the capillary regeneration fluid is an organic fluid. In some embodiments, the capillary regeneration fluid is an alkaline fluid. In some embodiments, the capillary regeneration fluid comprises alkali hydroxide.

In some embodiments, the electrophoresis cartridge further comprises a source of electrophoresis medium in fluidic communication with the cathode. In some embodiments, the electrophoresis cartridge further comprises a first waste container in fluidic communication with the cathode sub-assembly. In some embodiments, the electrophoresis cartridge further comprises a second waste container in fluidic communication with the anode sub-assembly.

In some embodiments, the cartridge has a footprint of at most about 12 inches×12 inches and a weight between about 1 kg and about 7 kg.

In some embodiments, the electrophoresis cartridge further comprises at least one mating member that enables the cartridge to releasably mate with a cartridge interface of an electrophoresis system. In some embodiments, the at least one mating member enables the cartridge to snap into a resting position in the cartridge interface.

In some embodiments, the electrophoresis cartridge further comprises a gel cartridge interface that releasably engages with a gel cartridge for providing an electrophoresis gel to the at least one electrophoresis capillary. In some embodiments, the integrated electrophoresis assembly is single piece.

In another aspect of the present disclosure, a method comprises: (a) providing a system comprising an electrophoresis cartridge interface that releasably engages with an electrophoresis cartridge comprising (1) an anode sub-assembly comprising an anode; (2) a cathode sub-assembly comprising a cathode; and (3) at least one electrophoresis capillary that is in fluid communication with the anode and the cathode; (b) receiving the electrophoresis cartridge at the electrophoresis cartridge interface; and (c) automatically establishing at least one of (i) an optical communication between an optical detection assembly of the system and a portion of the at least one electrophoresis capillary, (ii) an electrical communication between the system and the anode and the cathode, (iii) a fluidic communication between the system and the at least one electrophoresis capillary, (iv) a thermal communication between the system and the electrophoresis cartridge or the at least one electrophoresis capillary; (v) an electromagnetic communication between the system and the electrophoresis cartridge; and (vi) a magnetic communication between the system and the electrophoresis cartridge.

In some embodiments, the method further comprises providing a voltage gradient between a first end of the at least one electrophoresis capillary having the anode and a second end of the at least one electrophoresis capillary having the cathode.

In some embodiments, the system further comprises a voltage control assembly, an optics module, at least one thermal control assembly, at least one sample outlet, and at least one fluid control assembly.

In some embodiments, the automatically establishing comprises automatically establishing at least one of (i) an electrical communication between the voltage control assembly and the anode and the cathode, (ii) a sensing communication between the optics module and the at least the portion of the at least one electrophoresis capillary, (iii) a thermal communication between the at least one thermal control assembly and the at least one electrophoresis capillary, and (iv) a fluidic communication between the at least one fluid control assembly and the at least one electrophoresis capillary.

In some embodiments, the method further comprises, with the aid of the at least one fluid control assembly, directing flow of a sample from the at least one sample outlet through the at least one electrophoresis capillary. In some embodiments, the optics module comprises a light source and an optical detection assembly. In some embodiments, the light source is laser.

In some embodiments, the method further comprises detecting with the optical detection assembly a signal from the at least the portion of the at least one electrophoresis capillary upon the flow of the sample through the at least one electrophoresis capillary. In some embodiments, the method further comprises providing an electrophoresis separation medium container for holding an electrophoresis separation medium and communicating through a fluid line with the anode. In some embodiments, the electrophoresis separation medium container is contained in a cartridge that is removably insertable into the electrophoresis cartridge.

In some embodiments, the method further comprises providing a control module that tests a robustness of the at least one communication established in (c). In some embodiments, the method further comprises removing the electrophoresis cartridge from the electrophoresis cartridge interface.

In some embodiments, the automatically establishing comprises automatically establishing at least two of (i)-(vi). In some embodiments, the automatically establishing comprises automatically establishing at least three of (i)-(vi). In some embodiments, the automatically establishing comprises automatically establishing at least four of (i)-(vi). In some embodiments, the automatically establishing comprises automatically establishing at least five of (i)-(vi). In some embodiments, the automatically establishing comprises automatically establishing all of (i)-(vi). In some embodiments, the automatically establishing is in response to user instructions provided to a control module of the system.

In some embodiments, the method further comprises, with the aid of the at least one fluid control assembly, directing flow of at least one reagent through a fluid line from the electrophoresis cartridge to the system. In some embodiments, the at least one reagent comprises a lysis buffer. In some embodiments, the at least one reagent comprises water.

In some embodiments, the method further comprises performing sample separation in the system followed by sample analysis.

In another aspect of the present disclosure, a system comprises: (a) a sample cartridge interface that engages with a sample cartridge; (b) a sample preparation module that (1) performs sample analysis on a sample from the sample cartridge to produce an analyte and (2) directs the analyte to a sample outlet port, which analysis is performed when the sample cartridge is engaged with the sample cartridge interface; and (c) an electrophoresis cartridge interface that is releasably engageable with an electrophoresis cartridge including an integrated electrophoresis assembly having (1) an anode sub-assembly comprising an anode, (2) a cathode sub-assembly comprising a cathode, and (3) at least one electrophoresis capillary having a first end and a second end, wherein the cathode and the anode provide a voltage gradient between the first end and the second end of the at least one capillary, wherein the electrophoresis cartridge interface is engageable with the electrophoresis cartridge to automatically establish at least one of: (i) an optical communication between the system and a portion of the at least one electrophoresis capillary, (ii) an electrical communication between the electrophoresis system and the anode and the cathode, (iii) a fluidic communication between the electrophoresis system and the at least one electrophoresis capillary, (iv) a thermal communication between the electrophoresis system and the at electrophoresis cartridge or the at least one electrophoresis capillary, (v) an electromagnetic communication between the system and the electrophoresis cartridge, and (vi) a magnetic communication between the system and the electrophoresis cartridge.

In some embodiments, the system further comprise a fluid handling system that moves the analyte from the sample outlet port to the at least one electrophoresis capillary when the electrophoresis cartridge is engaged with the electrophoresis cartridge interface. In some embodiments, the system further comprises a control module that is programmed to test a robustness of the at least one of the automatic communications.

In some embodiments, the automatically establishing is in response to user instructions provided to a control module of the system.

In some embodiments, the electrophoresis cartridge interface is engageable with the electrophoresis cartridge to automatically establish at least two of (i)-(vi). In some embodiments, the electrophoresis cartridge interface is engageable with the electrophoresis cartridge to automatically establish at least three of (i)-(vi). In some embodiments, the electrophoresis cartridge interface is engageable with the electrophoresis cartridge to automatically establish at least four of (i)-(vi). In some embodiments, the electrophoresis cartridge interface is engageable with the electrophoresis cartridge to automatically establish at least five of (i)-(vi). In some embodiments, the electrophoresis cartridge interface is engageable with the electrophoresis cartridge to automatically establish all of (i)-(vi).

In some embodiments, the electrophoresis cartridge interface is engageable with the electrophoresis cartridge to automatically establish a fluidic communication between at least one sample outlet of the system and the at least one electrophoresis capillary.

In some embodiments, the system further comprises a signaling mechanism that signals a user to replace the electrophoresis cartridge. In some embodiments, the system further comprises an electronic display with a user interface, wherein the user interface provides the signaling mechanism.

Another aspect of the present disclosure provides a cartridge comprising: (a) a body comprising a malleable material; and (b) a layer comprising a deformable material bonded to a surface of the body and sealing one or more fluidic channels that communicate with one or more valve bodies formed in a surface of the body; wherein: (i) the one or more valve bodies comprise: (A) a segment of the channel comprising a wall having a pair of ridges and a floor depressed into the surface; and (B) reliefs depressed into the surface and defining depressions that flank the ridges on two sides of the segment of the channel; and (iii) the layer is bonded to the surface of the body and to the ridges such that the one or more channels, channel segments and reliefs are sealed; and wherein a valve body sealed with the layer forms a valve closable by forcing the layer against the floor of the segment of the channel. In one embodiment the cartridge of comprises elements of a fluidic circuit including a fluid inlet, a fluid outlet and at least one compartment, which elements are fluidically connected through fluidic channels, wherein at least one fluidic channel comprises a valve body. In another embodiment the cartridge comprises at least one compartment selected from a reagent compartment, a sample compartment, a mixing compartment, a reaction compartment and a waste compartment. In another embodiment a fluid inlet or a fluid outlet comprises a via through the body. In another embodiment the cartridge comprises at least one sample compartment configured to accept a cotton tipped swab. In another embodiment the cartridge comprises at least one mixing chamber configured for bubbling of air through the mixing chamber. In another embodiment the cartridge comprises a reaction chamber comprising a solid substrate, e.g., solid phase extraction material, for retaining analyte from a sample. In another embodiment the cartridge comprises a pump configured as a depression in the surface. In another embodiment the solid substrate comprises a material that binds nucleic acid. In another embodiment the solid substrate comprises Whatman paper, a carboxylated particle, a sponge-like material, a polymer membrane, magnetically attractable particles, or glass particles. In another embodiment the solid substrate binds a predetermined amount of material. In another embodiment the cartridge comprises a reaction chamber comprising one or more thermally conductive wallsand configured for thermal cycling. In another embodiment the cartridge comprises at least one waste compartment. In another embodiment the cartridge comprises a waste chamber, wherein the waste chamber comprises a material that degrades nucleic acid. In another embodiment the material that degrades nucleic acid comprises a hypochlorite salt. In another embodiment the cartridge further comprises guide vias through the body. In another embodiment the body further comprises a barrel comprising a plunger and in fluid communication with at least one of the fluidic channels. In another embodiment the body further comprises at least one reagent compartment comprising a reagent, wherein the compartment comprises an openable seal that, when opened, puts the compartment in fluidic communication through a via with a fluidic channel on the surface. In another embodiment the body further comprises one or more reagent compartments comprising reagents including nucleic acid primers, nucleotides and DNA polymerases sufficient to perform PCR. In another embodiment the reagents are sufficient for performing multiplex PCR on STR loci. In another embodiment the body further comprises a pump configured as a depression in the surface. In another embodiment the deformable material has a durometer value of between 10 Shore D to 80 Shore D. In another embodiment the deformable material comprises a heat seal material. In another embodiment the deformable material comprises a material selected from polypropylene, polyethylene, polystyrene, cycloolefin co-polymer (COC), mylar, polyacetate) and a metal. In another embodiment a portion of the layer of deformable material covering a valve seat does not comprise an elastomeric material, e.g., is not PDMS. In another embodiment the layer of deformable material has a higher yield strength than the malleable material. In another embodiment the deformable material is attached to the body through an adhesive. In another embodiment the deformable material is welded to the body. In another embodiment the cartridge comprises (i) a surface, (ii) one or more channels formed in the surface and elements of a fluidic circuit including a fluid inlet, a fluid outlet and at least three chambers, which elements are fluidically connected through fluidic channels, wherein each fluidic channel connecting two of the chambers comprises a valve body. In another embodiment one of the chambers is configured as a lysis chamber configured to accept a biological sample, one of the chambers is configured as a mixing chamber configured to bubble air when liquid is contained in the mixing chamber, and one of the chambers is configured as a reaction chamber comprising one or more thermally conductive walls and configured for thermal cycling. In another embodiment the cartridge further comprises, at least one reagent compartment comprising reagents for performing PCR (e.g., PCR primers, nucleotides and a DNA polymerase), wherein the at least one reagent chamber comprises an openable seal that, when opened, puts the reagent chamber in fluidic communication with the reaction chamber. In another embodiment at least one reagent chamber comprises PCR primers selected to amplify a plurality of STR loci. In another embodiment one of the chambers is configured as a lysis chamber configured to accept a biological sample, one of the chambers is configured as an isolation chamber configured to receive magnetically responsive capture particles and to immobilize said particles when a magnetic force is applied to the isolation chamber, and one of the chambers is configured as a reaction chamber comprising one or more thermally conductive wallsand configured for thermal cycling. In another embodiment the cartridge further comprises, at least two sets of reagent compartments, wherein a first set of reagent compartments comprises reagents for performing PCR, and wherein a second set of reagent compartments comprises reagents for performing cycle sequencing, wherein each reagent compartment comprises openable seal that, when opened, puts the reagent compartment in fluidic communication with the reaction chamber. In another embodiment the cartridge further comprises a reagent compartment comprising reagents to degrade PCR primers and nucleotide triphosphates. In another embodiment the cartridge further comprises at least two sets of reagent compartments, wherein both the first set of reagent compartments and the second set of reagent compartments comprise reagents for performing PCR, and wherein each reagent compartment comprises openable seal that, when opened, puts the reagent compartment in fluidic communication with the reaction chamber. In another embodiment the PCR reagents in one of the sets of reagent compartments comprises reagents for performing adapted for performing quantification of human DNA. In another embodiment the cartridge comprises a branched fluidic circuit comprising chambers connected by fluidic channels and comprising a common portion and a plurality of branches, wherein the common portion comprises a fluid inlet and a lysis chamber, and wherein each branch comprises at least one reaction chamber comprising one or more thermally conductive wallsand configured for thermal cycling, at least one isolation chamber and a fluid outlet, wherein at least the fluidic channels connecting a reaction chamber with an isolation chamber comprises a valve body. In another embodiment the common portion comprises a common isolation chamber. In another embodiment each branch further comprises at least one reagent chamber reagent compartment comprising an openable seal that, when opened, puts the reagent compartment in fluidic communication with the reaction chamber in the branch. In another embodiment the cartridge comprises two branches, wherein a first branch comprises reagents to perform a forward cycle sequencing reaction on a target polynucleotide and a second branch comprises reagents to perform a reverse cycle sequencing reaction on a target polynucleotide.

Another aspect of the present disclosure provides an article comprising: (a) a body comprising a malleable material and comprising: (i) a surface, (ii) one or more channels formed in the surface and fluidically communicating with one or more valve bodies, (iii) one or more valve bodies formed in the surface comprising: (A) a segment of the channel comprising a wall having a pair of ridges raised above the surface and a floor depressed into the surface; and (B) reliefs depressed into the surface and defining depressions that flank the ridges on two sides of the segment of the channel. In one embodiment the malleable material comprises a plastic, a wax or a soft metal. In another embodiment the malleable material comprises a thermoplastic, a thermoset, a single component resin or a multi-component resin. In another embodiment the malleable material comprises polypropylene, polystyrene, polyethylene, polyethylene terephthalate, polyester, polyamide, vinyl, poly(vinylchloride) (PVC), polycarbonate, polyurethane, polyvinyldiene chloride, cyclic olefin copolymer (COC), or any combination thereof. In another embodiment the body is injection molded or 3D printed. In another embodiment the surface is substantially defined in a plane. In another embodiment one or more of the channels has at least one aspect no greater than any of 1 mm, 2 mm, 3 mm, 4 mm or 5 mm. In another embodiment one or more of the channels comprises a wall having a pair of ridges raised above the surface and a floor depressed into the surface. In another embodiment the ridges have a height above the surface between about 50μ and about 300μ. In another embodiment the floor of the channel segment has a depth below the surface between about 50 and about 300μ. In another embodiment the valve body has a substantially oblong shape. In another embodiment the channel segment comprises a force concentration zone. In another embodiment the channel segment comprises a textured floor (e.g., corrugated or dimpled). In another embodiment the reliefs have a depth below the surface of between 100μ and 300μ. In another embodiment the valve body has an area of no more than any of 100 mm$^2$, 50 mm$^2$, 25 mm$^2$, 20 mm$^2$, 15 mm$^2$ or 10 mm$^2$.

Another aspect of the present disclosure provides a method of making an article comprising: (a) providing a body comprising a malleable material and comprising: (i) a surface, (ii) one or more channels formed in the surface and fluidically communicating with one or more valve bodies, (iii) one or more valve bodies formed in the surface comprising: (A) a segment of the channel comprising a wall having a pair of ridges raised above the surface and a floor depressed into the surface; and (B) reliefs depressed into the surface and defining depressions that flank the ridges on two sides of the segment of the channel; (b) providing a layer comprising a deformable material; and (c) bonding the layer to the surface and the ridges, wherein bonding seals the one or more channels, channel segments and reliefs. In one embodiment the body comprises a thermoplastic. In another embodiment the layer of deformable material comprises a heat seal. In another embodiment wherein bonding comprises applying heat and pressure to the heat seal against the body surface sufficient to weld a heat seal against the ridges and areas of the surface flanking the one or more channels and the reliefs. In another embodiment the pressure is applied with a heated die.

Another aspect of the present disclosure provides a method of making an article comprising: (a) providing a body comprising a malleable material and comprising: (i) a surface, (ii) one or more channels formed in the surface and fluidically communicating with one or more valve bodies, (iii) one or more valve bodies formed in the surface comprising: (A) a segment of the channel comprising a wall having a pair of ridges and a floor depressed into the surface; and (B) reliefs depressed into the surface and defining depressions that flank the ridges on two sides of the segment of the channel; (b) providing a layer comprising a deformable material; and (c) bonding the layer to the surface and the ridges, wherein bonding seals the one or more channels, channel segments and reliefs. In one embodiment bonding comprises thermal bonding (e.g., heat sealing, welding, laser welding), chemical bonding (e.g., chemical bonding of oxide to PDMS, vapor bonding) or application of selectively placed adhesives.

Another aspect of the present disclosure provides an instrument comprising a cartridge interface and a cartridge engaged with the cartridge interface, wherein: (I) the cartridge is a cartridge of this disclosure; (II) a cartridge interface comprising a plurality of rams, each ram positioned to actuate a valve and comprising a head having a widest dimension that is wider than a channel segment and less wide than the relief width, so that, when actuated toward the valve, the ram head presses the deformable material against the ridges and the floor, thereby closing the valve, but clearing the reliefs. In one embodiment the cartridge interface has a substantially planar face configured to mate with a substantially planar surface of the fluidic cartridge. In another embodiment the rams are retractable toward the interface and are spring biased toward the cartridge. In another embodiment the ram head has a length:width ratio of at least any of 2:1, 3:1, 4:1, 5:1, 6:1, 7:1, 8:1, 9:1 or 10:1. In another embodiment the ram head has an edge in its longest aspect that is substantially straight and either substantially flat or curved no more than a depth of a valve relief. In another embodiment at least one ram is comprised in a cam mechanism, wherein rotation of the cam actuates the ram toward or away from the valve. In another embodiment the cartridge interface further comprises a cover plate configured to receive the cartridge and comprising at least one plunger positioned to actuate at least one valve in cartridge. In another embodiment the cartridge interface further comprises a cover plate comprising a fluid inlet line that engages an inlet port on the cartridge and/or a fluid outlet line that engages an exit port on the cartridge. In another embodiment the sample cartridge is configured to receive one or more samples and to perform nucleic acid extraction and isolation, and DNA amplification when the cartridge is engaged with a cartridge interface. In another embodiment the instrument further comprises a sample analysis module in fluidic communication with a port in the cartridge interface that communicates with a reaction chamber of the engaged cartridge. In another embodiment the sample analysis module comprises an electrophoresis assembly comprising a capillary comprising a medium adapted for capillary electrophoresis and a cathode and anode configured to place a voltage across the capillary. In another embodiment the sample analysis module further comprises a detection assembly for detecting molecules in the capillary. In another embodiment the detection assembly comprises a laser and a detector for detecting laser light. In another embodiment the sample analysis module comprises a chromatograph, a DNA sequencer, an electrometer, an electrophoresis instrument, an ellipsometer, an interferometer, a mass spectrometer, an NMR spectrometer, a spectrometer a thermometer, a voltmeter. In another embodiment the instrument further comprises a source of magnetic force configured to exert a magnetic force against a chamber in the cartridge In another embodiment the instrument comprises an actuator, e.g., a plunger, configured to move one or more reagents from sealed compartments on the cartridge into fluidic channels of the cartridge.

Another aspect of the present disclosure provides a method of controlling fluid flow in a fluid channel of fluidic cartridge comprising: (A) providing an instrument of this disclosure wherein at least one of the fluidic channels comprises a liquid; (B) closing a valve by actuating a ram head against the valve to force the deformable layer against the channel segment floor; (C) releasing the valve by retracting the ram head from the layer; and (D) moving the liquid through the valve by applying pressure to liquid in a fluidic channel, wherein fluid under pressure opens the valve. In one embodiment the method further comprises, after step (D): (E) re-closing the valve by actuating a ram head against the valve to force the deformable layer against the channel segment floor. In another embodiment the pressure is sourced through a pump internal to the cartridge or a pump external to the cartridge (e.g., a syringe) and delivered, optionally, through an inlet in the cartridge connected to a fluidic channel in the cartridge. In one embodiment a nearly incompressible fluid is moved through any fluidic channel in one direction only. In another embodiment no valve is closed and then opened before a liquid passes through the valve.

Another aspect of the present disclosure provides a method of moving fluid in a fluid channel of fluidic cartridge comprising: (I) providing a fluidic cartridge comprising: (a) a body comprising a malleable material; and (b) a pump comprising a pump body defining a pump chamber and formed at least in part from a portion of the malleable material, wherein the pump chamber contains a liquid or a gas; (c) a fluidic channel internal to the cartridge and fluidically connected to the pump chamber, wherein the fluidic channel contains a liquid; and (II) deforming the pump body, e.g., with a piston, so that liquid or gas in the pump chamber exerts pressure on the fluid in the fluidic channel, whereby fluid in the fluidic channel moves through the fluidic channel.

Another aspect of the present disclosure provides a method performed using a cartridge of this disclosure comprising: a) moving an extraction medium through at least one open valve in the cartridge to an extraction chamber in the cartridge comprising a biological sample and lysing cells in the biological sample to create an extract; b) moving the extract through at least one open valve in the cartridge to a reaction chamber in the cartridge; c) moving reagents for performing a biochemical reaction into the reaction chamber to create a mixture; d) performing a biochemical reaction on the mixture to create a reaction product; and e) performing analysis on the reaction product. In one embodiment the extraction medium comprises lysis buffer and the extract comprises a lysate. In another embodiment the analysis is capillary electrophoresis. In another embodiment performing capillary electrophoresis comprises moving the reaction product out of the cartridge and injecting it into an electrophoresis capillary. In another embodiment the one or more target sequences are STR sequences. In another embodiment the reagents comprise reagents for performing cycle sequencing, the biochemical reaction is cycle sequencing of a target sequence and the reaction product is a set of dideoxy-terminated polynucleotides. In another embodiment biochemical analysis comprises sequencing the set by performing capillary electrophoresis. In another embodiment the reagents comprise reagents for performing PCR and the biochemical reaction is PCR amplification of one or more target sequences. In another embodiment the method further comprises, before cycle sequencing, moving reagents for performing PCR into the reaction chamber and performing PCR on a target sequence and, optionally, purifying PCR product before performing cycle sequencing. In another embodiment the method comprises, moving a liquid from a first chamber in the cartridge through a fluidic channel comprising at least one open valve to a second chamber in the cartridge and, after the liquid has moved past the open valve, closing the valve. In another embodiment the method comprises, moving liquid from an inlet in the cartridge through a fluidic circuit in cartridge and out an outlet in the cartridge, wherein the fluidic circuit comprises a plurality of valves and wherein a biochemical reaction is performed on the liquid in the cartridge; and wherein no valve is closed and then opened before the liquid passes through the valve.

Another aspect of the present disclosure provides a method performed using a system described above and elsewhere herein, comprising: a) moving an extraction medium to an extraction chamber in a cartridge comprising a biological sample and lysing cells in the biological sample to create an extract; b) moving the extract to a reaction chamber in the cartridge; c) moving reagents for performing a biochemical reaction into the reaction chamber to create a mixture; d) performing a biochemical reaction on the mixture to create a reaction product; and e) performing a biochemical analysis on the reaction product.

In some embodiments, the biochemical analysis is capillary electrophoresis. In some embodiments, performing capillary electrophoresis comprises moving the reaction product out of the cartridge and injecting it into an electrophoresis capillary. In some embodiments, the reagents comprise reagents for performing PCR and the biochemical reaction is PCR amplification of one or more target sequences. In some embodiments, the one or more target sequences are STR sequences. In some embodiments, the reagents comprise reagents for performing cycle sequencing, the biochemical reaction is cycle sequencing of a target sequence and the reaction product is a set of dideoxy-terminated polynucleotides. In some embodiments, the biochemical analysis comprises sequencing the set by performing capillary electrophoresis. In some embodiments, the method further comprises, before the cycle sequencing, moving reagents for performing PCR into the reaction chamber and performing PCR on a target sequence and, optionally, purifying PCR product before performing cycle sequencing. In some embodiments, the method further comprises moving a liquid from a first chamber in the cartridge through a fluidic channel comprising at least one open valve to a second chamber in the cartridge and, after the liquid has moved past the open valve, closing the valve. In some embodiments, the method further comprises moving liquid from an inlet in the cartridge through a fluidic circuit in cartridge and out an outlet in the cartridge, wherein the fluidic circuit comprises a plurality of valves and wherein the biochemical reaction is performed on the liquid in the cartridge; and wherein no valve is closed and then opened before the liquid passes through the valve. In some embodiments, the method further comprises: before step (b): dividing the extract into a plurality of aliquots, each aliquot moved into a different reaction chamber; after step (d): removing unused reagents from each reaction product; moving each reaction product into a second reaction chamber; and performing a second biochemical reaction on the reaction products. In some embodiments, the biochemical reaction of step (d) comprises nucleic acid amplification and the second biochemical reaction comprises cycle sequencing to produce a set of dideoxy-terminated polynucleotides. In some embodiments, the biochemical analysis comprises sequencing the set by capillary electrophoresis.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 15 shows a sequence of steps in sample preparation. "O" indicates a ram does not press against a valve. "C" indicates a ram presses against and closes a valve.

DETAILED DESCRIPTION

Figure 1A:
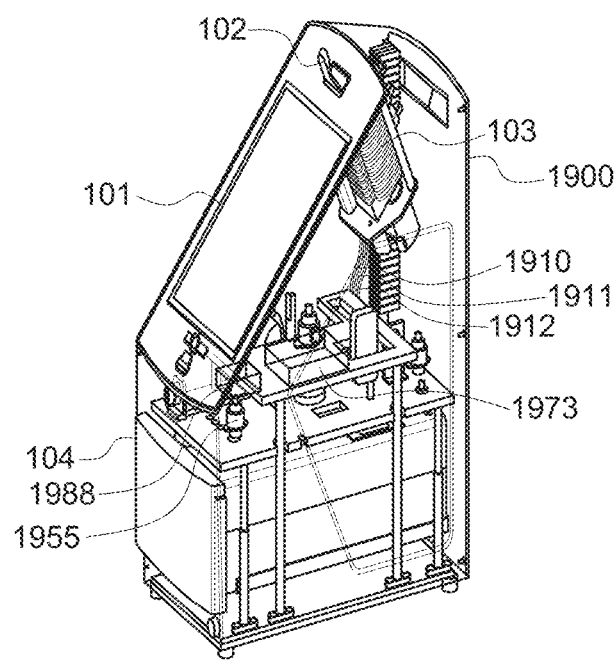
FIG. 1A shows an example of a system comprising an electrophoresis cartridge for sample processing and analyzing.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, the singular form "a", "an", and "the" include plural references unless the context clearly dictates otherwise.

Whenever the term "at least" or "greater than" precedes the first numerical value in a series of two or more numerical values, the term "at least" or "greater than" applies to each one of the numerical values in that series of numerical values.

Whenever the term "no more than" or "less than" precedes the first numerical value in a series of two or more numerical values, the term "no more than" or "less than" applies to each one of the numerical values in that series of numerical values.

The term "sample", as used herein, refers to a sample containing biological material. A sample may be, e.g., a fluid sample (e.g., a blood sample) or a tissue sample (e.g., a cheek swab).

A sample may be a portion of a larger sample. A sample can be a biological sample having a nucleic acid, such as deoxyribonucleic acid (DNA) or ribonucleic acid (RNA), or a protein. A sample can be a forensic sample or an environmental sample. A sample can be pre-processed before it is introduced to the system; the preprocessing can include extraction from a material that would not fit into the system, quantification of the amount of cells, DNA or other biopolymers or molecules, concentration of a sample, separation of cell types such as sperm from epithelial cells, concentration of DNA using an Aurora system (Boreal Genomics) or bead processing or other concentration methods or other manipulations of the sample. A sample can be carried in a carrier, such as a swab, a wipe, a sponge, a scraper, a piece punched out a material, a material on which a target analyte is splattered, a food sample, a liquid in which an analyte is dissolved, such as water, soda. A sample can be a direct biological sample such as a liquid such as blood, semen, saliva; or a solid such a solid tissue sample, flesh or bone.

The system provided in the present disclosure can also be applied to process and analyze a sample that has been previously preprocessed, for example, by extraction of DNA from large object such as a bed sheet or chair and other processing which may include quantification of DNA concentration, cell concentration, or other manipulations before input of the pre-processed sample into the sample cartridge of the system.

I. SYSTEMS

Recognized herein is the need for highly integrated and automated systems and methods for sample preparation, processing and analysis. Systems provided herein may be capable of preparing, processing and analyzing a single sample or a plurality of samples. Several operations can be performed by the system provided herein, for example, (a) receiving one or more samples; (b) isolating and extracting target material from the received sample; (c) purifying and amplifying the whole target material or selective portion of the target material to produce an analyte ready to be examined; and (d) separating, detecting and analyzing the prepared analyte. These operations can be conducted and performed in a system that comprises several integrated sub-systems, for example, at least about 1, 2, 3, 4, 5, 6, 7, 8, 9, 10, 20, 30, 40, or 50 sub-systems. In some cases, a system may comprise a user interface, a sample cartridge interface, and an electrophoresis interface. The sample cartridge interface and the electrophoresis interface are configured to releasably engage with a sample cartridge for sample processing, and an electrophoresis cartridge for sample analysis respectively. Systems provided herein can be fully automated, enabling a user to receive, process and analyze a sample without substantial labor and input. Sample preparation, processing and analysis can be accomplished in provided systems without the necessity of manually removing and transferring the sample, reagents and analytes among different parts in the system. Since the incorporated sub-units (e.g., sample cartridge and electrophoresis cartridge) are highly integrated and bear small sizes, systems provided herein can be dimensioned to minimize footprint, enabling the portability and usefulness in a wide context of applications. For example, the systems may be used in on-the-go situations, such as remote locations, or they may be used in situations in which transportation is not readily available or user mobility is desired, such as battlefields scenarios and crime scenes.

FIG. 1A shows a system for sample processing and analysis. System 1900 can include several functional elements. System 1900 can include a sample preparation sub-system, a sample analysis sub-system and a control sub-system.

A sample preparation sub-system of the system 1900 can include a sample cartridge interface 103 configured to engage a sample cartridge 102, sources of reagents for performing a biochemical protocol, a fluidics assembly configured to move reagents within the sample preparation sub-system. A fluidics assembly can include a pump, such as a syringe pump. The pump is fluidically connectable through valves to the outlets for reagents such as water and lysis buffer and to a source of air. The pump can be configured to deliver lysis buffer and water through fluidic lines 1910 and 1911, respectively, to inlet port 1912 in the sample cartridge. Air or liquid pressure applied by the pump to inlet port 1912 can pump analyte out outlet port 1913 and through line 1912 into the analyte inlet in the electrophoresis cartridge.

Figure 7:
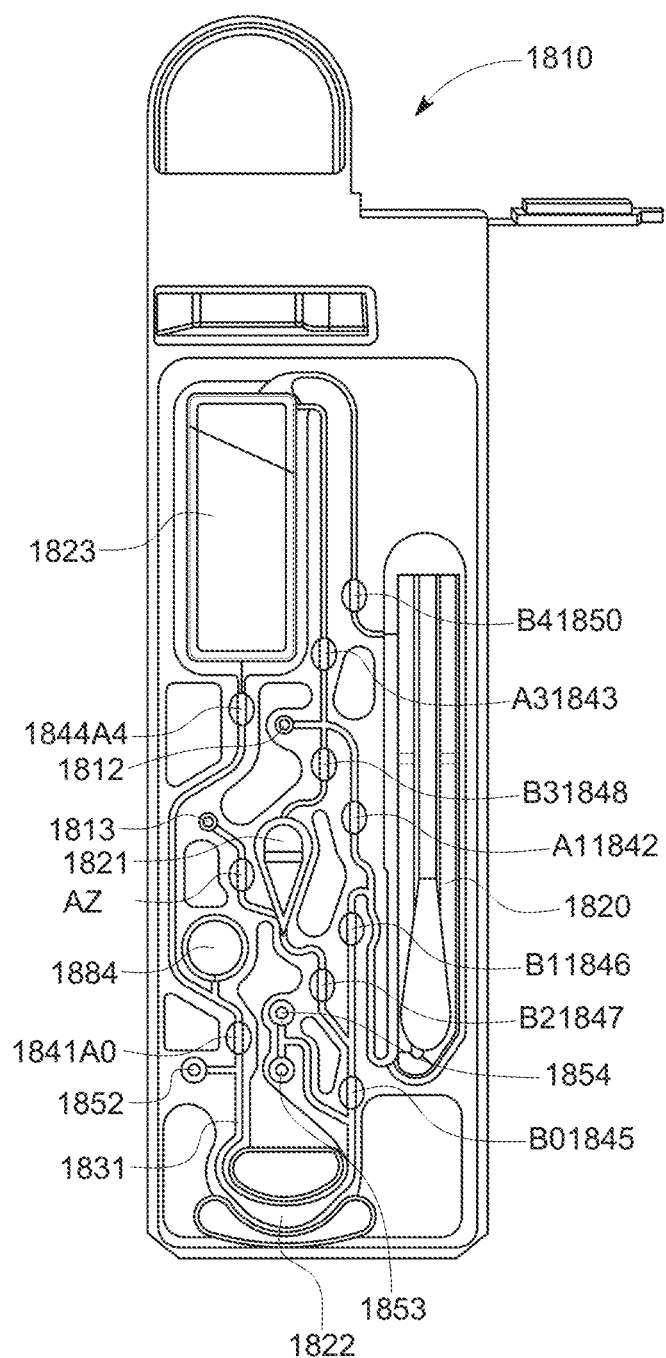
FIG. 7 shows an example sample cartridge.

An example sample cartridge is shown in FIG. 7. Cartridge body 1801 includes the following valve bodies: 1841 Cycler Out (A0), 1842 Lysis (A1), 1843 Waste Shut Off (A3), 1844 Waste In (A4), 1845 Cycler In (B0), 1846 Lysis Transfer (B1), 1847 Product Bottom (B2), 1848 Product Top (B3) and 1850 Vent (B4)

The valve bodies can include various types of valves, such as valves actuated with the aid of rams described in U.S. Provisional Patent Application Ser. No. 62/001,533, filed Mar. 21, 2014, and U.S. Provisional Patent Application Ser. No. 62/067,120, filed Oct. 22, 2014, each of which is entirely incorporated herein by reference. As an alternative, the valve bodies can include Micro-Robotic on-Chip Valve and Pump valves (MOVe), as described, for example, in U.S. Pat. Nos. 8,394,642 and 8,672,532, each of which is entirely incorporated herein by reference.

As shown in FIG. 7, cartridge body 1801 includes lysis chamber 1820. Cartridge 1801 can include reagent chambers filled with, e.g., nucleic acid size standards (molecules of known sizes), PCR master mix and PCR primers, respectively, and sealed with, e.g., balls acting as closures for ball valves. When opened, the reagent chambers come into fluidic communication with fluidic channels in sample cartridge 1801, for example, through ports 1852 (internal lane standard), 1853 and 1854 (PCR Master Mix and PCR Primer Mix). Pistons can actuate the ball valves, pushing fluids through the ports and into the channels to which they are connected. Sample cartridge 1801 also can include inlet port 1812 and output port 1813. Upon engagement with the cartridge interface, inlet port 1812 and outlet port 1813 each engage a fluid line. The fluid line connected to inlet port 1812 can be attached to a pressure source, e.g., a syringe, to exert positive or negative pressure to fluidic channels via the inlet port, transporting liquids, such as lysis buffer, water or air, into or out of the cartridge. The fluid line connected to output port 1813 can conduct analyte from the cartridge to a sub-system for analyte analysis.

In some examples, cartridge body 1801 includes lysis chamber 1820 and, optionally, closable cap 1864 to close lysis chamber 1820. Cartridge 1801 includes pump 1884. Pump 1884 (e.g., an air pump) is configured as a chamber defined by walls of the cartridge body. Pump 1884 is fluidically connected to at least one fluidic channel in the cartridge body. Walls of the pump comprise, at least in part, the malleable material of the cartridge body. Accordingly, the walls can be deformed, for example by mechanical force, increasing pressure in the chamber to pump liquid or air in fluidic channels in fluidic communication with the pump. Pump 1884 can be actuated with a plunger or piston that depresses walls of pump 1884 and forces, for example, air from the pump body through the fluidic channel to which it is connected. Pump 1884 can be used to clear fluid from a fluidic channel. For example, in this embodiment, reagent introduced from port 1852 into reaction chamber 1822 may leave dead volume in channel 1831. Pump 1884 can be used to pump this dead volume of reagent into reaction chamber 1822.

A sample analysis sub-system can include an electrophoresis assembly including an anode, a cathode and an electrophoresis capillary in electric and fluidic communication with the anode and cathode, and a sample inlet communicating between a sample outlet in the sample cartridge and an inlet to the capillary. These can be contained, e.g., within an electrophoresis cartridge 104. The sample analysis subsystem can further include an optical assembly including a source of coherent light, such as laser 1988, an optical train, including, e.g., lenses 1955, and a detector, configured to be aligned with the electrophoresis capillary and to detect an optical signal, e.g., fluorescence, therein. In an example, the electrophoresis cartridge also includes a source of electrophoresis separation medium and, in some cases sources of liquid reagents, such as water and lysis buffer, delivered through outlets in the electrophoresis cartridge to the system. Separation channels for electrophoresis can take two main forms. One form is a "capillary", which refers to a long and typically cylindrical structure. Another is "microchannel", which refers to a microfluidic channel in a microfluidic device, such as a microfluidic chip or plate.

A control sub-system can include a computer 1973 programmed to operate the system. The control sub-system can include user interface 101 that receives instructions from a user which are transmitted to the computer and displays information from the computer to the user. The user interface 101 may be as described in U.S. Provisional Patent Application Ser. No. 62/067,429, filed Oct. 22, 2014, which is entirely incorporated herein by reference. In some cases, the control sub-system includes a communication system configured to send information to a remote server and to receive information from a remote server.

Figure 1B:
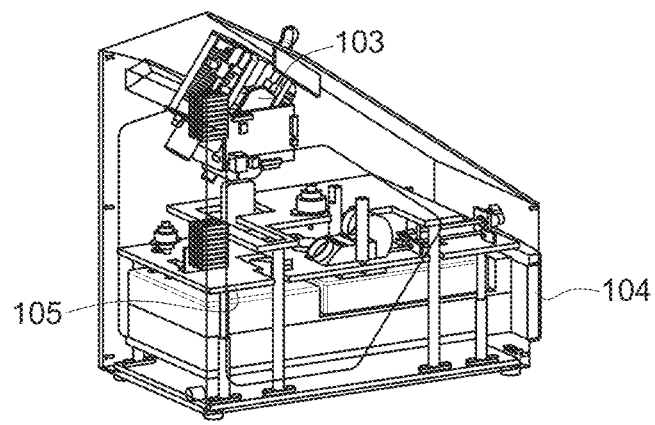
FIGS. 1B and 1C are isometric views of the system of FIG. 1A.
Figure 1C:
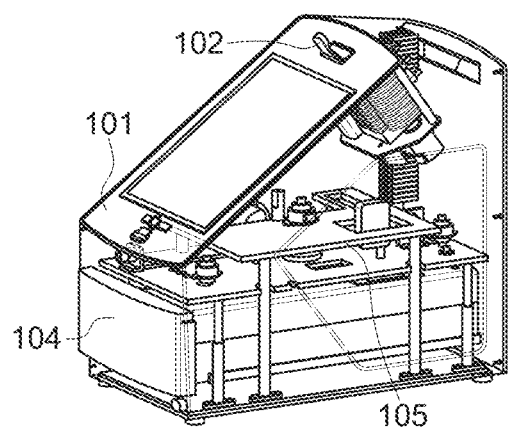

FIGS. 1B and 1C present the system of FIG. 1A in further detail. As described above, a sample cartridge interface 103 and an electrophoresis interface 105 are comprised in the system, for engaging the sample cartridge and the electrophoresis cartridge. Both the sample cartridge and the electrophoresis cartridge provided herein can be releasably or removably engaged with the system. The system of FIGS. 1A-1C can be used in forensic analysis to decode the genetic information of a single sample. In some cases, the system may be used to determine the genetic profile of a sample in less than about 6 hours, 5 hours, 4 hours, 3 hours, 2.5 hours, 2 hours, 1.5 hours, 1 hour, 30 minutes, 20 minutes, 10 minutes, 5 minutes 1 minute or less. Such time may depend upon, for example, the number of steps included in sample processing operations.

Figure 2:
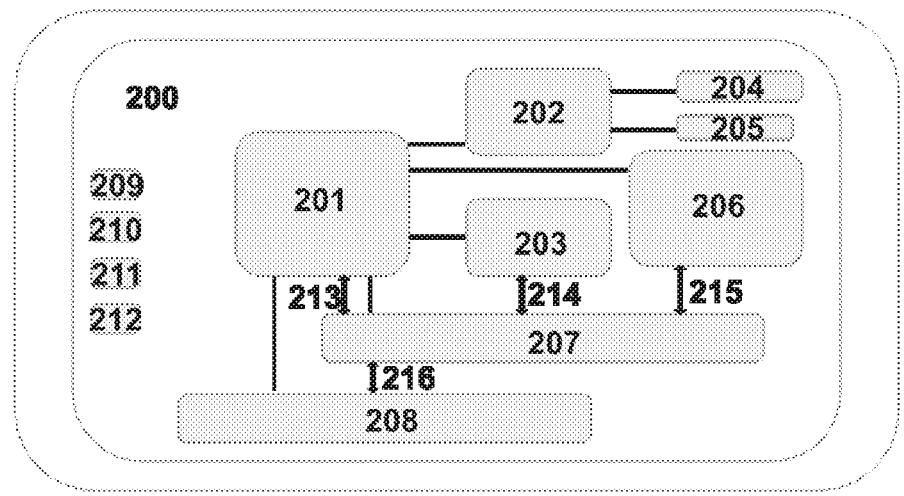
FIG. 2 shows a schematic of an example electrophoresis cartridge-comprising system.

A schematic of the system of FIGS. 1A-1C is illustrated in FIG. 2. A chassis 200 is included for structural support, which may be formed of a metallic material, such as aluminum or steel, a polymeric material, or a combination thereof. In some cases, the chassis may be structured to minimize the weight of the system. A user interface which comprises system electronic controls 201, embedded computer 202, and a user interface screen capable of identifying and reading fingerprint 204 and sample patch barcode 205, is included in the system. The user interface receives and processes requests or instructions from and delivers information to a user. It can include software programmed to execute routines for performing the operations mentioned, above, and transmit and receive information, such as computer files, from remote locations, e.g., over the internet. The user interface can also enable the user to monitor the progress of the operation and make changes to the operation of system if measurements are not within selected parameters. A sample cartridge interface 206 is provided for receiving a sample cartridge for sample processing. The sample cartridge described herein can be configured to receive one or more samples and to perform at least one of sample isolation, extraction, purification, amplification or dilution, when the sample cartridge is engaged with the sample cartridge interface of the system. Sample amplification can include polymerase chain reaction (PCR). One or more reagents that are needed for performing one or more steps of sample processing may be pre-loaded or comprised in the sample cartridge, for example, washing buffer, lysis buffer, diluent, or amplification reagents. Also comprised in the system is a fully integrated electrophoresis cartridge 207 which is releasably engageable with the system via an electrophoresis cartridge interface. The electrophoresis system comprises all essential parts for performing an electrophoretic analysis, such as an electrophoresis capillary, electrodes (e.g., anode and cathode), electrophoresis separation medium, or electrophoresis buffer. In some cases, it may comprise reagent that can be used to perform STR analysis. It may further comprise one or more reagent container for holding reagents that are used for sample processing, e.g., a lysis buffer container. The lysis buffer may be placed in fluidic communication with the sample cartridge and used for isolating the target material out of the sample during sample processing, after both the sample cartridge and the electrophoresis cartridge are engaged with the system. Once the engagement of the electrophoresis cartridge is completed, at least one automatic communication between the electrophoresis cartridge and the system may be established, for example, an electrical communication 213 between the electrophoresis cartridge and the system electronic controls 201, an optical communication 214 between a portion of the electrophoresis capillary in the electrophoresis cartridge and an optics module 203 of the system, a fluidic communication 215 between a sample inlet port of the electrophoresis cartridge and a sample outlet port of the sample cartridge, a mechanical and thermal 216 communication between the electrophoresis cartridge and a motorized drives and cooling module 208 of the system.

In an example, the integrated electrophoresis cartridge 207 has all or substantially all of the components necessary for electrophoresis in a compact unit that is readily insertable into and removable from the electrophoresis cartridge interface. This may permit a user to readily engage the cartridge 207 with the system without having to open the system. In some examples, all or substantially all of the components necessary for electrophoresis (e.g., anode, cathode and at least one electrophoresis capillary are included on a single board or support or multiple boards or supports that are securably integrated with one another.

Various chemistries are commercially available to perform STR analysis and, in particular, CODIS-compatible STR analysis. These include, for example, Globalfiler® and Globalfiler® Express (6-dye, 24-locus STR kit, from Life Technologies/Thermo Fisher Scientific (Grand Island, NY) (worldwide web site: lifetechnologies.com/us/en/home/industrial/human-identification/globalfiler-str-kit.html), and PowerPlex® Fusion (e.g., PowerPlex® Fusion 6C) from Promega Corporation (Madison, WI) (worldwide web site: promega.com/Products/Genetic-Identity/STR-Analysis-for-Forensic-and-Patemity-Testing/PowerPlex-Fusion-STR-Kits?utm_medium=print&utm_source=ishi_poster&utm_campaign=powerplex&utm_content=October).

The system provided herein may further comprise a power source 212 for supplying the power for the system, AC mains 211 for applying a voltage gradient across the anode and the cathode, one or more fans 210 for dissipate the heat for one or more parts of the system, and one or more USB ports 209 for collecting and transferring data either within the system or outside the system.

Figure 3:
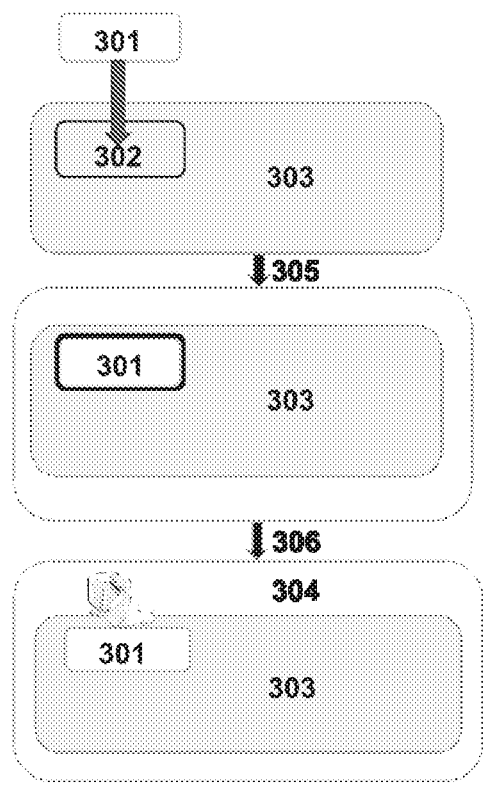
FIG. 3 schematically illustrates an example system engaging an electrophoresis cartridge.

Also provided herein the present disclosure is the electrophoresis cartridge may comprise one or more of sub-containers or sub-cartridges that are removably insertable in the electrophoresis cartridge, such as, sub-containers for holding electrophoresis separation medium, reagents for sample processing, or reagents for sample analysis. FIG. 3 shows an example of an electrophoresis cartridge comprising an electrophoresis separation medium sub-container. As shown in FIG. 3, an electrophoresis cartridge is manufactured to have a space 302 configured to specifically receive and accommodate a secondary or sub-container. A sub-container 301 used for holding the electrophoresis separation medium can be stored outside the electrophoresis cartridge 303 before the engagement of the electrophoresis cartridge with the system. The sub-container which holds the electrophoresis separation medium may be installed into the electrophoresis cartridge 305 a short time before the engagement of the electrophoresis cartridge with the system, for example, less than 1 hour, 50 minutes, 40 minutes, 30 minutes, 20 minutes, 15 minutes, 10 minutes, 5 minutes before engaging the electrophoresis cartridge with the system. Once the electrophoresis cartridge is installed into the system 306, the sub-container may be placed in thermal communication with a thermal control module of the system, which may adjust the temperature of the sub-container to a desired value and maintain it for a period of time.

II. ELECTROPHORESIS CARTRIDGE (1) General Overview

The present disclosure also provides an integrated electrophoresis cartridge for sample analysis which has a small footprint and configured to removably engage with a system for sample preparation, processing and analysis. The electrophoresis cartridge may include a capillary electrophoresis assembly which comprises an anode sub-assembly, a cathode assembly and at least one electrophoresis capillary having a first and a second end, across which a voltage gradient may be applied. The anode sub-assembly may comprise a single anode or a number of anodes. The cathode sub-assembly may comprise one cathode or a number of cathodes. The first and second end of the electrophoresis capillary may be in communication with the anode and cathode sub-assemblies respectively.

As described herein, the term "footprint" generally refers to the horizontal surface area or the area of a surface covered when the electrophoresis cartridge is placed on that surface. In some cases, the electrophoresis cartridge can have a footprint of less than or equal to about 1 $m^2$, 9000 $cm^2$, 8000 $cm^2$, 7000 $cm^2$, 6000 $cm^2$, 5000 $cm^2$, 4500 $cm^2$, 4000 $cm^2$, 3500 $cm^2$, 3000 $cm^2$, 2500 $cm^2$, 2000 $cm^2$, 1900 $cm^2$, 1800 $cm^2$, 1700 $cm^2$, 1600 $cm^2$, 1500 $cm^2$, 1400 $cm^2$, 1300 $cm^2$, 1200 $cm^2$, 1100 $cm^2$, 1000 $cm^2$, 900 $cm^2$, 800 $cm^2$, 700 $cm^2$, 600 $cm^2$, 500 $cm^2$, 450 $cm^2$, 400 $cm^2$, 350 $cm^2$, 300 $cm^2$, 250 $cm^2$, 200 $cm^2$, 150 $cm^2$, 100 $cm^2$, 90 $cm^2$, 80 $cm^2$, 70 $cm^2$, 60 $cm^2$, 50 $cm^2$, 40 $cm^2$, 30 $cm^2$, 20 $cm^2$ or 10 $cm^2$. In some cases, the electrophoresis cartridge may have a footprint between any of the two values described herein. In an example, the electrophoresis cartridge has a footprint between about 625 $cm^2$ and 3600 $cm^2$.

In some cases, the electrophoresis cartridge may further comprise an electrophoresis separation medium container for holding an electrophoresis separation medium and communication with at least one anode in anode sub-assembly through a fluid line. In some cases, a fluid handling device may be included in the electrophorese cartridge, with the aid of which, the electrophoresis separation medium may be moved into the at least one electrophoresis capillary. Any type of devices that is capable of moving the fluid may be used, such as valves, pumps, electrostatic fluid accelerators, and various other forms of process equipment.

The electrophoresis cartridge may also comprise a sample inlet port, which is able to receive a sample from a sample outlet port of the system and in fluid communication with at least one cathode in cathode sub-assembly and an opening of electrophoresis capillary.

Figure 4A:
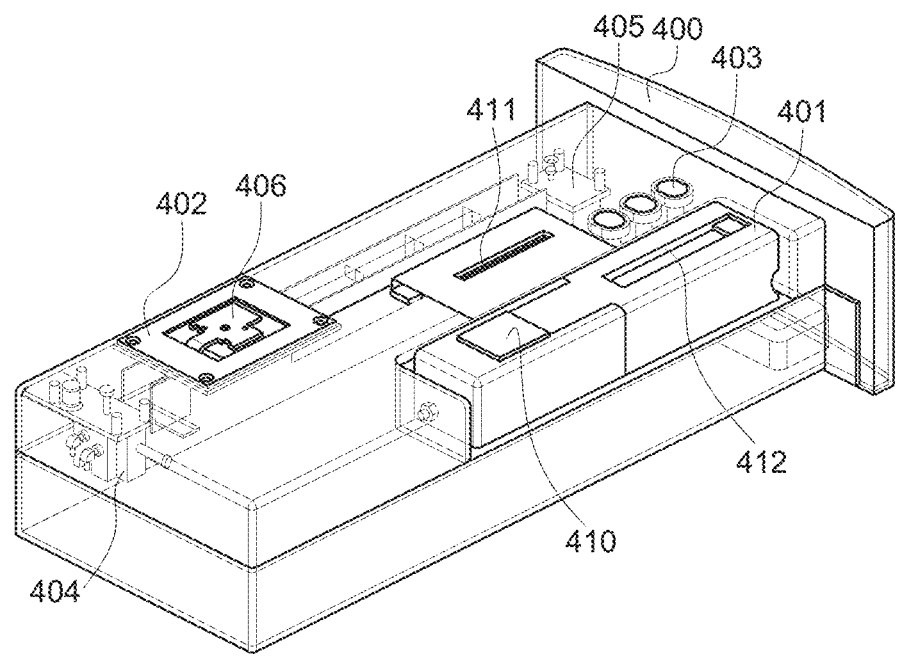
FIGS. 4A and 4B are isometric view of an example electrophoresis cartridge.
Figure 4B:
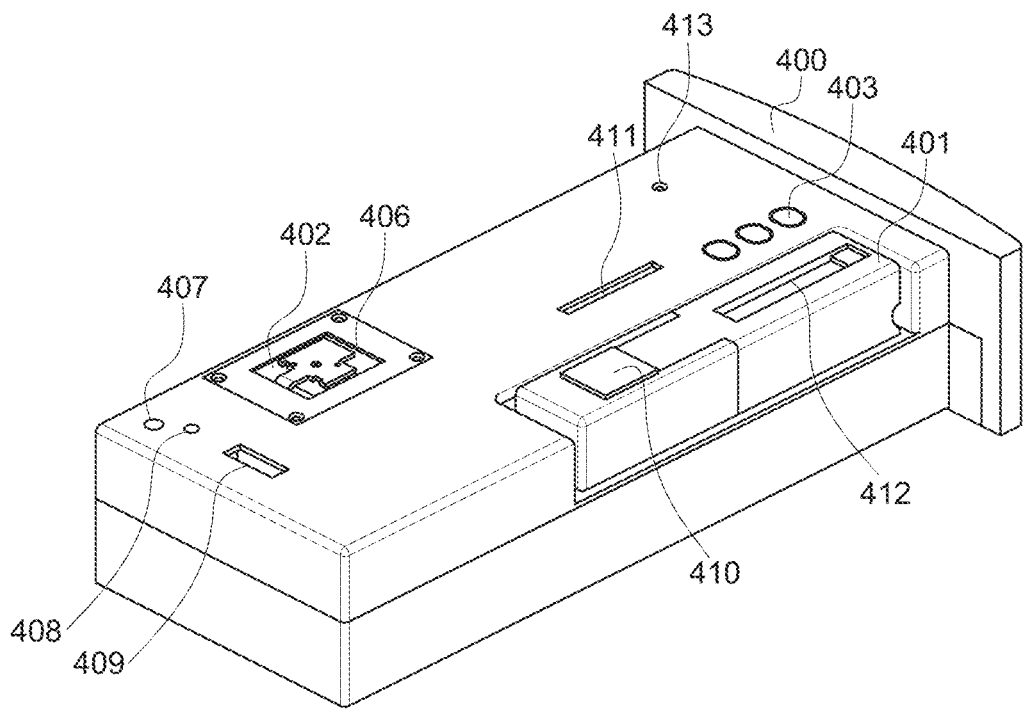

FIGS. 4A and 4B show clear shell views of an example of an electrophoresis cartridge of the present disclosure. In general, the electrophoresis cartridge may comprise a cartridge casing 400, a sub-container (or sub-cartridge) casing 401, an optical interface 402 for providing a light source and detecting signals from analytes, one or more hydrodynamic devices (e.g., fluid coupling) 403, an anode sub-assembly 404, a cathode sub-assembly 405, an electrophoresis capillary 406, an electrical interface 407, one or more mechanical interfaces (e.g., 408, 409, 412 and 413) for applying pressure or forces on parts of the electrophoresis cartridge, a thermal interface 410 for control the temperature of the sub-container 401, and an electrical interface 411 for providing a voltage between at least one anode in the anode sub-assembly and at least one cathode in the cathode sub-assembly.

(2) Cathode Sub-Assembly

Figure 6A:
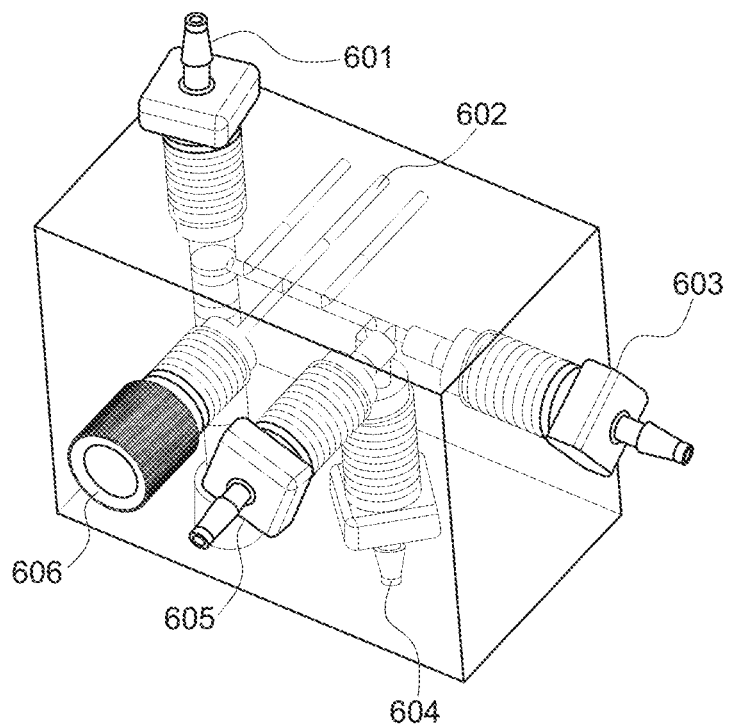
FIG. 6A shows an example cathode sub-assembly.

An example of the cathode sub-assembly that can be included in an electrophoresis cartridge of the present disclosure is shown in FIG. 6A. Three cathode nodes 602 are included in the cathode sub-assembly and places in electrical communication with an electrophoresis capillary port 606. In some cases, the cathode nodes can be disposed in close proximity to the electrophoresis capillary port, for example, at least one cathode node is positioned opposite the electrophoresis capillary port, as shown in FIG. 6A. The cathode nodes may be also placed in fluidic communication with a sample inlet port 603, a first reagent port 604, a second reagent port 605 and a waste port 601, through a passage of the cathode sub-assembly. The sample inlet port 603 may further communicate with at least one sample outlet port of the sample cartridge interface and receive the prepared sample from it. The received sample may flow though a sample line into the passage of the cathode sub-assembly and with the application of the voltage gradient, be pushed into the electrophoresis capillary. One or more reagents (e.g., electrophoresis buffer, water etc.) that may aid in performing the electrophoretic analysis may be provided and communicating with the electrodes and the electrophoresis port. A waste container is provided and in fluid communication with all other fluid ports (e.g., the sample inlet port, the electrophoresis capillary port, and the first and the second reagents ports), through the waste port and the passage of the cathode sub-assembly. Any excessive fluid or liquid leak from any one of the ports and the cathode sub-assembly may flow into the waste container and be collected.

(3) Anode Sub-Assembly

Figure 6B:
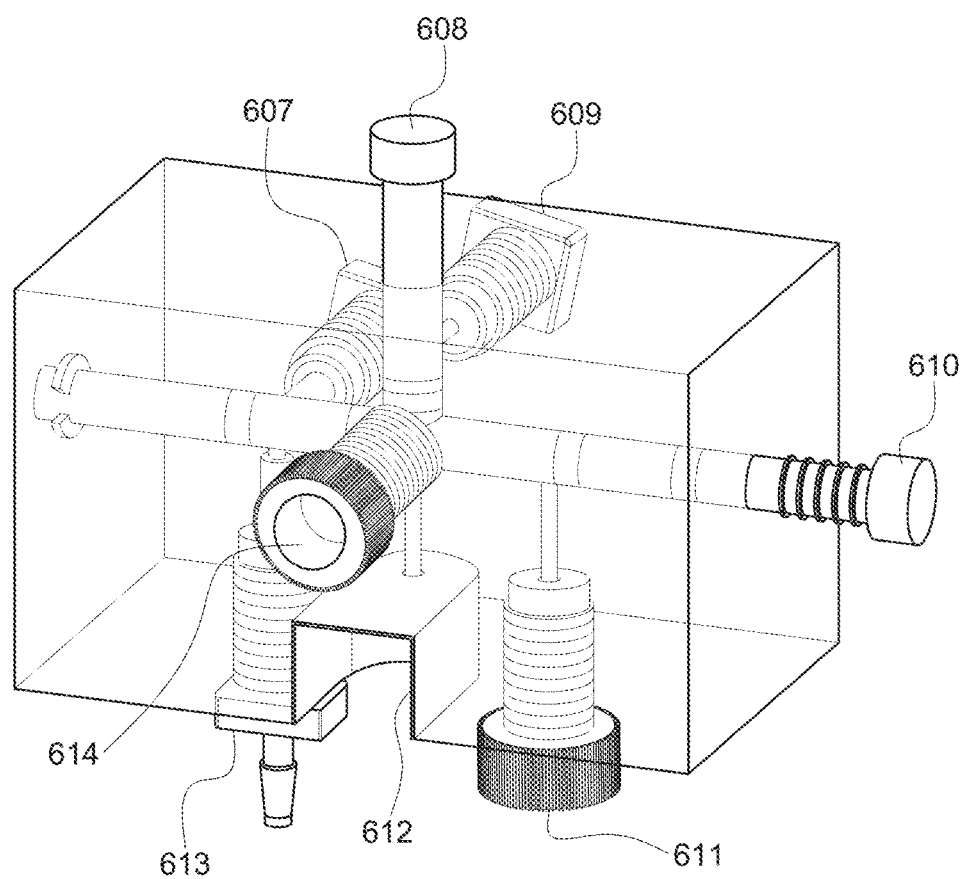
FIG. 6B shows an example anode sub-assembly.

FIG. 6B shows an example of the anode sub-assembly comprised in an electrophoresis cartridge of the present disclosure. The anode sub-assembly comprises an anode node 612 which is in electrical communication with an electrophoresis capillary port 614. The anode sub-assembly may further comprise an electrophoresis separation medium port 611, one or more reagent ports (607 and 613), and a waste port 609. All these ports are in fluid communication with the anode node 612 and the electrophoresis capillary port 614, through a passage of the anode sub-assembly. Further comprised in the anode sub-assembly are two mechanical interfaces that are in mechanical communication with the rest parts of the anode sub-assembly and aid in delivering and transferring fluid flow of the electrophoresis separation medium and the reagents among different parts of the anode sub-assembly.

In some examples, the mechanical interface may comprise a high pressure piston 608 that may move vertically and apply a high pressure onto the passage of the anode sub-assembly. The mechanical interface may comprise an anode main piston 610 which moves horizontally and is capable of relieving the pressure from the high pressure piston. The electrophoresis separation medium port 611 may receive an electrophoresis separation medium from the electrophoresis medium sub-container. The received electrophoresis separation medium may then be moved through a fluid line into the passage of the anode sub-assembly and placed in communication with the electrophoresis capillary port 614. The high pressure piston 608 then moves down to apply a high pressure onto the passage and pushes the electrophoresis separation medium into at least one electrophoresis capillary via the electrophoresis capillary port 614. One or more reagents (e.g., water, electrophoresis buffer) may be received via the reagent ports 607 and 613 and pumped into the electrophoresis capillary for the following sample analysis. In some cases, one of the reagent ports may be used to receive a regeneration fluid and in communication with the passage and one or more other parts of the anode sub-assembly. As described elsewhere herein, the regeneration fluid may be used to flush and rinse the electrophoresis capillary to renew or restore its function or performance, after one or more times of use. Time period and frequency for applying the regeneration fluid may vary, depending upon a number of factors. Non-limiting examples of factors may include temperature, property of regeneration fluid (e.g., viscosity), type of regeneration fluid, quantity of regeneration fluid, pressure or force used to drive the regeneration fluid, size of opening of the electrophoresis capillary, total surface area of the electrophoresis capillary to be regenerated, substances or material adsorbed on inner wall or surface of the electrophoresis capillary that needs to be removed, or combinations thereof. Any type of fluid that is capable of cleansing the inner wall or surface of the electrophoresis capillary may be used in the present disclosure. A regeneration fluid can be an organic fluid, an aqueous fluid, a non-aqueous inorganic fluid, or mixtures thereof. In some cases, a regeneration fluid may comprise one or more types of alkali hydroxide, such as LiOH, NaOH, KOH, RbOH, or CsOH. In some cases, a regeneration fluid may comprise one or more salts, such as sodium tetraborate and trisodium phosphate. In some cases, more than one type of regeneration fluid may be used in certain application. For example, following the rinse of a first regeneration fluid, a second and a third regeneration fluid may be used to further cleanse the electrophoresis capillary. In some cases, a regeneration fluid may have a high pH value, such as 11. In some cases, a regeneration fluid may have a low pH value, such as 2.5. In some cases, pH value of a regeneration fluid may vary depending on different applications.

Similar to the cathode sub-assembly, a waste container is provided to receive and collect any excess fluid or possible leak from the anode sub-assembly via the waste port 609 included in the anode sub-assembly.

III. ELECTROPHORESIS CARTRIDGE AND SYSTEMS

The electrophoresis cartridge can be configured to releasably engage with a cartridge interface of a sample-profiling system. As further provided, engagement of the electrophoresis cartridge may automatically establish at least one communication between the electrophoresis cartridge and the system. Non-limiting examples of communications may include fluidic communication, electrical communication, optical communication, mechanical communication, electromagnetic communication, thermal communication, electrochemical communication, radiofrequency communication, magnetic communication and combinations thereof.

Electromagnetic communication can include, for example, optical communication and/or wireless communication (e.g., radio-frequency identification (RFID), WiFi, Bluetooth). The automatic communication may be established between at least one part of the electrophoresis cartridge and at least one component of the system. For example, in some cases, an optical communication may be made between a portion of at least one electrophoresis capillary and an optics module of the system. In some examples, an electrical communication may be made between a voltage control assembly of the system and the anode and the cathode of the electrophoresis cartridge. In some cases, a fluidic communication may be established between at least one sample inlet of the electrophoresis cartridge and at least one sample outlet of the system. In some cases, one or more mechanical communication may be established between one or more mechanical interfaces of the system and the anode sub-assembly and the cathode sub-assembly of the electrophoresis cartridge.

The optics module may comprise at least one light source and one optical detector. The light source can comprise a lamp, such as an incandescent, halogen, fluorescent, gas-discharge, arc, laser, UV, or LED lamp. The light source can comprise a laser. The light source can produce a specific wavelength or range of wavelengths, including but not limited to visible light, infrared light, UV light, and combinations thereof. The light source can comprise multiple light sources, of the same or of different types, which can be used separately or in combination. In some cases, an electrical communication may be made between the electrodes (i.e., anode and cathode) and a voltage control assembly of the system. In some cases, a thermal communication may be made between at least one electrophoresis capillary and a thermal control assembly of the system. In some cases, a fluidic communication may be made between at least one electrophoresis capillary and a fluid control assembly of the system. In some cases, engagement of the electrophoresis cartridge and establishment of at least one automatic communication may occur concurrently. In some cases, engagement of the electrophoresis cartridge and establishment of at least one automatic communication may occur sequentially. For example, at least one communication may be automatically established after the electrophoresis cartridge is engaged with the system. In cases where more than one automatic communication is made, they may be made simultaneously or sequentially, or in some cases these automatic communications may be grouped and different groups of communication may occur simultaneously or sequentially. In some cases, the automatic communication is made in response to user instructions provided to a control module of the system. In some cases, the automatic communication may be triggered by some manual operation, for example, pressing a button by the user. In some cases, automatic communication is established by mechanical engagement of the cartridge with the system. For example, such engagement can place fluid conduits in into communication by sliding or snapping them into place during engagement. Automatic electrical communication can be achieved when engagement physically connects electrical terminals on both the cartridge and the interface. Automatic optical communication can occur when placement of the cartridge in the interface places a detection element, such as a capillary, in the path of an optical train of an optical assembly in the instrument. Alternatively, the system can be configured to establish communication once the system senses that the cartridge is engaged. For example, once the cartridge is engaged, the system can automatically move fluid conduits into engagement with fluid ports n the cartridge. Alternatively, one the cartridge is engaged, the system can be configured to automatically establish radio communication with the cartridge.

Once at least one automatic communication is established, it may be desirable to check or test the robustness of the communication. For example, in some cases, it may be required to check whether the automatic communication is made properly. In cases where more than one automatic communication is made, it may be useful to check the number of proper and accurate communications that have been made. Built-in circuits may be used to transform the checking results into an output signal which may subsequently be displayed on a user interface screen of the system. In some cases, each of the automatic communications may have an individual built-in circuit. In some cases, a signal built-in circuit may be used for all communications. In some cases, a number of communications may share one built-in circuit. A variety of signals may be outputted and used herein as an indicator of the checking results, e.g., audio, visual, tactile, or combinations thereof. In some cases, the outputted signal may include lights that may light up to indicate the number of accurate communications. In detail, a number of lights corresponding to each of automatic communications may be used and the number of lights that are lit off out of the total number of lights may indicate the number of communications that are inaccurately established. For example, if a total of five automatic communications are to be checked and after checking, three lights out of five are lit, then it may indicate only two automatic communications are properly established. In some instances, a numerical value may be displayed that is indicative of number of properly established communications. For example, a number may indicate that two out of five communications are made correctly. In some cases, a color may be displayed that is indicative of the proper communication. For example, a green color may indicate that the communication is accurately established. A yellow light may indicate that the communication is acceptable for further operations but not optimal, and a red light may indicate that the communication is incorrectly made and needs to be repeated. In some cases, a visual indicator such as a bar may be utilized. The quality of the communication may be indicated based on how full the bar is. In some cases, audio signals may be outputted indicating the accuracy of the communication. For example, when communication is improperly made and a fix is required, a beeping or words of warning may be produced. In some cases, the system may vibrate or provide any other type of tactile warning if the communication is not made properly.

Figure 5:
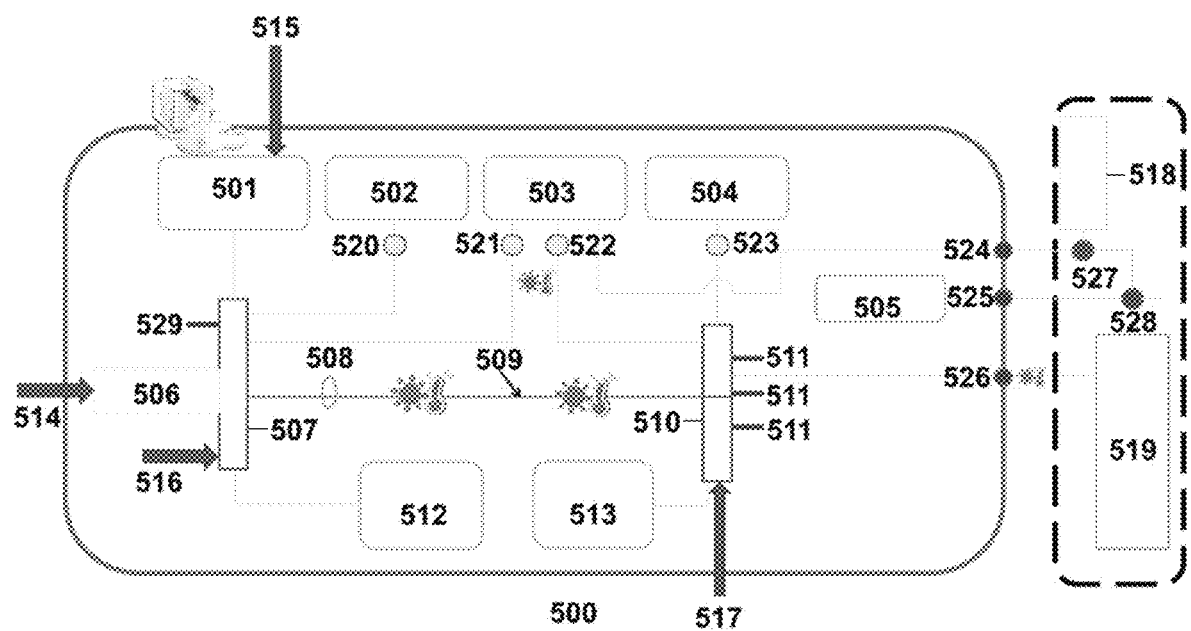
FIG. 5 shows a schematic of an example electrophoresis cartridge.

With reference to FIG. 5, a schematic of an electrophoresis cartridge 500 is shown. As described elsewhere herein, the electrophoresis cartridge 500 may comprise an electrophoresis assembly which includes an anode sub-assembly 507, a cathode sub-assembly 510, and at least one electrophoresis capillary 509 to be used in sample separation and analysis for at least one sample. In some cases, at least one capillary is one capillary or one to 10 capillaries. In some cases, a plurality of electrophoresis capillaries may be used for performing electrophoresis analysis on a number of samples. For example, in some cases, the plurality is less than or equal to about 1000, 900, 800, 700, 600, 500, 400, 300, 200, 175, 150, 125, 100, 95, 90, 85, 80, 75, 70, 65, 60, 55, 50, 45, 40, 35, 30, 25, 20, 15, 10, 5 electrophoresis capillaries may be used. In some cases, greater than or equal to about 1, 5, 10, 15, 20, 25, 30, 35, 40, 45, 50, 55, 60, 65, 70, 75, 80, 85, 90, 95, 100, 125, 150, 175, 200, 300, 400, 500, 600, 700, 800, 900 or 1000 electrophoresis capillaries may be used. In some cases, the number of electrophoresis capillaries may fall into a range of any of the two values described herein, for example, 66.

The cathode sub-assembly can include at least about 1, 2, 3, 4, 5, 6, 7, 8, 9, or 10 cathode nodes. The anode sub-assembly can include at least about 1, 2, 3, 4, 5, 6, 7, 8, 9, or 10 anode nodes. In the illustrated example of FIG. 5, three cathode nodes 511 are included in the cathode sub-assembly and in fluidic and electrical communication with a first end of the electrophoresis capillary. At least one anode node 529 is comprised in the anode sub-assembly and in fluidic and electrical communication with a second end of the electrophoresis capillary. Although presented in the present disclosure are an anode sub-assembly and a cathode sub-assembly comprising one anode node and three cathode nodes, it shall be appreciated that any number of anodes and cathodes may be used, dependent upon, different applications. For example, in some cases, equal to or less than about 20, 15, 10, 9, 8, 7, 6, 5, 4, 3, 2, or 1 anodes or cathodes may be utilized. In some cases, greater than or equal to about 1, 2, 3, 4, 5, 6, 7, 8, 9, 10, 15 or 20 anodes or cathodes may be utilized. In some cases, the number of anodes or cathodes used in a certain application may be between any of the two values described herein, for example, 11.

The electrophoresis cartridge may also comprise more than one container for holding electrophoresis separation medium and more than one reagent for sample processing and analysis. As shown in FIG. 5, an electrophoresis separation medium container 501, a first reagent container 502, a second reagent container 503, a third reagent container 504, and a fourth reagent container 505 are included in the electrophoresis cartridge 500. As provided in the present disclosure, one or more containers may be configured to be removably insertable into the electrophoresis cartridge. After each run of sample analysis is completed, one or more containers may be replaced or reused, depending upon, the applications. In some cases, it may be desirable to store or transport one or more containers at a pre-determined temperature, for example, if a thermal-sensitive electrophoresis separation medium or electrophoresis reagent is used and the trivial change of temperature may impair its performance and thereafter result in the failure of the whole analysis. In some cases, the container may be stored or transported at room temperature. In some cases, the container may be stored or transported at a high temperature. In some cases, the container may be stored or transported at a low temperature. In some cases, the container may be stored or transported at a temperature less than or equal to about 50° C., 40° C., 30° C., 25° C., 20° C., 15° C., 10° C., 5° C., 0° C., −5° C., −10° C., −20° C., −30° C., −40° C., −50° C., −60° C., −70° C., −80° C., −90° C., or −100° C. In some cases, the container may be stored or transported at a temperature greater than or equal to −20° C., −10° C., −5° C., 0° C., 5° C., 10° C., 15° C., 20° C., 25° C., 30° C., 35° C., 40° C., 45° C., 50° C., 55° C., 60° C., 70° C., 80° C., 90° C., or 100° C. In some cases, the container may be stored or transported at a temperature between any of the two values described herein, for example, 4° C. Once the containers are installed in the electrophoresis cartridge, they may be kept at the same or a different temperature. Installation of the containers may be realized manually or automatically.

Any type of electrophoresis separation media that may move and separate the sample with the separation channel in an electrophoretic analysis may be used herein the present disclosure. An electrophoresis separation medium can be solid, semi-solid, liquid (e.g., gel), such as organic material, natural macromolecules, synthetic or semi-synthetic polymers (e.g., linear homopolymer or block copolymer, cross-linked homopolymer or block copolymer), or combinations thereof. Non-limiting examples of electrophoresis separation media may include agarose, sucrose, cellulose acetate, starch-gel, polyacrylamide (e.g., the LPA line (including LPA-1) of separation gels (Beckman Coulter), the POP™ line (including POP-4™, POP-6™ and POP-7™) of separation polymers (Life Technologies), and a modified LPA with a self-coating polymer (e.g., LPA V2E (IntegenX Inc.)), hydroxyethylcellulose, and other biopolymers. To separate single-stranded nucleic acid fragments, denaturing gel electrophoresis can be performed using a separation polymer or gel that comprises a chemical denaturant (e.g., urea, formamide or N-methyl-pyrrolidone) or at a temperature (e.g., at least about 65° C., 75° C., 85° C. or 90° C. or higher) that denatures double-stranded nucleic acid fragments.

Once the electrophoresis separation medium container 501 is properly engaged with the electrophoresis cartridge, with the aid of a first mechanical interface 515 for controlling one or more fluid handling devices (e.g., a pump), the electrophoresis separation medium may be driven and moved into the anode sub-assembly 507. The electrophoresis separation medium may be further pushed into at least one of the electrophoresis capillary with the application of a second and a third mechanical interface 514 and 516 by exerting a force (or pressure) on a high pressure piston 506 and an anode main piston (not shown).

Any suitable reagent may be used in the present disclosure. Reagents may be solid, semi-solid or liquid. In cases where liquid reagents are used, they may comprise organic fluid, inorganic fluid, or a mixture thereof. For example, reagents may comprise water, electrophoresis buffer, sample processing buffer (e.g., a lysis buffer), loading buffer, regeneration fluid, or combinations thereof. For example, reagents can be provided (e.g., stored) in an aqueous solution, or can be provided (e.g., stored) in a solid or dry (e.g., lyophilized) form and then placed into solution by addition of a liquid (e.g., an aqueous solution) as appropriate. Alternatively, reagents can be provided (e.g., stored) in a substantially water-free non-ionic organic solvent (e.g., an alcohol solvent) or in a substantially water-free ionic organic solvent (e.g., a deep eutectic solvent) and can be re-hydrated by addition of an aqueous solution as appropriate, as described in PCT Patent Publication No. WO 2014/055936, which is entirely incorporated herein by reference. As used in the present disclosure, the term "regeneration fluid" generally refers to a fluid that is able to renew or restore the function or performance of one or more parts of the electrophoresis cartridge, for example, the electrophoresis capillary. In some cases, the regeneration fluid may comprise an aqueous solution. In some cases, the regeneration fluid may comprise an alkaline fluid. In some cases, the regeneration fluid may comprise one or more alkali hydroxides.

To collect any liquid or fluid that mat leak from, for example, an electrophoresis capillary, the anode sub-assembly, or the cathode sub-assembly, two waste containers 512 and 513 may be included in the electrophoresis cartridge and communicate with the anode-subassembly and the cathode sub-assembly, respectively. The collection capacity (e.g., volume) of the waster container may vary, dependent upon, the applications. In some cases, a high collection capacity may be desirable, for example, if a large amount of samples are to be analyzed and a large quantity of reagents is expected to be consumed. In some cases, a low collection capacity may be sufficient. In some cases, the collection capacity may be less than or equal to about 500 milliliter (mL), 400 mL, 300 mL, 200 mL, 100 mL, 90 mL, 80 mL, 70 mL, 60 mL, 50 mL, 40 mL, 30 mL, or 20 mL. In some cases, the collection capacity of the waste container may be greater than or equal to about 5 mL, 10 mL, 20 mL, 30 mL, 40 mL, 45 mL, 50 mL, 55 mL, 60 mL, 65 mL, 70 mL, 75 mL, 80 mL, 85 mL, 90 mL, 95 mL, 100 mL, 150 mL, or 200 mL. In some cases, the collection capacity of the waste container may be between any of the two values described herein, for example, 25 mL. Any number of water containers (e.g., at least 1, 2, 3, 4, or 5) may be included in the electrophoresis cartridge, as provided in the present disclosure. For example, besides the waste containers that are in communication with the anode sub-assembly and cathode sub-assembly, each of the reagent containers and the electrophoresis separation medium container may be provided with its water container.

In some aspects of the present disclosure, the electrophoresis cartridge may further comprise a plurality of fluid handling devices which place various parts or components of the electrophoresis cartridge in fluidic communication. As described above and elsewhere herein, any type of devices that is capable of moving or transferring the fluid may be used, such as valves, pumps, electrostatic fluid accelerators, and various other forms of process equipment. As shown in FIG. 5, pumps 520 and 521 are used to drive the reagents stored in the first and the second reagent containers 502 and 503 to the anode sub-assembly 507, through their respective fluid conduits. Similarly, pumps 522 and 523 are utilized to transfer the reagents kept in the second and the third reagent containers 503 and 504 to the cathode sub-assembly 510, through two separate fluid conduits.

In some cases, it may be desirable that at least one of the reagent containers communicate with more than one part of the electrophoresis cartridge or the system. For example, as illustrated in FIG. 5, the second and the third reagent containers 503 and 504 are placed in communication with parts outside of the electrophoresis cartridge, besides their communication with the cathode sub-assembly 510 of the electrophoresis cartridge as described above. In detail, both of the reagent containers are in fluidic communication with the sample cartridge interface 519 and a fluid handling device 518 through a fluid line. A four-port valve 528 and a three-port valve 527 are utilized to direct, control and regulate different types of fluid flow in the fluid line. Alternatively or additionally, it may be advantageous to have one or more reagent containers installed inside the electrophoresis cartridge while communicate only with parts or components which are outside of the electrophoresis cartridge. For example, in the present example as shown in FIG. 5, a fourth reagent container 505 is engaged with the electrophoresis cartridge and placed in fluidic communication with the sample cartridge interface 519 through a fluid line. In some cases, one or more hydrodynamic devices (e.g., fluid couplings 524, 525 and 526) may be included in the electrophoresis cartridge which may aid in delivering and transferring the reagents, analytes or samples through the fluid line.

The electrophoresis cartridge may also comprise a sample delivery assembly comprising at least one sample inlet port and at least one sample line, with each sample line placing a sample inlet port in communication with the first end of the electrophoresis capillary through a passage in the cathode sub-assembly. The sample inlet port may be further configured to communicate with a sample outlet port comprised in a sample cartridge interface 519, via a hydrodynamic device 526, for example, a fluid coupling or a hydraulic coupling. With the sample delivery assembly, the processed sample from a sample cartridge that is engaged with the sample cartridge interface may be directed to a separation channel (e.g., an electrophoresis capillary), via the sample line. Any suitable method for moving the prepared sample into the separation channel may be used in the context of the present disclosure. For example, field-amplified stacking (FAS) may be performed by positioning in an electrophoresis sample line a diluted mixture comprising the sample of lower salt concentration or lower ionic strength between areas comprising an electrophoresis buffer of higher salt concentration or higher ionic strength. In another example, a bolus of a material (e.g., air) can be positioned downstream of the sample in the sample line, wherein the material has an electrical conductivity that differs from the electrical conductivity of the electrophoresis buffer or the sample. When the sample is positioned across the separation channel, the sample can be electrokinetically injected into the separation channel at an appropriate voltage (e.g., about 3 kV to about 5 kV, or about 4 kV) over an appropriate amount of time (e.g., about 10 sec to about 20 sec, or about 15 sec). In some other examples, a pump may be used to drive the sample into the separation channel. In one embodiment, the capillary can be inserted into the sample line so that sample flows across the opening to the capillary. In another embodiment, the sample line can be co-axial with the electrophoresis capillary.

Once the prepared sample is moved into the separation channel, the sample may then be subjected to sample separation and analysis within the separation channel, with the aid of an electric field, as can be generated upon the application of a voltage gradient across the anode 529 and the cathode 511. Upon the effect of the electric field, analytes in the electrophoresis capillary move through the matrix (i.e., electrophoresis separation medium) at different rates, determined by one or more factors, such as mass, charge, or a combination thereof.

A portion of the electrophoresis capillary can be used as an optical window 508 which is capable of receiving a light from a light source and emitting signals that can be captured and detected by one or more detectors included in a detection assembly. In some cases, an optics module may be provided, which may comprise both the light source and the detection assembly. The light source is positioned to deliver a beam to at least one electrophoresis capillary via the optical window. One or more optical detectors (e.g., charge-coupled device (CCD), complementary metal-oxide-semiconductor (CMOS), photodetector, photo diode, or photomultiplier detector) may be optically coupled to receive signals emitted from at least one electrophoresis capillary through the optical window. As discussed elsewhere in the present disclosure, the optical communication between the optical window in the electrophoresis cartridge and both the light source and the optics module may be automatically established at the same time as the occurrence of the engagement of the electrophoresis cartridge. In one embodiment, the capillary can be movably supported by a compliant member, which can be spring-biased toward the optics assembly. The optics module in the system physically engages the compliant member causing rough lateral alignment of the capillary with the optics. Features on the engagement assembly of the optics module, when engaging the compliant member, can provide fine alignment through movement of the capillary across the compliant member.

The capillary can be thermally regulated, e.g., heated, to maintain an appropriate running temperature. The capillary can be heated by, for example, flowing temperature-controlled air over the capillary, by placing the capillary in thermal contact with a thermoelectric heater (e.g., a Peltier), or by placing the capillary in thermal contact with a resistive heater. An example of an assembly using a resistive heater to heat a capillary is described in U.S. Pat. No. 8,512,538. In another embodiment, a capillary heater assembly can comprise a flexible heater circuit comprising a resistive heater (e.g., a wire trace) in a polymeric substrate. Such flexible heater circuits are commercially available from Mod-Tronic (Thermofoil®), Kapton (polyimide heater) and McMaster-Carr (ultrathin heat sheet). One embodiment of a capillary thermal regulating assembly includes the following elements: A capillary is sandwiched between hook and loop layers of a fabric hook-and-loop fastener (e.g., a Velcro® strip). A resistive heater, such as a nicrome wire, is placed in thermal contact with the capillary through one of the fabric layers, e.g., placed in physical contact an external surface of the layer. This assembly can be supported by a thermal spreader, such as graphite, e.g., flexible graphite. In another embodiment, the capillary is sandwiched between two strips of a thermal conductive gel, such as Thermacool TC3008 (Saint Gobain, Courbevoie, France). This sandwich is, in turn, sandwiched between heat spreaders, such as a graphite film (e.g., KERATHERM® Graphite Film, Kerafol, Eschenbach, Germany). This sandwich, in turn, is sandwiched between strip heaters (e.g., Kapton).

After each cycle of sample processing and analysis is completed, it is not necessary to replace and discard the electrophoresis cartridge. Provided herein the present disclosure are electrophoresis cartridges that can be reusable for at least 2 times, 4 times, 6 times, 8 times, 10 times, 12 times, 14 times, 16 times, 18 times, 20 times, 21 times, 22 times, 23 times, 24 times, 25 times, 26 time, 27 time, 28 times, 29 times, 30 times, 35 times, 40 times, 45 times, 50 times, 60 times, 70 times, 80 times, 90 times, or 100 times. As discussed elsewhere herein, a regeneration fluid is included in the electrophoresis cartridge and used to flush and rinse the electrophoresis capillary after each time of use.

IV. METHODS

Also provided in the present disclosure are methods for preparing, processing and analyzing a genetic material comprising sample with systems described herein. In general, the method may comprise: (a) providing a system comprising an electrophoresis cartridge interface that releasably engages with an electrophoresis cartridge comprising (1) an anode sub-assembly comprising an anode, (2) a cathode sub-assembly comprising a cathode, and (3) at least one electrophoresis capillary that is in fluid communication with the anode and the cathode; (b) receiving the electrophoresis cartridge at the electrophoresis cartridge interface; (c) automatically establishing at least one of (i) an optical communication between an optical detection assembly of the electrophoresis system and a portion of the at least one electrophoresis capillary, (ii) an electrical communication between the system and the anode and the cathode, (iii) a fluidic communication between the system and the at least one electrophoresis capillary, (iv) a thermal between the system and the electrophoresis cartridge or the at least one electrophoresis capillary, and (v) a magnetic communication between the system and the electrophoresis cartridge; (d) providing a voltage gradient between a first end of the at least one electrophoresis capillary communicating with the anode and a second end of the at least one electrophoresis capillary communicating with the cathode.

In some cases, the system may further comprise a voltage control assembly (e.g., a power source) which is capable of applying a voltage gradient across the anode and the cathode, at least one thermal control assembly, at least one sample outlet, an optics module, and at least one fluid control assembly. The optics module may comprise a light source and a detection assembly comprising one or more optical detectors. The fluid control assembly may comprise a fluid container for holding one or more of reagents or fluid that are necessary for sample preparation, processing and analysis, and at least one fluid handling device that is capable of moving the fluid within the electrophoresis cartridge or the system.

In some cases, the automatically established communication comprises at least one of (i) an electrical communication between the voltage control assembly and the anode and the cathode, (ii) a sensing communication between the optics module and at least a portion of the electrophoresis capillary, (iii) a thermal communication between at least one thermal control assembly and the electrophoresis capillary, (iv) a first fluidic communication between at least one sample outlet and the electrophoresis capillary, and (v) a second fluid communication between at least one fluid control assembly and the electrophoresis capillary.

As discussed elsewhere herein, engagement of the electrophoresis cartridge and establishment of at least one automatic communication may occur concurrently or sequentially. For example, at least one communication may be automatically established after the electrophoresis cartridge is engaged with the system. In cases where more than one automatic communication is made, they may be made simultaneously or sequentially. In some cases, these automatic communications may be grouped and different groups of communication may occur simultaneously or sequentially. In some cases, the automatic communication is made in response to user instructions provided to a control module of the system. In some cases, the automatic communication may be triggered by some manual operation, for example, pressing a button by the user.

V. METHOD OF USE

Figure 9:
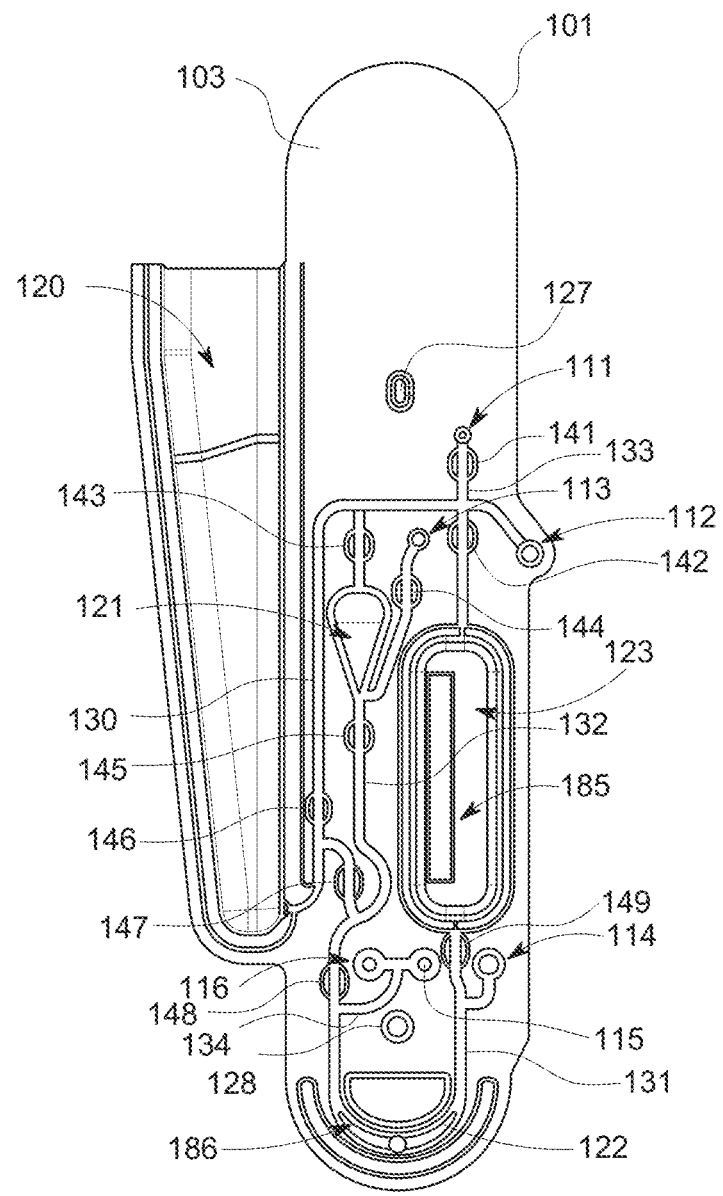
FIG. 9 shows a face of an exemplary sample cartridge body of the disclosure with elements of a fluidic circuit.

The sample cartridges of this disclosure can be used in an integrated system for preparing a sample, for example, DNA isolation and amplification. For example, in one example (FIG. 9), a sample contained on for example a swab or a card punch, can be introduced into sample chamber 120. The cartridge can be engaged with sample cartridge interface 103. Cell lysis buffer contained in an off-chip reservoir can be feed through port 112 into the fluidic channel in the cartridge and into the sample chamber 120 by closing valves 141, 142, 143, and 147. Port 112 can be connected to a syringe or to another source of positive or negative pressure. After lysis, lysate can be moved through a fluidic channel on the cartridge, for example, with a plunger that applied vacuum through port 112 to draw the fluid into reaction chamber 122 by opening valves 147, 148, 149, and 142; and closing valves 146, 145, 143, 144, and 141. In one embodiment, the DNA reaction chamber can include material that captures a pre-determined amount of analyte. Excess fluid can be moved into waste chamber 123 while the reaction chamber is filled. Reagents for performing PCR or other reactions can be introduced into the reaction chamber through ports 115 and 116. In one embodiment, as detailed in U.S. Patent Application Publication No. US 2013/0115607 and International Patent Application Publication No. WO 2013/130910, an actuator pushes on ball valves (not shown), to push the master mix in port 115 and the primers in port 116 into reaction chamber 122. A thermal control mechanism in the system can apply heat to perform thermal cycling in reaction chamber 122 of the cartridge with valves 148 and 149 closed. Following thermal cycling, valves 148, 145, 143 and 141 are opened and valves 149, 146, 147, 144, 142 are closed, and internal lane standard is dispensed from port 114 into reaction chamber 122 and pushed into mix chamber 121. Following mixing, valves 141, 142, 145, 146 are closed; valves 143 and 144 are opened and the amplified STR mixture with internal lane standard is pushed to through port 113 to a capillary electrophoresis analysis module for separation, detection, and analysis.

A. Amplification and Cycle Sequencing—One Channel

In some cases, cartridges of this disclosure can be used to perform DNA amplification and subsequent preparation for cycle sequencing. The target for sequencing can be, for example, a diagnostic target, such as a gene for genotyping, a polynucleotide bearing a somatic mutation, e.g., from a tumor, or a polynucleotide from an infectious microorganism such as a bacterium or a virus.

Figure 10:
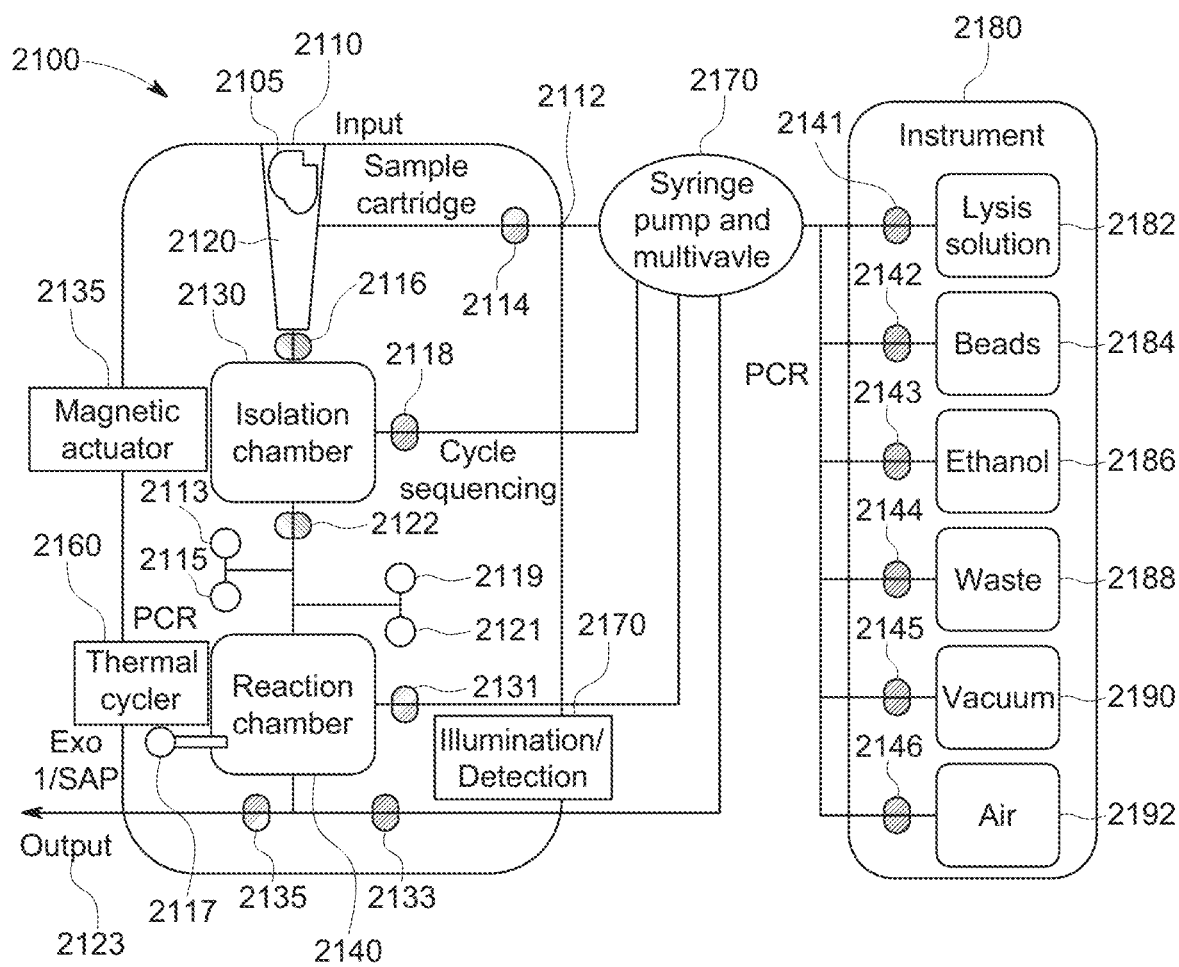
FIG. 10 shows an exemplary sample cartridge configuration of this disclosure.

An exemplary cartridge 2100 for such an embodiment is shown in FIG. 10. Cartridge 2100 has input 2110. A sample 2105 can be introduced into sample chamber 2120. The cartridge can be engaged with an interface of instrument 2180 configured to supply reagents and motive forces. Cell lysis buffer contained in an off-chip reservoir 2182 can be fed through port 2112 into a fluidic channel in the cartridge and into the sample chamber 2120 by opening valve 2114. Port 2112 can be connected to a syringe 2170 or to another source of positive or negative pressure.

After lysis, lysate can be moved through a fluidic channel on the cartridge into isolation chamber 2130 by opening valve 2116; if required vacuum can be applied by syringe 2170 by opening valve 2118. Magnetically responsive particles, e.g., beads 2184, can be introduced into the isolation chamber before or after introduction of the lysate by opening valve 2118. In another embodiment, the beads can be preloaded into isolation chamber 2130. Polynucleotides can be captured on the particles and immobilized by application of a magnetic force to the isolation chamber 2130 by magnetic actuator 2135. The particles can be washed with, e.g., ethanol 2186, and the wash moved to a waste chamber on cartridge (not shown) or off-cartridge 2188.

Then the polynucleotides can be moved into a reaction chamber 2140 for PCR by opening valve 2122. Reagents for amplifying a specific nucleotide sequence can be introduced into the reaction chamber from sealed compartments through ports 2113 and 2115 or these sealed compartments can contain the reagents in an integrated vial with seals by for example Teflon balls. These include primers, nucleotides, and hot start DNA polymerase. Primers are typically kept separate in a "primer mix" from the other ingredients, mixed as "master mix". A thermal control mechanism in the system, e.g., thermal cycler 2160, can apply heat to perform thermal cycling in reaction chamber 2140 of the cartridge. Following thermal cycling, remaining primers and nucleotide triphosphates can be degraded by adding, for example, exonuclease I and shrimp alkaline phosphatase from a sealed compartment through port 2117. Following reaction, the exonuclease I and shrimp alkaline phosphatase can be degraded by heating to 80° C. by thermal cycler 2160.

Reagents for performing cycle sequencing can then be introduced into the reaction chamber, for example, from sealed compartments on the cartridge through ports 2119 and 2121. These include a sequencing primer, nucleotides, hot start DNA polymerase, and labeled dideoxynucleotides (e.g. BigDye® terminators form Life Technologies®) for dye terminator sequencing. Primers are typically kept separate in a "primer mix" from the other ingredients, mixed as "master mix". Thermal cycling produces dideoxynucleotide-terminated polynucleotides with base specific fluorescent label.

This mixture can then be moved back into isolation chamber 2130. Magnetically responsive particles can be introduced into isolation chamber 2130 for polynucleotide capture and clean up.

Cleaned up polynucleotides can then be pushed, e.g., with air 2192 through output port 2123 to a capillary electrophoresis analysis module for separation, detection, and analysis.

In some cases, some or all reagents are stored in compartments on the cartridge for movement into the fluidic circuit as needed.

Figure 11A:
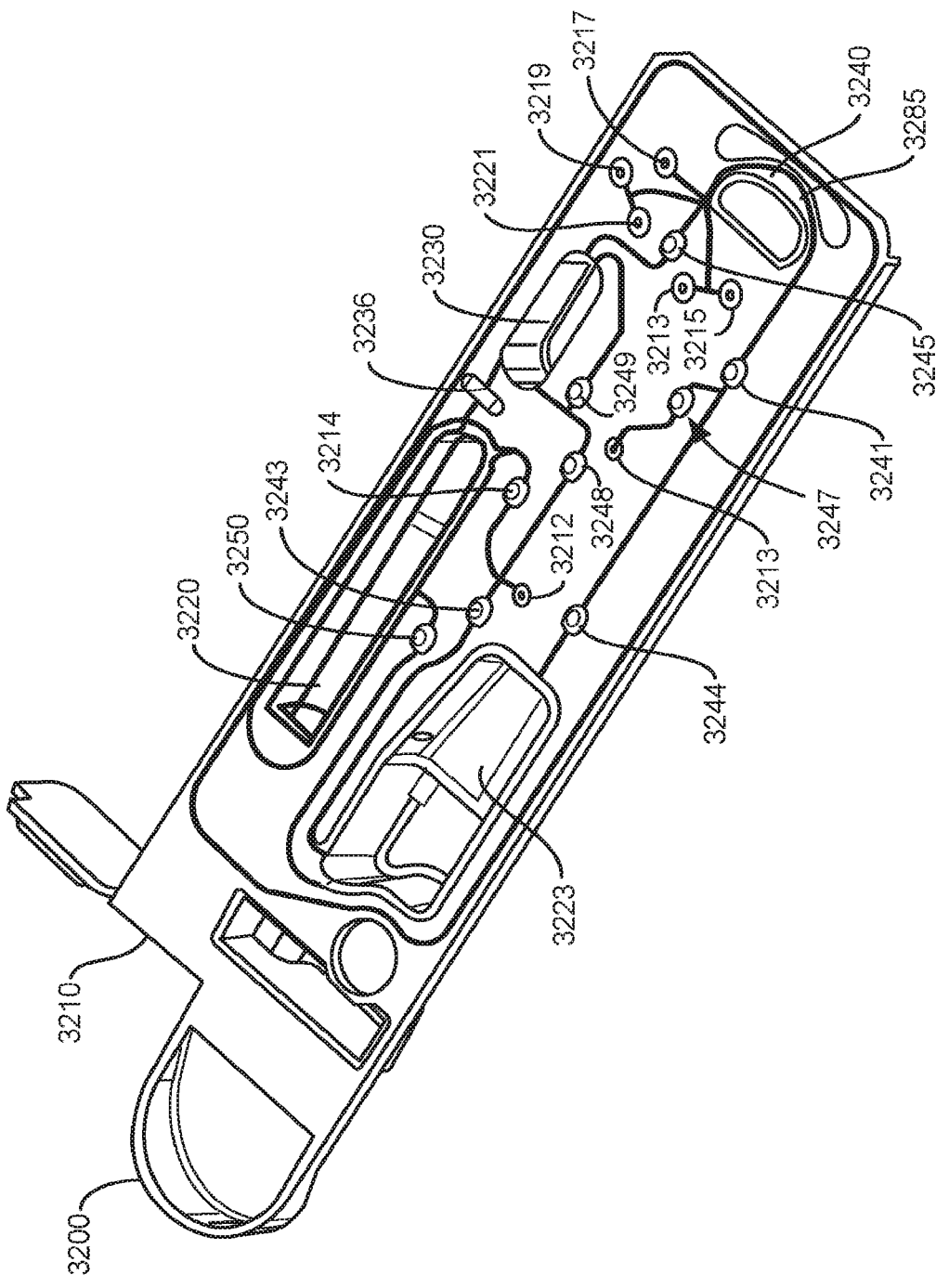
FIG. 11A shows a circuit face of an exemplary sample cartridge of this disclosure.
Figure 11B:
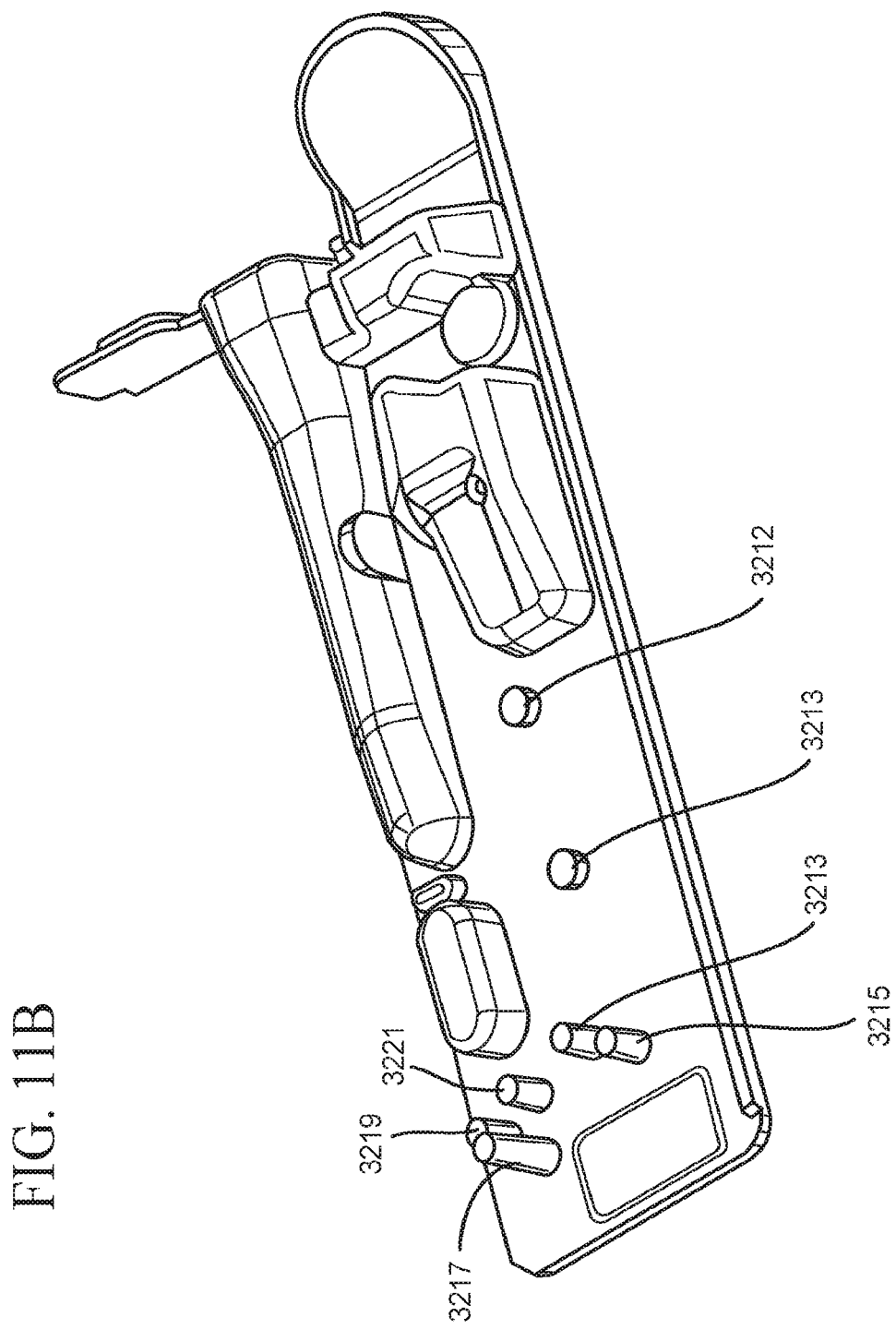
FIG. 11B shows an external view of an exemplary sample cartridge configuration of this disclosure.

Another example of a sample cartridge configured to perform this method is depicted in FIGS. 11A and 11B. Cartridge 3200 includes inlet 3210, pressure port 3212, lysis chamber 3220, filter chamber 3236, isolation chamber 3230, reaction chamber 3240, magnetically attractable beads 3285 in the reaction chamber, ports 3213 and 3215 for PCR reagents, ports 3219 and 3221 for cycle sequencing reagents, exit port 3213, and valves 3213, 3214, 3241, 3243, 3244, 3245, 3248, 3249 and 3250. The cartridge aspect in FIG. 11B shows ports 3212 and 3213, as well as open compartments for ports 3213, 3215, 3217, 3219 and 3221.

B. Amplification and Cycle Sequencing—Multi-Channel

In some cases, a sample cartridge of this disclosure has a fluidic circuit with a plurality of branches, each branch adapted to perform a separate biochemical reaction. For example, each of two branches can be used to perform one of forward and reverse strand cycle sequencing on a sample. The forward strand can be prepared for sequencing in a first branch and the reverse strand can be prepared for sequencing in a second branch. Alternatively, different branches can be used to amplify different target nucleotide sequences from the same sample.

Figure 12:
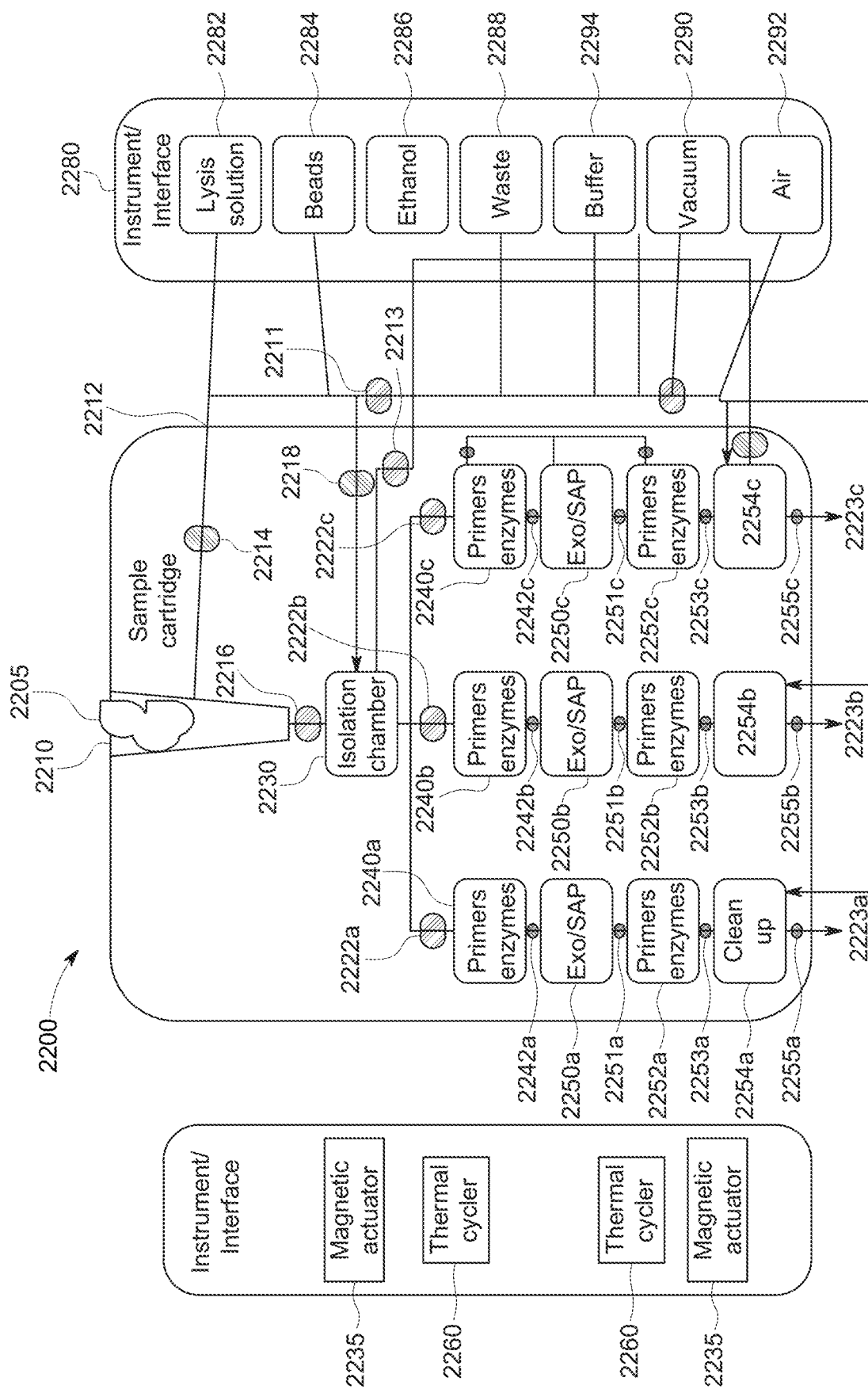
FIG. 12 shows an exemplary sample cartridge configuration having a circuit with three branches.

An exemplary cartridge 2200 for such an embodiment is shown in FIG. 12. Cartridge 2200 has input 2210. A sample 2205 can be introduced into sample chamber 2220. The cartridge can be engaged with an interface of instrument 2280 configured to supply reagents and motive forces. Cell lysis buffer contained in an off-chip reservoir 2282 can be fed through port 2212 into a fluidic channel in the cartridge and into the sample chamber 2220 by opening valve 2214. The lysis solution can be compatible with particles used to capture polynucleotides. Port 2212 can be connected to a syringe or to another source of positive or negative pressure.

After lysis, lysate can be moved through a fluidic channel on the cartridge into isolation chamber 2230 by opening valve 2216. Magnetically responsive particles, e.g., beads 2284, can be introduced into the isolation chamber before or after introduction of the lysate by opening valve 2218. Polynucleotides can be captured on the particles and immobilized by application of a magnetic force to the isolation chamber 2230 by magnetic actuator 2235. The particles can be washed with, e.g., ethanol 2286, and the wash moved to a waste chamber or off-cartridge 2288.

Then, aliquots of the polynucleotides can be moved into reaction chambers 2240a-c for PCR by opening valves 2222a-c. This can be done, for example, by opening and closing these valves sequentially, and moving material into each open chamber. Reagents for amplifying a specific nucleotide sequence can be introduced into the reaction chamber from sealed compartments or may be present in lyophilized form. A thermal control mechanism in the system, e.g., thermal cycler 2260, can apply heat to perform thermal cycling in reaction chamber 2240 of the cartridge.

Following thermal cycling, the products can be moved into chambers 2250a-c by opening valves 2242a-c. Here, primers and nucleotide triphosphates are degraded by, for example, exonuclease I and shrimp alkaline phosphatase present in lyophilized form or added from a sealed compartment. Following reaction, the exonuclease I and shrimp alkaline phosphatase can be degraded by heating to 80° C. by thermal cycler 2260.

The samples are then moved into reaction chambers 2250a-c by opening valves 2251a-c for preparation for cycle sequencing. Again, reagents for performing cycle sequencing can be introduced into the reaction chamber, for example, from sealed compartments on the cartridge or may be present in lyophilized form. Thermal cycling produces dideoxynucleotide-terminated polynucleotides with base specific labels.

The product of the thermal cycling reactions is then moved into clean-up chambers 2254a-c by opening valves 2253a-c. Magnetically responsive particles can be introduced into clean-up chambers 2254a-c for polynucleotide capture and clean up.

Cleaned up polynucleotides can then be pushed, e.g., with air 2292 through output ports 2223a-c by opening valves 2255a-c to a capillary electrophoresis analysis module for separation, detection, and analysis.

C. DNA Quantification

In some cases, sample cartridges of this disclosure include a DNA quantification function. Such a function can be useful to meter an amount of DNA for amplification determined appropriate for down-stream applications such as STR amplification.

Figure 13:
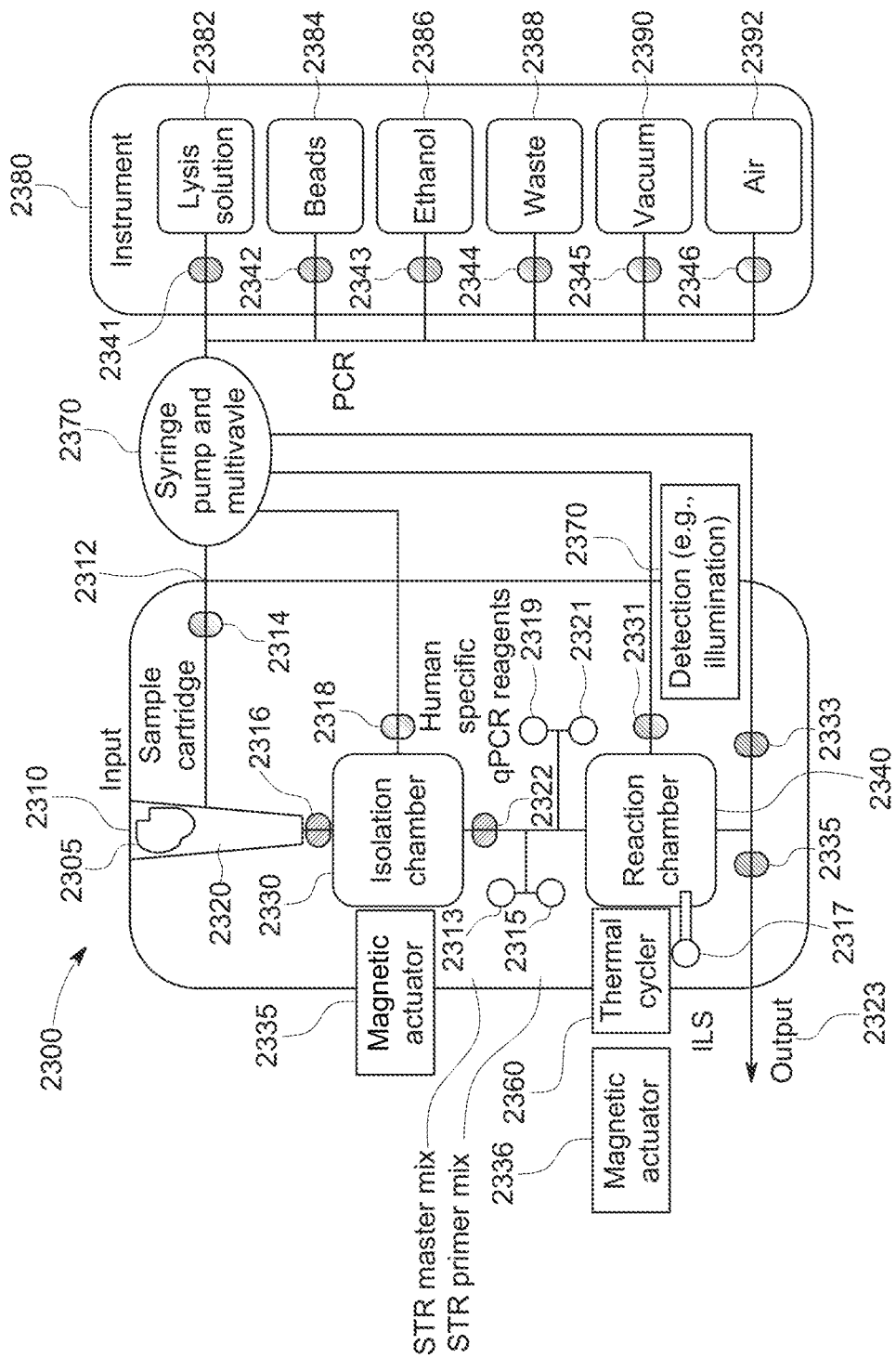
FIG. 13 shows an exemplary sample cartridge configured to perform real time PCR for quantifying the amount of DNA in a sample.

An exemplary cartridge 2300 for such an embodiment is shown in FIG. 13. Cartridge 2300 has input 2310. A sample 2305 can be introduced into sample chamber 2320. The cartridge can be engaged with an interface of instrument 2380 configured to supply reagents and motive forces. Cell lysis buffer contained in an off-chip reservoir 2382 can be fed through port 2312 into a fluidic channel in the cartridge and into the sample chamber 2320 by opening valve 2314. Port 2312 can be connected to a syringe 2370 or to another source of positive or negative pressure.

After lysis, lysate can be moved through a fluidic channel on the cartridge into isolation chamber 2330 by opening valve 2316. Magnetically responsive particles, e.g., beads 2384, can be introduced into the isolation chamber before or after introduction of the lysate by opening valve 2318. Polynucleotides can be captured on the particles and immobilized by application of a magnetic force to the isolation chamber 2330 by magnetic actuator 2335. The particles can be washed with, e.g., ethanol 2386, and the wash moved to a waste chamber or off-cartridge 2388.

Then, a predetermined amount of the particles with captured DNA can be moved into a reaction chamber 2340 by opening valve 2322. Magnetic actuator 2335 immobilizes the beads in reaction chamber 2340. Human-specific qPCR reagents, such as Quantifiler from Thermo Fisher Scientific™ or Plexor HY System from Promega™, are introduced into the reaction chamber from sealed compartments through ports 2319 and 2321. A thermal control mechanism in the system, e.g., thermal cycler 2360, can apply heat to perform thermal cycling in reaction chamber 2340 of the cartridge for qPCR. A detection device 2370, e.g., using illumination, determines the course of the reaction. This information is used to determine how much DNA is captured per unit bead volume. The amount of beads necessary to carry the predetermined quantity of DNA needed is calculated.

Material in reaction chamber 2340 can then be pushed, e.g., with air, 2392 through output port 2323.

Next, a volume of beads from isolation chamber 2330 determined to carry the desired amount of DNA is moved into reaction chamber 2340. Reagents for performing PCR can then be introduced into the reaction chamber, for example, from sealed compartments on the cartridge through ports 2313 and 2315, and the reaction thermal cycled.

Internal ladder standard 2317 can then be pushed, e.g., with air 2392 through output port 2323 to a capillary electrophoresis analysis module for separation, detection, and analysis.

The cartridges of this disclosure can be used in an integrated system for analyzing a sample, for example, DNA isolation and amplification with real time or end point detection. For real time measurement, the samples can be interrogated by an optical detection system while amplifying in reaction chamber 122. The readout can be the change in fluorescence or by melting point. The probes can be human specific for human identification, forensics, or molecular diagnostic applications, or specific for pathogens for molecular diagnostic applications, or for bioagents for biodefense applications or nonspecific intercalators for determining the amount of DNA present. Amplification methods include, for example, thermal or isothermal amplification reactions, for example, PCR, rolling circle amplification, whole genome amplification, nucleic acid sequence-based amplification, and single strand displacement amplification, single primer isothermal linear amplification (SPIA), loop-mediated isothermal amplification, ligation-mediated rolling circle amplification and the like.

The sample cartridges of this disclosure can be used in an integrated system for analyzing a sample. The assay can detect a polypeptide (e.g., immunoassay) or a nucleic acid (e.g., PCR or reverse transcriptase followed by amplification). To detect an immunoassay, after lysis of the sample and movement of the lysed sample to reaction chamber 121, ports 115 and 116 can be used to add primary and secondary antibodies to the sample. The detection can be in sample chamber 121 or the sample can be moved through port 113 to a detector.

The assay can be multiplex or single analyte. They can involve any assay to measure the presence, amount, activity, or other characteristics of the sample. These include assays that involve detection by fluorescence, luminescence, chemiluminescence, absorbance, reflectance, transmittance, birefringence, refractive index, colorimetric, and combinations thereof. In this instant disclosure, the enzyme master mix and the substrate might be individually added to the reaction and the progress or endpoint of the assay monitored optically.

In some cases, sample cartridges of this disclosure can be used to prepare samples for additional analytical devices. Analytical methods can include sequencing, chromatography, (e.g., gas or size exclusion) electrometry, ellipsometry, refractometry, interferometry (e.g., back scattering interferometry), spectrometry (e.g., mass spectrometry, NMR spectrometry, Raman spectroscopy, Surface-enhanced Raman Spectroscopy), surface plasmon resonance. Sequencing methods can include high-throughput sequencing, pyrosequencing, sequencing-by-synthesis, single-molecule sequencing, nanopore sequencing, semiconductor sequencing, sequencing-by-ligation, sequencing-by-hybridization, RNA-Seq (Illumina), Digital Gene Expression (Helicos), Next generation sequencing, Single Molecule Sequencing by Synthesis (SMSS)(Helicos), massively-parallel sequencing, Clonal Single Molecule Array (Solexa), shotgun sequencing, Maxim-Gilbert sequencing, Sanger sequencing, primer walking, sequencing using PacBio, SOLiD, Ion Torrent, or Nanopore platforms.

For STR applications, after thermal cycling, other reagents such as molecular weight markers (size standards) can be combined with the PCR product. Products of the PCR can be moved off chip for analysis through an output line connected to port 113 (sample out).

In cases where the reaction is a short tandem repeat (STR) reaction, in some jurisdictions for casework samples, the amount of human DNA may need to be quantified. The typical forensic process is to quantify an extracted sample using real time polymerase chain reaction (PCR) in a separate instrument before the sample is STR amplified. In this instant disclosure, a human specific probe is added to the STR mixture which has fluorescence outside the range used by the STR kit. The reaction chamber 122 is interrogated by a suitable wavelength of light for the human specific probe while the STR is being PCR amplified. The human specific probe can be a quencher such as a Black Hole Quencher® or a TaqMan® probe or other chemistries well know to one skilled in the art. As the PCR cycles increase, the fluorescence from the human specific probe is monitored to quantify the amount of human DNA in the reaction. In a preferred embodiment, the number of amplification cycles can be adjusted based upon the amount of human DNA measured; this can be on a cartridge-by-cartridge monitoring if independent thermal cyclers are in use. One advantage is that the human specific probe will allow the concurrent STR amplification to achieve an optimal amplification and produce an amount of STR product that is optimal for the kit. A second advantage is the real time monitoring concurrent with the STR amplification allows integration of a sample-to-answer system without having an additional separate quantification process. A third advantage is for low copy number samples where there is barely enough sample to produce a good STR profile the integration of the quantification with the STR amplification prevents the aliquot typically used for quantification from causing the remaining sample to not have enough DNA for a good STR amplification.

VI. COMPUTER CONTROL SYSTEMS

Figure 8:
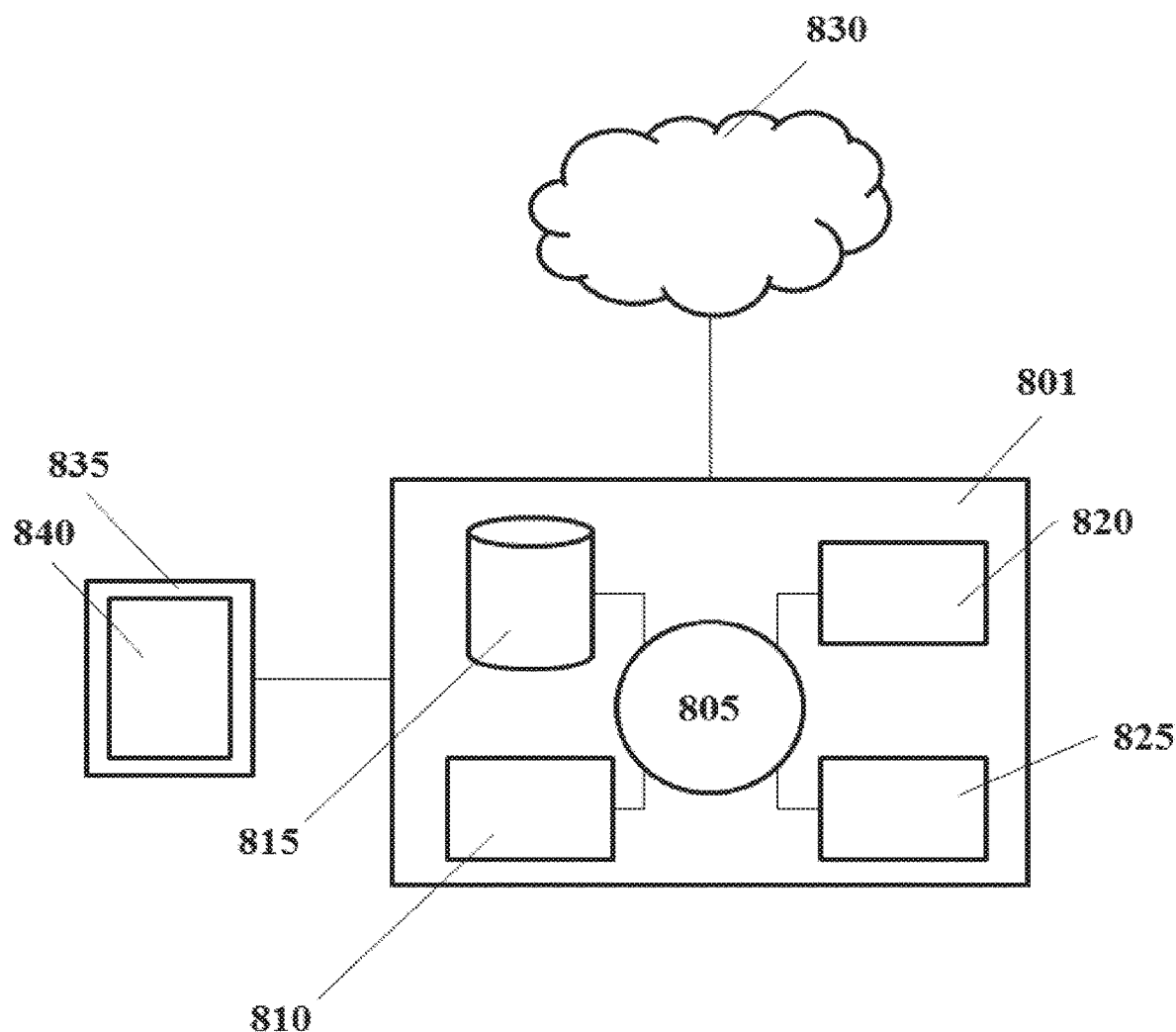
FIG. 8 shows a computer system that is programmed or otherwise configured to facilitate sample preparation, processing and/or analysis.

The present disclosure provides computer control systems that are programmed to implement methods of the disclosure. FIG. 8 shows a computer system 801 that is programmed or otherwise configured to facilitate sample preparation, processing and/or analysis. The computer system 801 can regulate various aspects of sample preparation, processing and/or analysis of the present disclosure, such as, for example, engaging an electrophoresis cartridge with an electrophoresis interface of a system for sample preparation, processing and/or analysis (see, e.g., FIGS. 1A-1C). The computer system 801 can be integrated with such system.

The computer system 801 includes a central processing unit (CPU, also "processor" and "computer processor"

herein) 805, which can be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface (UI) 840, for example, for enabling the user to instruct the computer system 801 to begin sample preparation, processing and/or analysis. Examples of UI's include, without limitation, a graphical user interface (GUI) and web-based user interface. The user interface 840 may be as described in U.S. Provisional Patent Application Ser. No. 62/067,429, filed Oct. 22, 2014, which is entirely incorporated herein by reference.

Methods and systems of the present disclosure can be implemented by way of one or more algorithms. An algorithm can be implemented by way of software upon execution by the central processing unit 805. The algorithm can, for example, implement the general operation of a system for sample preparation, processing and/or analysis. In some examples, the algorithm can regulate the sequential opening and closing of valves or the operation of an electrophoresis cartridge.

VII. EXAMPLES

Example 1

The sample cartridge is a polypropylene molding with an integrated syringe barrel and sample chamber with a polyethylene heat seal over the area of the fluidics. There is an absorbent material in the waste chamber and a small dot of capture material in the reaction chamber. The barrel is loaded with a quantity of lysis solution (500-1000 µL) isolated between two rubber plungers. There are three reagent vessels on the chip that seal with top and bottom Teflon balls; two for the two parts of the Global Filer mastermix/primer which are loaded with 7-100 µL of solution and one containing a water/ILS solution that is used as a diluent before transfer to the cathode.

Figure 14A:
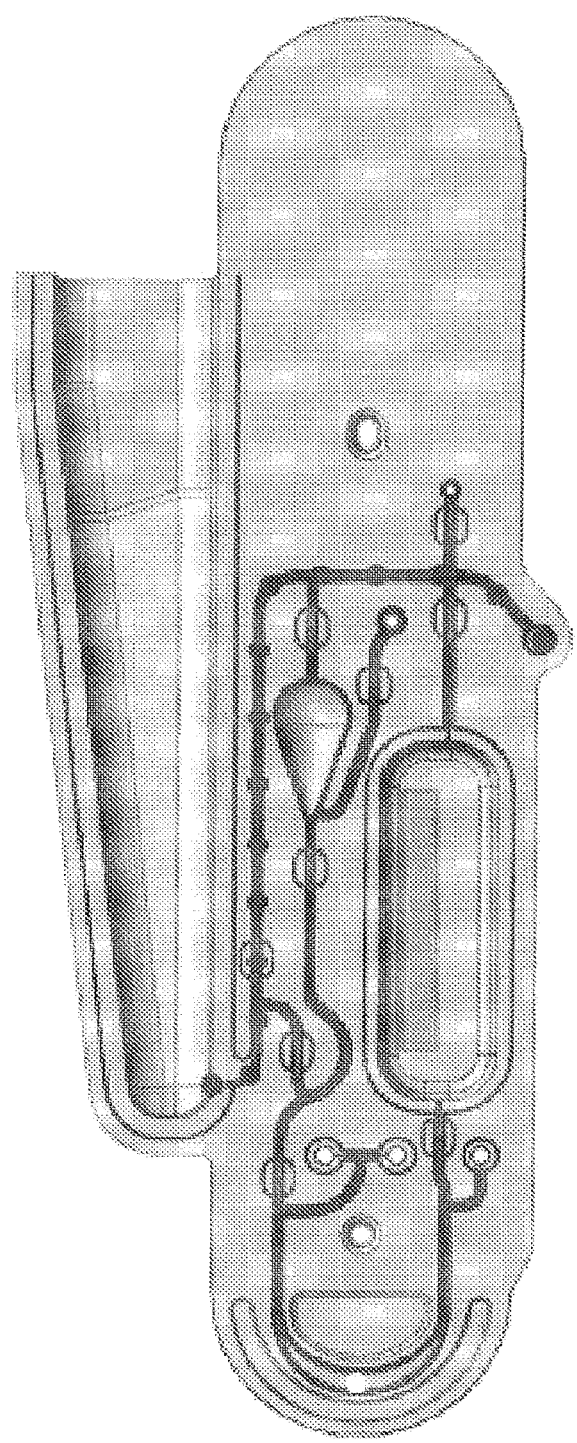
FIGS. 14A-14E show a method of processing a sample for analysis.
Figure 14B:
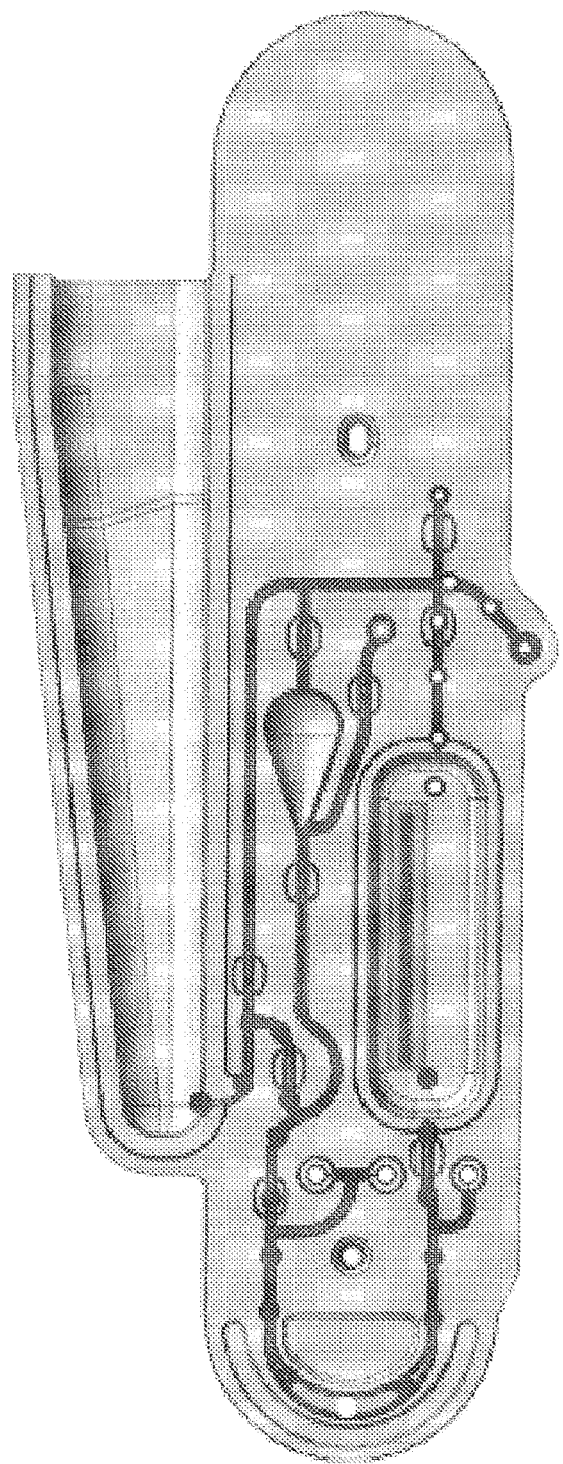
Figure 14C:
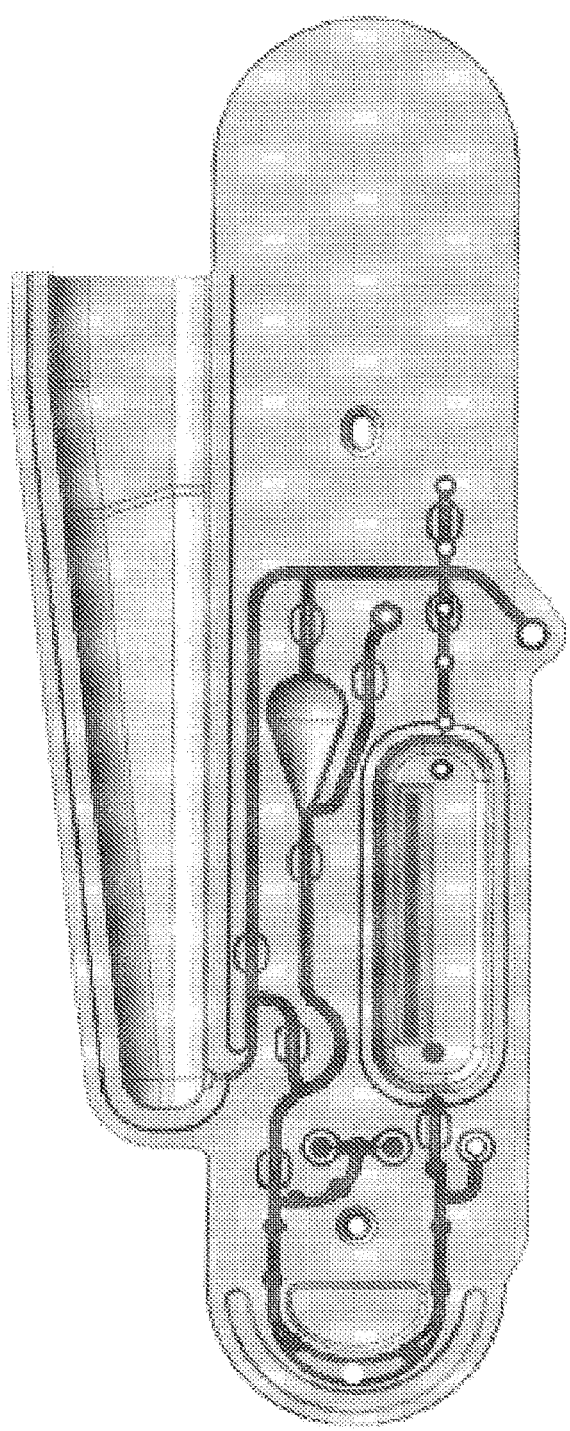
Figure 14D:
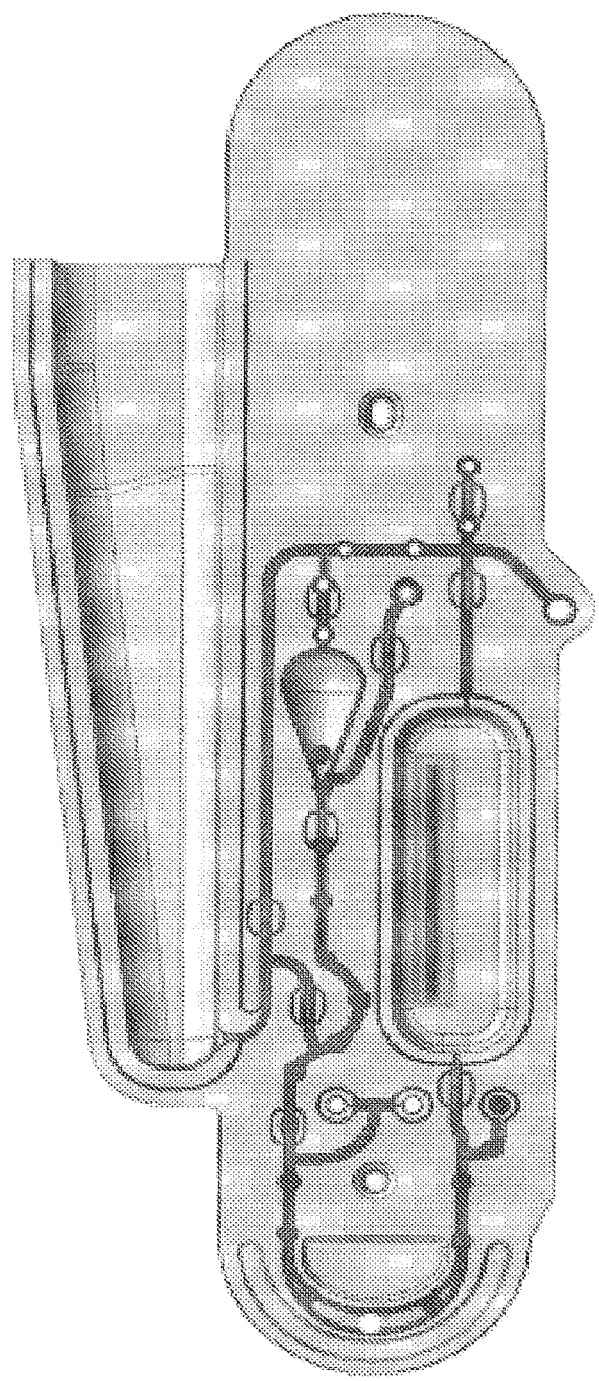
Figure 14E:
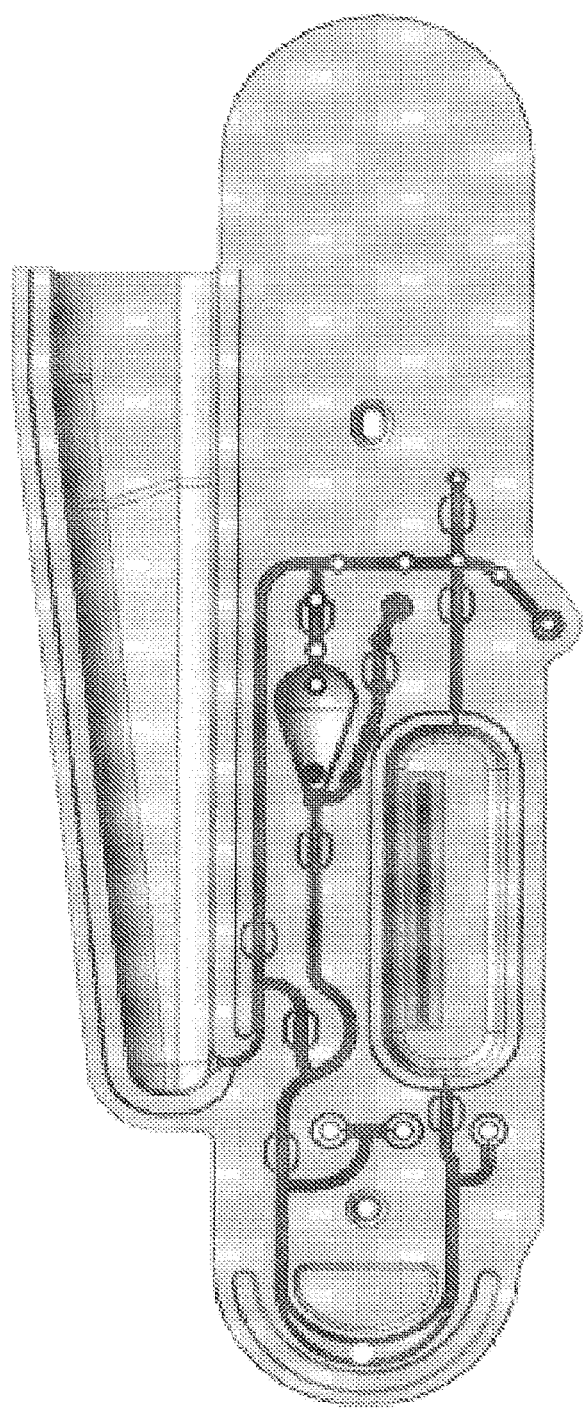

Process Steps
1. Load cartridge
   a. User removes cartridge from packaging and load into the instrument. Instrument senses cartridge and engages. The rams are in the retracted state.
   b. Initial valve coining. The rams move to the closed state.
2. Load sample.
   a. The sample is recorded and loaded.
3. Lysis (See FIG. 14A for path of liquid.)
   a. The lysis heater is turned on.
   b. The valves are set to the appropriate position for delivery from the syringe to the lysis chamber.
   c. The back rubber plunger is engaged by the pump shaft on the instrument.
   d. The entire contents of the syringe is delivered to the lysis chamber.
   e. The valves are moved to the vent position.
   f. The syringe plunger is withdrawn and the syringe fills with air.
   g. The valves move to the delivery position.
   h. The air is injected into the lysis chamber to effect mixing.
4. Transfer and capture (See FIG. 14B. Pulled by syringe inlet from sample chamber into reaction chamber.)
   a. The valves are set to a state where a path is open between the lysis chamber and the waste container that passes through the reaction chamber.
   b. A vacuum is pulled on the waste container.
   c. The lysate is pulled out of the chamber, through the reaction chamber and thus over the capture media, and into the waste where it is absorbed by the material in the chamber.
   d. The valves are switched to the delivery position and the plunger is brought forward.
   e. The pull is executed again to insure all the free lysate material is out of the chamber, through the reaction chamber and in the waste.
5. Mastermix/primer loading and thermocycling. (See FIG. 14C. Reagents pumped into reaction chamber.)
   a. The valves are set to a state where a path is open through the waste to the vent
   b. The two PCR mix vials are emptied into the reaction chamber
   c. All valves are closed.
   d. Thermocycling begins.
6. Polymer fill, concurrent with cycling
   a. Open anode input and anode output valve
   b. Flush anode
   c. Close anode output valve
   d. Fill capillary
   e. Rinse Cathode
7. Mix Sample and diluents (See FIG. 14D. Sample and diluents to mix compartment.)
   a. The valves are set to a state where a path is open between the reaction chamber and the mix chamber to vent.
   b. The diluent vial is emptied up into the mix chamber.
8. Sample delivery to cathode (See FIG. 14E. Product pushed to out port.)
   a. The valves are set to a state with a path from the syringe to the mix chamber to the sample outlet.
   b. The syringe is driven in to place the sample.
9. Sample injection and run
   a. The sample is injected into the capillary
   b. The buffer pump sweeps the sample out of the capillary and flushes the lines
   c. Electrophoresis and detection is run.

Example 2

Another protocol, performed on cartridge 1801, includes the following steps. Valve configurations are shown in FIG. 15.

1 Load Sample Cartridge
2 Prime Lysis to waste*
3 Dispense Lysis to Lysis Chamber
4 Mix Lysis with Air
5 Mix and Heat Lysis
6 Pull Lysate to Waste via Reaction Chamber
7 Push Primer Mix and Master Mix to Reaction Chamber
8 Thermal Cycling
9 Push Internal Lane Standard and Product thru Reaction Chamber to Mix Chamber
10 Push Residual Internal Lane Standard and Product to Mix Chamber with Air Pump
11 Push Product to Cathode
12 Water Rinse of Mix Chamber and Product Output to Cathode
13 Water Rinse of Mix Chamber and Reaction Chamber
14 Flush Water out of Sample Cartridge to Waste Chamber 15 Flush water from Sample Cartridge and Line to Cathode
16 Release
  1. All 500 ul will be dispensed into the lysis chamber and then pushed into the waste chamber after step 5.
  2. Residual Primer Mix and Master Mix in line to Reaction Chamber just below B0, will remain in Sample Cartridge after the run.
  3. Flush Sample Cartridge free of water.

Example 3

Figure 16:
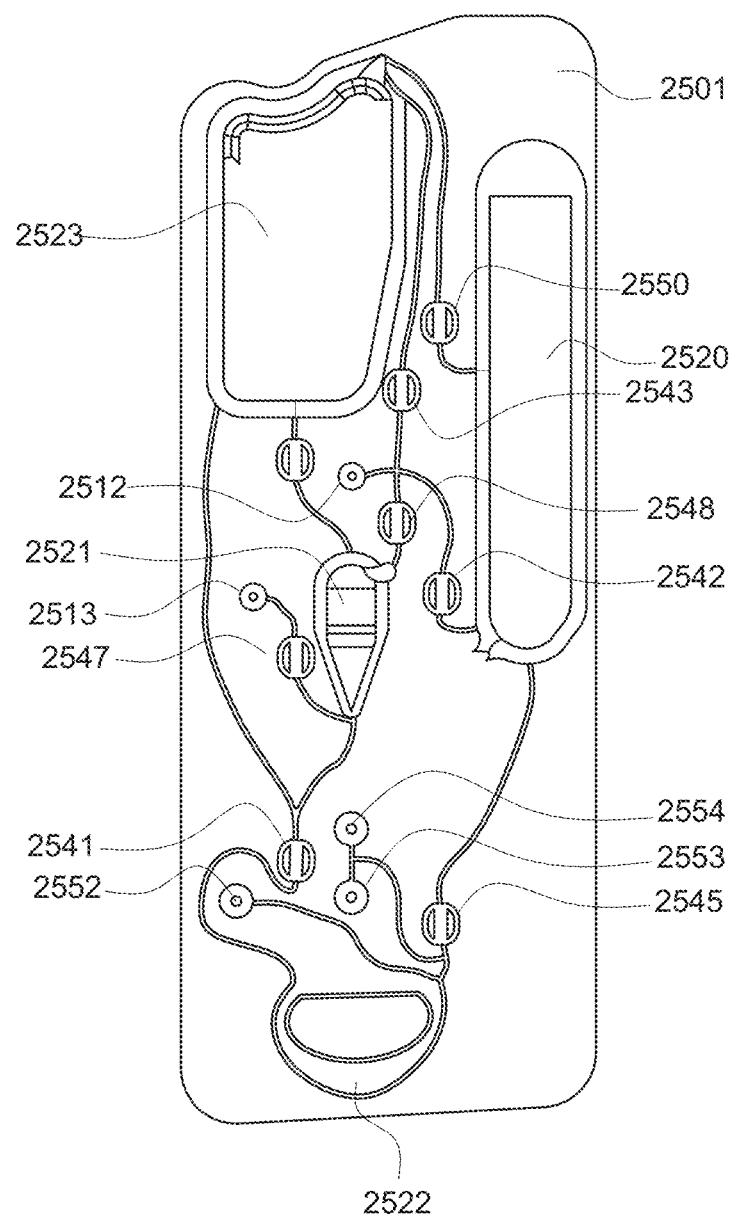
FIG. 16 shows an exemplary sample cartridge configuration of this disclosure.

Another protocol, performed on cartridge of FIG. 16, includes the following steps. All valves begin in open configuration.
  1. Close valves 2543 and 2548. Load Sample Cartridge.
  2. Push lysis buffer from port 2512 through valve 2542 to Lysis Chamber 2520
  3. Mix Lysis with Air: Push air through the following open valves and forcing air through the circuit: 2512→(open) 2543→2523→2541→2522→2545→2520
  4. Mix and Heat Lysis
  5. Pull Lysate to Waste via Reaction Chamber 2520→2545→42522→2523→2543→2512
  6. Close valve 2545; Push Primer Mix 2554 and Master Mix 2553 to Reaction Chamber 2522
  7. Close valve 2541; Thermal Cycling
  8. Open valve 2541; Push Internal Lane Standard 2552 and Product thru Reaction Chamber 2522 to Mix Chamber 2521
  9. Push Product to Cathode 2512→2548→2521→2547→2513

Example 4

This example shows a method to perform cycle sequencing on a nucleic acid. (Refer to FIG. 10.)
Raw sample
Lyse with chaotroph
Bead purify DNA
Move to magnetic bead processing chamber
Add paramagnetic beads
Wash 2× with diluted ethanol
Elute DNA or move beads to reaction chamber(s)
Perform PCR amplification (make enough of target region to sequence; if multiple regions are being sequenced, the sample had to be split or parallel samples for each loci)
  Add PCR primers and premix with enzyme from vials 2113 and 2115
  Thermal cycle
ExoI/SAP (destroys PCR primers and nucleotide triphosphates)
  Add Exo/SAP reagents (Exonuclease I/Shrimp Alkaline Phosphatase)
  Incubate 37° C./for 15 min
  Heat to 80° C. for 15 min
Cycle sequence
  Add cycle sequencing primer and premix with enzyme and BigDye terminators
  Thermal cycle
Cleanup cycle sequencing products using paramagnetic beads
  Move to magnetic bead processing chamber
  Add beads and chaotroph
  Wash 2× with diluted ethanol
  Elute into water or buffer
Send products to capillary electrophoresis Example 5

This example shows a method to perform amplification of markers, e.g., diagnostic markers, followed by cycle sequencing of the amplification product. (Refer to FIG. 12.)
Raw sample
Lyse with chaotroph (on cartridge or instrument)
Bead purify DNA
  Add beads to isolation chamber
  Wash 2× with dilute ethanol
  Elute DNA or move beads
Purified DNA produced
Split purified DNA to reaction chambers in aliquots
Perform PCR amplification on each locus of interest in separate chambers
  Add PCR primers and premix with enzyme
  Thermal cycle
  Destroy PCR primers and nucleotide triphosphases
  Add Exo/SAP reagents (Exonuclease I/Shrimp Alkaline Phosphatase)
  Incubate 37° C. for ~15 min, heat to 80° C. for 15 min
Cycle sequence
  Add cycle sequencing primer and premix with DNA polymerase and labeled dideoxy terminators
  Thermal cycle
Cleanup cycle sequencing products
Move cycle sequencing products to cleanup chamber and perform bead-based cleanup
  Add beads and chaotroph
  Wash 2×
  Elute
Send products to capillary electrophoresis Example 6

This example shows a method to quantify amount of human DNA before STR amplification for human identification or diagnostic fragment sizing (Refer to FIG. 13.)
Raw sample
Lyse with lysis buffer (chaotroph or something else)—bubble+heat
Bead purify DNA
Move lysate to magnetic bead processing chamber
Add beads
Wash 2×
Move 10% beads to reaction chamber where the beads are captured by another magnet
Perform PCR quantification
  Add Quantifiler primers and master-mix
  Thermal cycle
  Excite and detect signal and determine Ct
  Stop after reaching Ct and calculate bead dilution (optimized for downstream STR chemistry)
Wash reaction chamber
STR amplification in reaction chamber
  Pump beads from magnetic bead processing chamber through reaction chamber into waste adjusting the amount of beads captured by using the qPCR optics (with beam splitters)—i.e. "counting" beads. Actuate magnet to capture correct dilution of beads in reaction chamber.
  Add STR premix and master mix
  Thermocycle
Cleanup STR amp products using a bead-based cleanup (optional based on quantification)

Add beads and chaotrophs to reaction chamber
Wash 2× with dilute ethanol
Elute and keep beads on magnet
Add ILS
Move amp product to capillary electrophoresis system Example 7

The electrophoresis cartridge is a polypropylene molding comprising an anode sub-assembly, a cathode sub-assembly, an electrophoresis capillary and a gel sub-cartridge containing cross-linked polyacrylamide. The electrophoresis capillary has a first and a second end, each of which is in electrical communication with the anode sub-assembly and the cathode sub-assembly respectively. A portion of the electrophoresis capillary is used as an optical window for receiving a light from a light source and providing signals of the analytes for detection and further analysis. The cathode sub-assembly comprise there cathodes and a cathode main piston, and in fluid communication with the first end of the electrophoresis capillary, a water container, a buffer container and a first waste container. The anode sub-assembly comprises an anode main piston and a high pressure piston, and is in fluid communication with the second end of the electrophoresis capillary, the gel sub-cartridge, the water container, a regeneration fluid container and a second waste container. The electrophoresis cartridge further comprises a lysis buffer container, a sample inlet port in fluidic communication with a sample cartridge interface having a sample outlet port.

Example 8

The electrophoresis system is highly integrated and configured to removably engage with a system for sample preparation, processing and analysis. In general, the system comprises there fully-integrated and automated components, i.e., a user interface, a sample cartridge interface and an electrophoresis cartridge interface. The sample cartridge interface and the electrophoresis cartridge interface are configured to releasably engage a sample cartridge for sample processing and an electrophoresis cartridge for sample analysis. The user interface further comprises a control module, a user interface screen and an embedded computer system. The user interface is configured to read and identify the fingerprint of a user and barcodes of sample packaging. A user inputs one or more instructions or requests via the user interface screen and the embedded computer processes the requests and transforms the requests into signals which then initiate the operation of the system.

A user removes an electrophoresis cartridge from packaging and load into the instrument. Instrument senses the cartridge and engages. Multiple communications between the electrophoresis cartridge and the system including: (i) a fluidic communication between an inlet port of the electrophoresis cartridge and an outlet port of a sample cartridge comprised in the system, (ii) an electrical communication between electrodes (i.e., anode and cathode) of the electrophoresis cartridge and a power source of the system, (iii) an optical communication between an optical window of the electrophoresis cartridge and an optics module of the system, (iv) a first thermal communication between the electrophoresis capillary and a first thermo control assembly of the system, (v) a second thermal communication between a gel sub-cartridge of the electrophoresis cartridge and a second thermal control assembly of the system, (vi) a first mechanical communication between an anode sub-assembly of the electrophoresis cartridge and a first mechanical interface of the system, (vii) a second mechanical communication between a cathode sub-assembly of the electrophoresis cartridge and a second mechanical interface of the system, and (viii) a magnetic communication between the electrophoresis cartridge and the system, are established concurrently with the engagement of the electrophoresis cartridge.

Electrophoresis gel stored in the gel sub-cartridge is pumped and injected into the electrophoresis capillary by a high pressure piston comprised in the anode sub-assembly. Once the gel injection is completed, a washing buffer is pumped into a passage of the cathode sub-assembly for removing excessive gel remained in the cathode sub-assembly. Subsequently, a prepared analyte is directed into the electrophoresis capillary from the sample line in the cathode sub-assembly. A voltage gradient is then applied across two ends of the electrophoresis capillary to perform electrophoretic analysis and separate different components of the analyte which emit distinguishable optical signals upon the illumination of a laser. The signals are detected by a CCD camera comprised in the optics module and subjected to further analysis. Conclusion is drawn based on the results.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:
1. An electrophoresis cartridge, comprising:
an integrated electrophoresis assembly including:
(1) an anode sub-assembly comprising an anode,
(2) a cathode sub-assembly comprising a cathode, a passage, an electrophoresis capillary port, a sample inlet port, and at least one node in electrical communication with the electrophoresis capillary port and in fluidic communication with the sample inlet port; and
(3) at least one electrophoresis capillary having a first end in fluid communication with the cathode sub-assembly and a second end in fluid communication with the anode sub-assembly, wherein said cathode and said anode provide a voltage gradient between said first end and said second end of said at least one electrophoresis capillary;
a reagent container comprising an electrophoresis buffer;
a fluid conduit in fluidic communication between the reagent container and the cathode sub-assembly;

a pump configured to transfer the electrophoresis buffer from the reagent container to the passage of the cathode sub-assembly through the fluid conduit; and a sample line placing the sample inlet port in fluidic communication with the first end of the at least one electrophoresis capillary through the passage in the cathode sub-assembly, wherein the electrophoresis cartridge is removably engageable with a system having an electrophoresis cartridge interface that releasably engages the electrophoresis cartridge and in an engaged state automatically establishes communication between the system and the electrophoresis cartridge.

2. The electrophoresis cartridge of claim 1, further comprising:
   (a) an electrophoresis separation medium container configured to hold an electrophoresis separation medium, the electrophoresis separation medium container in fluidic communicating with said anode; and
   (b) a fluid handling device configured to move said electrophoresis separation medium to said at least one electrophoresis capillary.

3. The electrophoresis cartridge of claim 1, further comprising a source of capillary regeneration fluid in fluidic communication with said anode sub-assembly.

4. The electrophoresis cartridge of claim 1, further comprising a source of electrophoresis medium in fluidic communication with said cathode.

5. The electrophoresis cartridge of claim 1, further comprising a waste container in fluidic communication with said cathode sub-assembly.

6. The electrophoresis cartridge of claim 1, further comprising a waste container in fluidic communication with said anode sub-assembly.

7. The electrophoresis cartridge of claim 1, wherein said electrophoresis cartridge has a footprint of at most about 12 inches×12 inches and a weight ranging from about 1 kg to about 7 kg.

8. The electrophoresis cartridge of claim 1, further comprising a gel cartridge interface that releasably engages with a gel cartridge for providing an electrophoresis gel to said at least one electrophoresis capillary.

9. The electrophoresis cartridge of claim 1, wherein said integrated electrophoresis assembly is single piece.

10. The electrophoresis cartridge of claim 1, the cathode sub-assembly further comprising:
    a reagent port fluidically coupling the fluid conduit and the passage of the cathode sub-assembly.

11. The electrophoresis cartridge of claim 10, the cathode sub-assembly further comprising:
    a second reagent port; and
    a waste port.

12. The electrophoresis cartridge of claim 11, wherein the at least one node is in fluidic communication with the waste port.

13. The electrophoresis cartridge of claim 10, wherein the at least one node is in fluidic communication with the reagent port.

14. An electrophoresis cartridge, comprising:
    an integrated electrophoresis assembly including:
    (1) an anode sub-assembly comprising an anode,
    (2) a cathode sub-assembly comprising a cathode and a passage; and
    (3) at least one electrophoresis capillary having a first end in fluid communication with the cathode sub-assembly and a second end in fluid communication with the anode sub-assembly, wherein said cathode and said anode provide a voltage gradient between said first end and said second end of said at least one electrophoresis capillary;
    a reagent container comprising an electrophoresis buffer;
    a fluid conduit in fluidic communication between the reagent container and the cathode sub-assembly; and
    a pump configured to transfer the electrophoresis buffer from the reagent container to the passage of the cathode sub-assembly through the fluid conduit;
    wherein the anode sub-assembly further comprises an electrophoresis capillary port, at least one reagent port, and an anode node; and
    wherein the anode node is in electrical communication with the electrophoresis capillary port and in fluidic communication with the at least one reagent port.

15. The electrophoresis cartridge of claim 14, wherein the anode sub-assembly further comprises an electrophoresis separation medium port; and
    wherein the electrophoresis capillary port is in fluidic communication with the electrophoresis separation medium port.

16. The electrophoresis cartridge of claim 15, wherein the electrophoresis capillary port is in fluidic communication with the electrophoresis separation medium port through a passage of the anode sub-assembly.

* * * * *